US011993015B2

(12) United States Patent
Feller et al.

(10) Patent No.: US 11,993,015 B2
(45) Date of Patent: May 28, 2024

(54) BUILD PLATE ASSEMBLIES FOR CONTINUOUS LIQUID INTERPHASE PRINTING HAVING LIGHTING PANELS AND RELATED METHODS, SYSTEMS AND DEVICES

(71) Applicant: Carbon, Inc., Redwood City, CA (US)

(72) Inventors: Bob E. Feller, San Mateo, CA (US); Ariel M. Hermann, San Francisco, CA (US); John R. Tumbleston, Menlo Park, CA (US); David Moore, San Carlos, CA (US); Gregory W. Dachs, II, San Mateo, CA (US)

(73) Assignee: CARBON, INC., Redwood City, CA (US)

( * ) Notice: Subject to any disclaimer, the term of this patent is extended or adjusted under 35 U.S.C. 154(b) by 11 days.

(21) Appl. No.: 17/491,966

(22) Filed: Oct. 1, 2021

(65) Prior Publication Data

US 2022/0016838 A1    Jan. 20, 2022

Related U.S. Application Data

(62) Division of application No. 15/762,399, filed as application No. PCT/US2016/053421 on Sep. 23, 2016, now Pat. No. 11,220,051.

(Continued)

(51) Int. Cl.
*B29C 64/245* (2017.01)
*B29C 64/124* (2017.01)
(Continued)

(52) U.S. Cl.
CPC .......... *B29C 64/245* (2017.08); *B29C 64/124* (2017.08); *B29C 64/129* (2017.08);
(Continued)

(58) Field of Classification Search
CPC ... B29C 64/135; B29C 64/245; B29C 64/129; B29C 64/124
See application file for complete search history.

(56) References Cited

U.S. PATENT DOCUMENTS

| 4,133,310 A | 1/1979 | Lloyd et al. |
| 5,122,441 A | 6/1992 | Lawton et al. |

(Continued)

FOREIGN PATENT DOCUMENTS

| CN | 103895231 A | 7/2014 |
| EP | 0484086 A1 | 5/1992 |

(Continued)

OTHER PUBLICATIONS

"International Search Report and Written Opinion for PCT/US2016/053421 dated Nov. 28, 2016, 11 pages.".

(Continued)

*Primary Examiner* — S. Behrooz Ghorishi
*Assistant Examiner* — Alexander A Wang
(74) *Attorney, Agent, or Firm* — Myers Bigel, P.A.

(57) ABSTRACT

A build plate assembly for a three-dimensional printer includes: a lighting panel having individually addressable pixels configured to selectively emit light and/or transmit light from illumination below the pixels to a top surface top surface of the lighting panel; a rigid, optically transparent, gas-impermeable planar screen or base having an upper surface having an uneven surface topology and a lower surface that is affixed to the top surface of the lighting panel; and a flexible, optically transparent, gas-permeable sheet having upper and lower surfaces, the upper surface comprising a build surface for forming a three-dimensional object, the sheet lower surface positioned opposite the base, wherein the build plate is configured to permit gas flow to the build surface.

15 Claims, 26 Drawing Sheets

Related U.S. Application Data

(60) Provisional application No. 62/262,783, filed on Dec. 3, 2015.

(51) Int. Cl.
| | | |
|---|---|---|
| *B29C 64/129* | (2017.01) | |
| *B29C 64/135* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(52) U.S. Cl.
CPC .......... *B29C 64/135* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,294,487 A | 3/1994 | Ohashi et al. |
| 5,447,822 A | 9/1995 | Hull et al. |
| 5,529,473 A | 6/1996 | Lawton et al. |
| 5,545,367 A | 8/1996 | Bae et al. |
| 6,900,055 B1 | 5/2005 | Clayson et al. |
| 8,243,358 B2 | 8/2012 | Wen et al. |
| 8,534,797 B2 | 9/2013 | Law et al. |
| 8,636,826 B2 | 1/2014 | Curello et al. |
| 9,120,270 B2 | 9/2015 | Chen et al. |
| 9,636,873 B2 | 5/2017 | Joyce |
| 9,782,934 B2 | 10/2017 | Willis et al. |
| 11,020,898 B2 | 6/2021 | Moore et al. |
| 11,220,051 B2 | 1/2022 | Feller et al. |
| 2002/0015610 A1 | 2/2002 | Beehler et al. |
| 2007/0025878 A1 | 2/2007 | Abe et al. |
| 2007/0063389 A1 | 3/2007 | John |
| 2011/0089610 A1 | 4/2011 | El-Siblani et al. |
| 2012/0195994 A1 | 8/2012 | El-Siblani et al. |
| 2013/0037993 A1 | 2/2013 | Chen et al. |
| 2013/0089744 A1 | 4/2013 | McKnight et al. |
| 2013/0292862 A1 | 11/2013 | Joyce |
| 2013/0295212 A1 | 11/2013 | Chen et al. |
| 2014/0126205 A1 | 5/2014 | Davis et al. |
| 2014/0361463 A1 | 12/2014 | Desimone et al. |
| 2015/0034007 A1 | 2/2015 | Fischer et al. |
| 2015/0064298 A1 | 3/2015 | Syao |
| 2015/0072293 A1* | 3/2015 | DeSimone ............. B33Y 30/00 355/18 |
| 2015/0102532 A1 | 4/2015 | Desimone et al. |
| 2015/0231831 A1 | 8/2015 | El-Siblani |
| 2015/0290876 A1 | 10/2015 | Liu et al. |
| 2015/0360419 A1 | 12/2015 | Willis et al. |
| 2016/0041135 A1 | 2/2016 | Lannutti et al. |
| 2016/0193786 A1 | 7/2016 | Moore et al. |
| 2016/0279895 A1 | 9/2016 | Marjanovic et al. |
| 2017/0129167 A1 | 5/2017 | Castanon |
| 2017/0151717 A1 | 6/2017 | Li |
| 2018/0036941 A1 | 2/2018 | Xu et al. |
| 2019/0193285 A1 | 6/2019 | Adachi |
| 2021/0162665 A1 | 6/2021 | Moore et al. |
| 2022/0016838 A1 | 1/2022 | Feller et al. |

FOREIGN PATENT DOCUMENTS

| | | |
|---|---|---|
| EP | 1134068 A2 | 9/2001 |
| EP | 1894704 A1 | 3/2008 |
| WO | 2014126834 A2 | 8/2014 |

OTHER PUBLICATIONS

"Office Action for corresponding EP Application No. 16778955.1 dated Sep. 30, 2019, 5 pages."

Avery Dennison Corporation, "Pressure Sensitive Adhesives", https://label.averydennison.com/content/dam/averydennison/lpm-responsive/europe/english/documents/product-overviews/purpose/innovation/rc-na-purpose-innovation-adhesive-overview.pdf, 2011, (12 pages).

Gajasinghe, R.W.R.L., et al., "Experimental study of PDMS bonding to various substrates for monolithic microfluidic applications", Journal of Micromechanics and Microengineering, 24(7): 075010, 2014, 1-11.

* cited by examiner

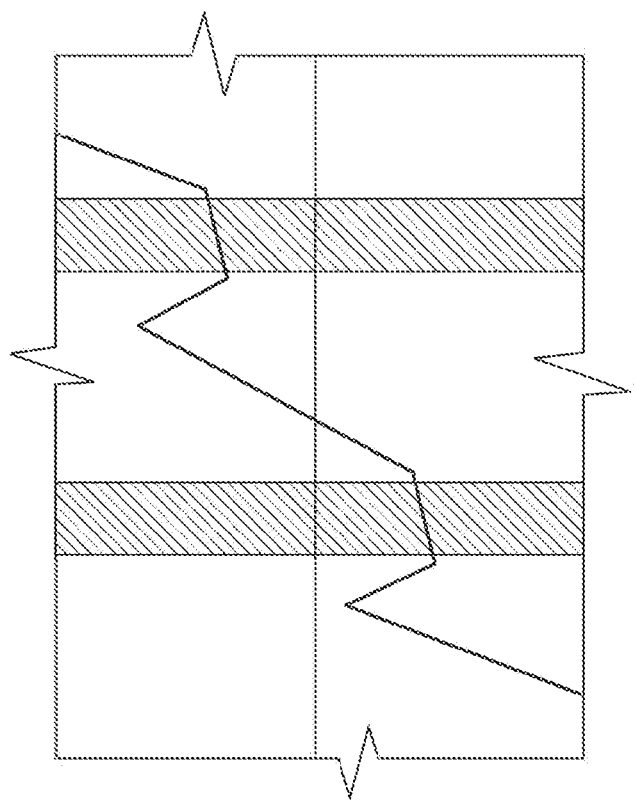
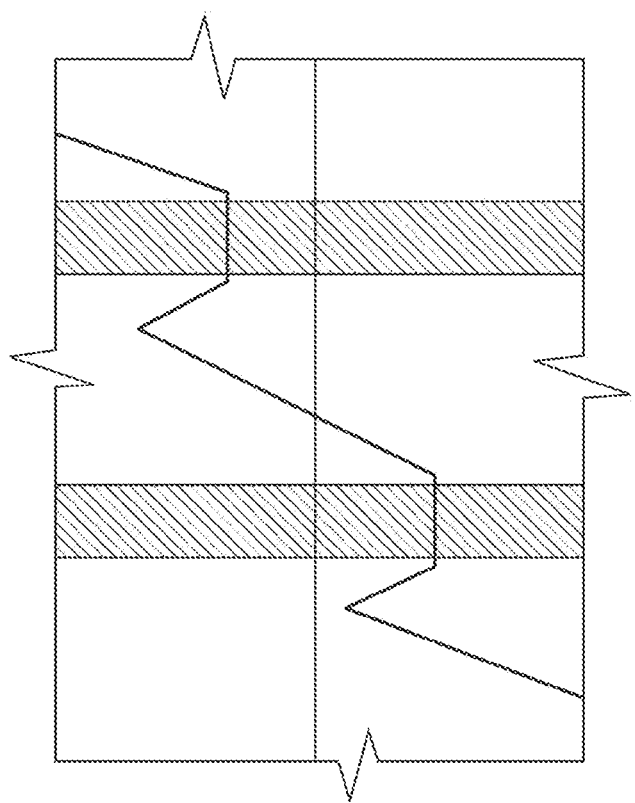

BUILD PLATE ASSEMBLIES FOR CONTINUOUS LIQUID INTERPHASE PRINTING HAVING LIGHTING PANELS AND RELATED METHODS, SYSTEMS AND DEVICES

RELATED APPLICATIONS

This application is divisional of U.S. patent application Ser. No. 15/762,399 filed Mar. 18, 2018, which application a 35 U.S.C. § 371 national phase entry of International Application No. PCT/US2016/053421, filed Sep. 23, 2016, and which claims the benefit of U.S. Provisional Patent Application Ser. No. 62/232,783, filed Sep. 25, 2015, the disclosures of which are incorporated by reference herein in their entireties.

FIELD OF THE INVENTION

The present invention concerns methods and apparatus for the fabrication of solid three-dimensional objects from liquid materials.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, South Dakota, USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced. Accordingly, there is a need for alternate methods and apparatus for three-dimensional fabrication that can obviate the need for mechanical separation steps in "bottom-up" fabrication.

SUMMARY OF THE INVENTION

Described herein are methods, systems and apparatus (including associated control methods, systems and apparatus), for the production of a three-dimensional object by additive manufacturing. In preferred (but not necessarily limiting) embodiments, the method is carried out continuously. In preferred (but not necessarily limiting) embodiments, the three-dimensional object is produced from a liquid interface. Hence they are sometimes referred to, for convenience and not for purposes of limitation, as "continuous liquid interphase printing" or "continuous liquid interface production" ("CLIP") herein (the two being used interchangeably). See, e.g., J. Tumbleston et al., *Continuous liquid interface production of 3D objects*, Science 347, 1349-1352 (published online Mar. 16, 2015). A schematic representation of one embodiment thereof is given in FIG. 1 herein. In some embodiments of the methods and compositions described above and below, the polymerizable liquid has a viscosity of 500 or 1,000 centipoise or more at room temperature and/or under the operating conditions of the method, up to a viscosity of 10,000, 20,000, or 50,000 centipoise or more, at room temperature and/or under the operating conditions of the method.

In some embodiments, a build plate assembly for a three-dimensional printer includes: a lighting panel having individually addressable pixels configured to selectively emit light and/or transmit light from illumination below the pixels to a top surface top surface of the lighting panel; a rigid, optically transparent, gas-impermeable planar screen or base having an upper surface having an uneven surface topology and a lower surface that is affixed to the top surface of the lighting panel; and a flexible, optically transparent, gas-permeable sheet having upper and lower surfaces, the upper surface comprising a build surface for forming a three-dimensional object, the sheet lower surface positioned opposite the base, wherein the build plate is configured to permit gas flow to the build surface.

In some embodiments, the build plate assembly includes an adhesive layer between the gas-permeable sheet and the base, and a channel layer defining channels therein. The channel layer comprises a permeable material such as a permeable polymer (e.g., poly(dimethylsiloxane) (PDMS). The channel layer defines channels on a bottom surface opposite the adhesive. The channel layer is adhered to the base by chemical bonding (e.g., oxidative treatments, including oxygen plasma treatments, UV ozone treatments and/or wet chemical treatments). The adhesive layer comprises a gas-permeable adhesive. The adhesive layer comprises a poly(dimethylsiloxane) (PDMS) film (e.g., a silicone transfer film adhesive).

In some embodiments, the base comprises a top portion and a bottom portion, wherein the top portion comprises a patterned rigid polymer that provides the surface topology and the top portion is adhered to the bottom portion. The top portion comprises a first material and the bottom portion comprises a second material that is different from the first material. The second material comprises sapphire, glass and/or quartz.

In some embodiments, the build plate assembly comprises an elastomeric layer between the channel layer and the base configured to increase an elasticity of the build surface.

In some embodiments, the permeable sheet and/or channel layer comprises a PDMS composite comprising fluorescent, oxygen-sensing particles for sensing oxygen.

In some embodiments, the permeable sheet, elastomeric layer and/or channel layer comprises a PDMS composite comprising electrically conductive particles for heating a portion of the build plate.

In some embodiments, the lighting panel comprises a LCD panel. The lighting panel may be an OLED panel, an ultraviolet LED light source array and/or a grey scale lighting panel.

In some embodiments, light guides in the build plate correspond to the individually addressable pixels of the lighting panel.

In some embodiments, the surface topology comprises random or patterned features configured to maintain a predefined gap between the planar base and portions of the gas-permeable sheet.

In some embodiments, the gas-permeable sheet includes a thickness, and the gap is less than or equal to five times the thickness of the sheet.

In some embodiments, a region between the planar base and the gas-permeable sheet comprises gap regions between the planar base and the gas-permeable sheet in which a gap that is sufficient to increase gas flow and reduce an area of wetting on the gas permeable sheet is maintained. In some embodiments, the surface topology comprises a rough surface having irregular and/or random features. In some embodiments, the planar base is oxygen-impermeable. In some embodiments, the gas-permeable sheet is oxygen-permeable. In some embodiments, the surface topology of the planar base is formed by a mechanical abrasive, chemical, etching and/or laser cutting. In some embodiments, the surface topology comprises depressions or protrusions covering about 0.1% to about 20% of an area of the planar base. In some embodiments, the surface topology comprises depressions or protrusions having a height or depth of 0.1-5 μm deep. In some embodiments, the surface topology comprises depressions or protrusions having a diameter of about 1 to about 10 In some embodiments, the surface topology that increases gas flow to the build surface is on the base upper surface. In some embodiments, the surface topology that increases gas flow to the build surface is on the sheet lower surface. In some embodiments, a thickness of the sheet is less than about 150 In some embodiments, the base comprises sapphire, glass, quartz or polymer. In some embodiments, the sheet comprises a fluoropolymer (e.g., a perfluoropolyether polymer). In some embodiments, the surface topology has an optical scattering angle of less than 20%, less than 15% or less than 10%.

In some embodiments, a method of forming a three-dimensional object includes: providing a carrier and an optically transparent member having a build surface, said carrier and said build surface defining a build region therebetween; filling said build region with a polymerizable liquid, continuously or intermittently irradiating said build region with light through said optically transparent member to form a solid polymer from said polymerizable liquid, continuously or intermittently advancing (e.g., sequentially or concurrently with said irradiating step) said carrier away from said build surface to form said three-dimensional object from said solid polymer, wherein said optically transparent member comprises a build plate described herein.

In some embodiments, said filling, irradiating, and/or advancing steps are carried out while also concurrently: (i) continuously maintaining a dead zone of polymerizable liquid in contact with said build surface, and (ii) continuously maintaining a gradient of polymerization zone between said dead zone and said solid polymer and in contact with each thereof, said gradient of polymerization zone comprising said polymerizable liquid in partially cured form.

In some embodiments, the carrier with said polymerized region adhered thereto is unidirectionally advanced away from said build surface on said stationary build plate.

In some embodiments, said filling step further comprising vertically reciprocating said carrier with respect to said build surface to enhance or speed the refilling of said build region with said polymerizable liquid.

In some embodiments, said vertically reciprocating step comprises an upstroke and a downstroke, with the distance of said upstroke greater than the distance of said downstroke, to thereby concurrently carry out said advancing step in part or in whole.

In some embodiments, said vertically reciprocating step comprises an upstroke, and wherein the speed of said upstroke accelerates over a period of time during said upstroke.

In some embodiments, said upstroke begins gradually. In some embodiments, said vertically reciprocating step comprises a downstroke, and wherein the speed of said downstroke decelerates over a period of time during said downstroke. In some embodiments, said downstroke ends gradually.

In some embodiments, said vertically reciprocating step is carried out over a total time of from 0.01 or 0.1 seconds up to 1 or 10 seconds, and/or over an upstroke distance of travel of from 0.02 or 0.2 millimeters to 1 or 10 millimeters.

In some embodiments, said advancing is carried out intermittently at a rate of 1, 2, 5 or 10 individual advances per minute up to 300, 600, or 1000 individual advances per minute, each followed by a pause during which an irradiating step is carried out.

In some embodiments, each of said individual advances is carried out over an average distance of travel for each advance of from 10 or 50 microns to 100 or 200 microns.

In some embodiments, said build surface is fixed and stationary in the lateral (e.g., X and Y) dimensions.

In some embodiments, said build surface is fixed and stationary in the vertical (or Z) dimension.

In some embodiments, said optically transparent member comprises a semipermeable member, and said continuously maintaining a dead zone is carried out by feeding an inhibitor of polymerization through said optically transparent member in an amount sufficient to maintain said dead zone and said gradient of polymerization.

In some embodiments, said optically transparent member is comprised of a semipermeable fluoropolymer, a rigid gas-permeable polymer, porous glass, or a combination thereof.

In some embodiments, said gradient of polymerization zone and said dead zone together have a thickness of from 1 to 1000 microns.

In some embodiments, said gradient of polymerization zone is maintained for a time of at least 5, 10, 20, or 30 seconds, or at least 1 or 2 minutes.

In some embodiments, the method includes the step of disrupting said gradient of polymerization zone for a time sufficient to form a cleavage line in said three-dimensional object.

In some embodiments, the step of heating said polymerizable liquid to reduce the viscosity thereof in said build region.

In some embodiments, said semipermeable member has a thickness of from 0.1 to 100 millimeters; and/or wherein said semipermeable member has a permeability to oxygen of at least $7.5 \times 10^{-17}$ $m^2 s^{-1} Pa^{-1}$ (10 Barrers); and/or wherein said semipermeable member is formed of a semipermeable fluoropolymer, a rigid gas-permeable polymer, porous glass, or a combination thereof.

In some embodiments, said polymerizable liquid comprises a free radical polymerizable liquid and said inhibitor comprises oxygen; or said polymerizable liquid comprises an acid-catalyzed or cationically polymerizable liquid, and said inhibitor comprises a base.

In some embodiments, an apparatus for forming a three-dimensional object from a polymerizable liquid includes: (a) a support; (b) a carrier operatively associated with said support on which carrier said three-dimensional object is formed; (c) an optically transparent member having a build surface, with said build surface and said carrier defining a build region therebetween; (d) a liquid polymer supply (e.g., a well) operatively associated with said build surface and configured to supply liquid polymer into said build region for solidification or polymerization; (e) a radiation source configured to irradiate said build region through said optically transparent member to form a solid polymer from said polymerizable liquid; (f) optionally at least one drive operatively associated with either said transparent member or said carrier; (g) a controller operatively associated with said carrier, and/or optionally said at least one drive, and said radiation source for advancing said carrier away from said build surface to form said three-dimensional object from said solid polymer, wherein said optically transparent member comprises a build plate having an optically transparent, gas-impermeable planar screen or base and the radiation source comprises the planar screen.

In some embodiments, the controller is further configured to oscillate or reciprocate said carrier with respect to said build surface to enhance or speed the refilling of said build region with said polymerizable liquid.

In some embodiments, the controller is further configured to form said three-dimensional object from said solid polymer while also concurrently with said filling, advancing, and/or irradiating step: (i) continuously maintaining a dead zone of polymerizable liquid in contact with said build surface, and (ii) continuously maintaining a gradient of polymerization zone between said dead zone and said solid polymer and in contact with each thereof, said gradient of polymerization zone comprising said polymerizable liquid in partially cured form In some embodiments, the build plate is substantially fixed or stationary.

In some embodiments, said semipermeable member comprises a top surface portion, a bottom surface portion, and an edge surface portion; said build surface is on said top surface portion; and said feed surface is on at least one of said top surface portion, said bottom surface portion, and said edge surface portion.

In some embodiments, said optically transparent member comprises a semipermeable member. In some embodiments, said semipermeable member has a thickness of from 0.1 to 100 millimeters; and/or wherein said semipermeable member has a permeability to oxygen of at least $7.5 \times 10^{-17}$ $m^2 s^{-1} Pa^{-1}$ (10 Barrers); and/or wherein said semipermeable member is formed of a semipermeable fluoropolymer, a rigid gas-permeable polymer, porous glass, or a combination thereof.

Non-limiting examples and specific embodiments of the present invention are explained in greater detail in the drawings herein and the specification set forth below. The disclosure of all United States Patent references cited herein are to be incorporated herein by reference in their entirety.

BRIEF DESCRIPTION OF THE DRAWINGS

FIG. 14A schematically illustrates one segment of a "strobe" pattern of fabrication, where the duration of the static portion of the carrier has been shortened to near the duration of the "strobe" exposure FIG. 14B is a schematic illustration of a segment of a strobe pattern of fabrication similar to FIG. 14A, except that the carrier is now moving slowly upward during the period of strobe illumination.

DETAILED DESCRIPTION OF ILLUSTRATIVE EMBODIMENTS

Figure 1:
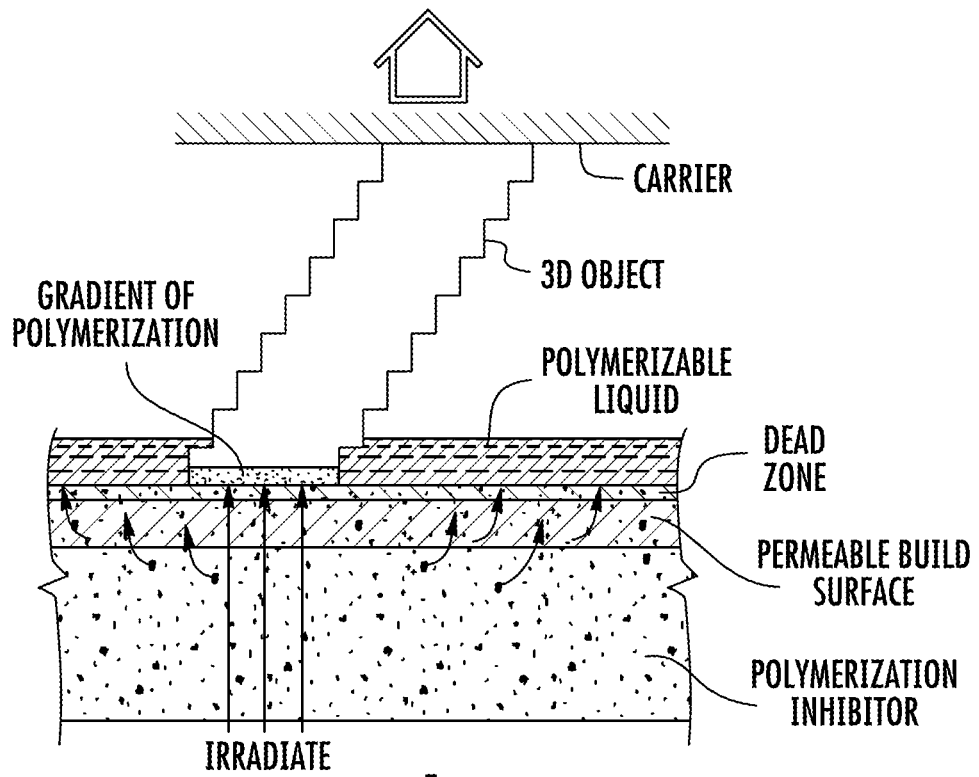
FIG. 1 is a schematic illustration of one embodiment of a method of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids/Part A Components.

Any suitable polymerizable liquid can be used to enable the present invention. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid catalyzed polymerizable liquids. While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also Photoacid Generator Selection Guide for the electronics industry and energy curable coatings (BASF 2010).

Hydrogels. In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable silicone resins. A suitable resin includes photocurable silicones. UV cure silicone rubber, such as Silopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable resins. Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable polyurethanes. A particularly useful resin is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High performance resins. In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluorenone initiators (including derivatives thereof), to initiate cross-linking on irradiation, as discussed further below.

Additional example resins. Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's HTM140IV High Temperature Mold Material for use directly with vulcanized rubber in molding/casting applications. A particularly useful material for making tough and stiff parts includes EnvisionTEC's RC31 resin. A particularly useful resin for investment casting applications includes EnvisionTEC's Easy Cast EC500.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin as also discussed below. For example, magnetic or paramagnetic particles or nanoparticles can be employed. The resin or polymerizable material may contain a dispersing agent, such as an ionic surfactant, a non-ionic surfactant, a block copolymer, or the like.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of polymerization. Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable liquids carrying live cells. In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

2. Apparatus.

Figure 2:
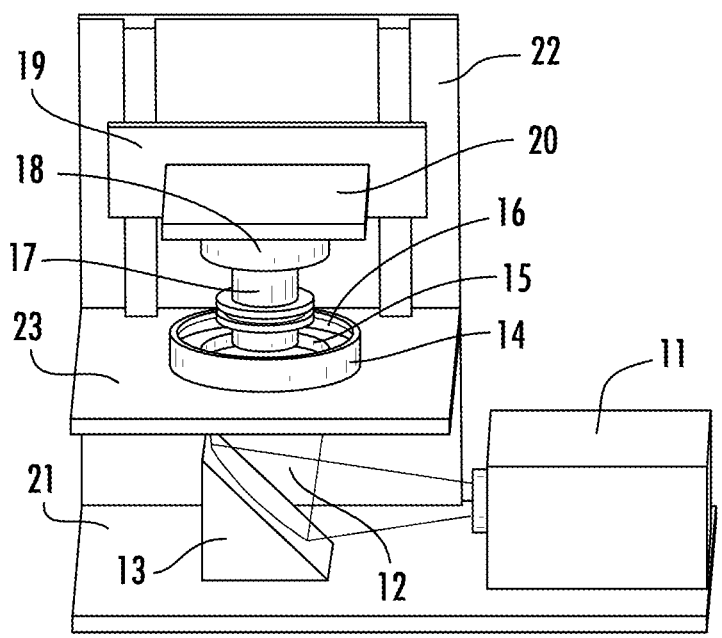
FIG. 2 is a perspective view of one embodiment of an apparatus of the present invention.

A non-limiting embodiment of an apparatus of the invention is shown in FIG. 2. It comprises a radiation source 11 such as a digital light processor (DLP) providing electromagnetic radiation 12 which though reflective mirror 13 illuminates a build chamber defined by wall 14 and a rigid build plate 15 forming the bottom of the build chamber, which build chamber is filled with liquid resin 16. The bottom of the chamber 15 is constructed of build plate comprising a semipermeable member as discussed further below. The top of the object under construction 17 is attached to a carrier 18. The carrier is driven in the vertical direction by linear stage 19, although alternate structures can be used as discussed below.

A liquid resin reservoir, tubing, pumps liquid level sensors and/or valves can be included to replenish the pool of liquid resin in the build chamber (not shown for clarity) though in some embodiments a simple gravity feed may be employed. Drives/actuators for the carrier or linear stage, along with associated wiring, can be included in accordance with known techniques (again not shown for clarity). The drives/actuators, radiation source, and in some embodiments pumps and liquid level sensors can all be operatively associated with a suitable controller, again in accordance with known techniques.

Build plates 15 used to carry out the present invention generally comprise or consist of a (typically rigid or solid, stationary, and/or fixed) semipermeable (or gas permeable) member, alone or in combination with one or more additional supporting substrates (e.g., clamps and tensioning members to rigidify an otherwise flexible semipermeable material). The semipermeable member can be made of any suitable material that is optically transparent at the relevant wavelengths (or otherwise transparent to the radiation source, whether or not it is visually transparent as perceived by the human eye—i.e., an optically transparent window may in some embodiments be visually opaque), including but not limited to porous or microporous glass, and the rigid gas permeable polymers used for the manufacture of rigid gas permeable contact lenses. See, e.g., Norman G. Gaylord, U.S. Pat. No. RE31,406; see also U.S. Pat. Nos. 7,862,176; 7,344,731; 7,097,302; 5,349,394; 5,310,571; 5,162,469; 5,141,665; 5,070,170; 4,923,906; and 4,845,089. In some embodiments such materials are characterized as glassy and/or amorphous polymers and/or substantially crosslinked that they are essentially non-swellable. Preferably the semipermeable member is formed of a material that does not swell when contacted to the liquid resin or material to be polymerized (i.e., is "non-swellable"). Suitable materials for the semipermeable member include amorphous fluoropolymers, such as those described in U.S. Pat. Nos. 5,308,685 and 5,051,115. For example, such fluoropolymers are particularly useful over silicones that would potentially swell when used in conjunction with organic liquid resin inks to be polymerized. For some liquid resin inks, such as more aqueous-based monomeric systems and/or some polymeric resin ink systems that have low swelling tendencies, silicone based window materials maybe suitable. The solubility or permeability of organic liquid resin inks can be dramatically decreased by a number of known parameters including increasing the crosslink density of the window material or increasing the molecular weight of the liquid resin ink. In some embodiments the build plate may be formed from a thin film or sheet of material which is flexible when separated from the apparatus of the invention, but which is clamped and tensioned when installed in the apparatus (e.g., with a tensioning ring) so that it is rendered fixed or rigid in the apparatus. Particular materials include TEFLON AF® fluoropolymers, commercially available from DuPont. Additional materials include perfluoropolyether polymers such as described in U.S. Pat. Nos. 8,268,446; 8,263,129; 8,158,728; and 7,435,495.

It will be appreciated that essentially all solid materials, and most of those described above, have some inherent "flex" even though they may be considered "rigid," depending on factors such as the shape and thickness thereof and environmental factors such as the pressure and temperature to which they are subjected. In addition, the terms "stationary" or "fixed" with respect to the build plate is intended to mean that no mechanical interruption of the process occurs, or no mechanism or structure for mechanical interruption of the process (as in a layer-by-layer method or apparatus) is provided, even if a mechanism for incremental adjustment of the build plate (for example, adjustment that does not lead to or cause collapse of the gradient of polymerization zone) is provided), or if the build surface contributes to reciprocation to aid feeding of the polymerizable liquid, as described further below.

The semipermeable member typically comprises a top surface portion, a bottom surface portion, and an edge surface portion. The build surface is on the top surface portion; and the feed surface may be on one, two, or all three of the top surface portion, the bottom surface portion, and/or the edge surface portion. In the embodiment illustrated in FIG. 2 the feed surface is on the bottom surface portion, but alternate configurations where the feed surface is provided on an edge, and/or on the top surface portion (close to but separate or spaced away from the build surface) can be implemented with routine skill.

The semipermeable member has, in some embodiments, a thickness of from 0.01, 0.1 or 1 millimeters to 10 or 100 millimeters, or more (depending upon the size of the item being fabricated, whether or not it is laminated to or in contact with an additional supporting plate such as glass, etc., as discussed further below.

The permeability of the semipermeable member to the polymerization inhibitor will depend upon conditions such as the pressure of the atmosphere and/or inhibitor, the choice of inhibitor, the rate or speed of fabrication, etc. In general, when the inhibitor is oxygen, the permeability of the semipermeable member to oxygen may be from 10 or 20 Barrers, up to 1000 or 2000 Barrers, or more. For example, a semipermeable member with a permeability of 10 Barrers used with a pure oxygen, or highly enriched oxygen, atmosphere under a pressure of 150 PSI may perform substantially the same as a semipermeable member with a permeability of 500 Barrers when the oxygen is supplied from the ambient atmosphere under atmospheric conditions.

Thus, the semipermeable member may comprise a flexible polymer film (having any suitable thickness, e.g., from 0.001, 0.01, 0.05, 0.1 or 1 millimeters to 1, 5, 10, or 100 millimeters, or more), and the build plate may further comprise a tensioning member (e.g., a peripheral clamp and an operatively associated strain member or stretching member, as in a "drum head"; a plurality of peripheral clamps, etc., including combinations thereof) connected to the polymer film and to fix and rigidify the film (e.g., at least sufficiently so that the film does not stick to the object as the object is advanced and resiliently or elastically rebound therefrom). The film has a top surface and a bottom surface, with the build surface on the top surface and the feed surface preferably on the bottom surface. In other embodiments, the semipermeable member comprises: (i) a polymer film layer (having any suitable thickness, e.g., from 0.001, 0.01, 0.1 or 1 millimeters to 5, 10 or 100 millimeters, or more), having a top surface positioned for contacting said polymerizable liquid and a bottom surface, and (ii) a rigid, gas permeable, optically transparent supporting member (having any suitable thickness, e.g., from 0.01, 0.1 or 1 millimeters to 10, 100, or 200 millimeters, or more), contacting said film layer bottom surface. The supporting member has a top surface contacting the film layer bottom surface, and the supporting member has a bottom surface which may serve as the feed surface for the polymerization inhibitor. Any suitable materials that are semipermeable (that is, permeable to the polymerization inhibitor) may be used. For example, the polymer film or polymer film layer may, for example, be a fluoropolymer film, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. The supporting member comprises a silicone or crosslinked silicone polymer member such as a polydmiethylxiloxane member, a rigid gas permeable polymer member, or a porous or microporous glass member.

Films can be laminated or clamped directly to the rigid supporting member without adhesive (e.g., using PFPE and PDMS materials), or silane coupling agents that react with the upper surface of a PDMS layer can be utilized to adhere to the first polymer film layer. UV-curable, acrylate-functional silicones can also be used as a tie layer between UV-curable PFPEs and rigid PDMS supporting layers.

When configured for placement in the apparatus, the carrier defines a "build region" on the build surface, within the total area of the build surface. Because lateral "throw" (e.g., in the X and/or Y directions) is not required in the present invention to break adhesion between successive layers, as in the Joyce and Chen devices noted previously, the area of the build region within the build surface may be maximized (or conversely, the area of the build surface not devoted to the build region may be minimized). Hence in some embodiments, the total surface area of the build region can occupy at least fifty, sixty, seventy, eighty, or ninety percent of the total surface area of the build surface.

As shown in FIG. 2, the various components are mounted on a support or frame assembly 20. While the particular design of the support or frame assembly is not critical and can assume numerous configurations, in the illustrated embodiment it is comprised of a base 21 to which the radiation source 11 is securely or rigidly attached, a vertical member 22 to which the linear stage is operatively associated, and a horizontal table 23 to which wall 14 is removably or securely attached (or on which the wall is placed), and with the build plate rigidly fixed, either permanently or removably, to form the build chamber as described above.

As noted above, the build plate can consist of a single unitary and integral piece of a rigid semipermeable member, or can comprise additional materials. For example, a porous or microporous glass can be laminated or fixed to a rigid semipermeable material. Or, a semipermeable member as an upper portion can be fixed to a transparent lower member having purging channels formed therein for feeding gas carrying the polymerization inhibitor to the semipermeable member (through which it passes to the build surface to facilitate the formation of a release layer of unpolymerized liquid material, as noted above and below). Such purge channels may extend fully or partially through the base plate: For example, the purge channels may extend partially into the base plate, but then end in the region directly underlying the build surface to avoid introduction of distortion. Specific geometries will depend upon whether the feed surface for the inhibitor into the semipermeable member is located on the same side or opposite side as the build surface, on an edge portion thereof, or a combination of several thereof.

Any suitable radiation source (or combination of sources) can be used, depending upon the particular resin employed, including electron beam and ionizing radiation sources. In a preferred embodiment the radiation source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with a controller, as noted above. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

In some embodiments, as discussed further below, there may be movement in the X and/or Y directions concurrently with movement in the Z direction, with the movement in the X and/or Y direction hence occurring during polymerization of the polymerizable liquid (this is in contrast to the movement described in Y. Chen et al., or M. Joyce, supra, which is movement between prior and subsequent polymerization steps for the purpose of replenishing polymerizable liquid). In the present invention such movement may be carried out for purposes such as reducing "burn in" or fouling in a particular zone of the build surface.

Because an advantage of some embodiments of the present invention is that the size of the build surface on the semipermeable member (i.e., the build plate or window) may be reduced due to the absence of a requirement for extensive lateral "throw" as in the Joyce or Chen devices noted above, in the methods, systems and apparatus of the present invention lateral movement (including movement in the X and/or Y direction or combination thereof) of the carrier and object (if such lateral movement is present) is preferably not more than, or less than, 80, 70, 60, 50, 40, 30, 20, or even 10 percent of the width (in the direction of that lateral movement) of the build region.

While in some embodiments the carrier is mounted on an elevator to advance up and away from a stationary build plate, on other embodiments the converse arrangement may be used: That is, the carrier may be fixed and the build plate lowered to thereby advance the carrier away therefrom. Numerous different mechanical configurations will be apparent to those skilled in the art to achieve the same result.

Depending on the choice of material from which the carrier is fabricated, and the choice of polymer or resin from which the article is made, adhesion of the article to the carrier may sometimes be insufficient to retain the article on the carrier through to completion of the finished article or "build." For example, an aluminum carrier may have lower adhesion than a poly(vinyl chloride) (or "PVC") carrier. Hence one solution is to employ a carrier comprising a PVC on the surface to which the article being fabricated is polymerized. If this promotes too great an adhesion to conveniently separate the finished part from the carrier, then any of a variety of techniques can be used to further secure the article to a less adhesive carrier, including but not limited to the application of adhesive tape such as "Greener Masking Tape for Basic Painting #2025 High adhesion" to further secure the article to the carrier during fabrication.

3. Controller and Process Control.

The methods and apparatus of the invention can include process steps and apparatus features to implement process control, including feedback and feed-forward control, to, for example, enhance the speed and/or reliability of the method.

A controller for use in carrying out the present invention may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, irradiation intensity, temperature of carrier, polymerizable liquid in the build zone, temperature of growing product, temperature of build plate, pressure, speed of advance, pressure, force (e.g., exerted on the build plate through the carrier and product being fabricated), strain (e.g., exerted on the carrier by the growing product being fabricated), thickness of release layer, etc.

Known parameters that may be used in feedback and/or feed-forward control systems include, but are not limited to, expected consumption of polymerizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of carrier, intensity of irradiation, duration of irradiation (e.g. for each "slice"), etc.

For example, the temperature of the polymerizable liquid in the build zone, or the temperature of the build plate, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the build plate. Suitable process parameters for such adjustment may include: decreasing temperature with a cooler, decreasing the rate of advance of the carrier, decreasing intensity of the irradiation, decreasing duration of radiation exposure, etc.

In addition, the intensity of the irradiation source (e.g., an ultraviolet light source such as a mercury lamp) may be monitored with a photodetector to detect a decrease of intensity from the irradiation source (e.g., through routine degradation thereof during use). If detected, a process parameter may be adjusted through a controller to accommodate the loss of intensity. Suitable process parameters for such adjustment may include: increasing temperature with a heater, decreasing the rate of advance of the carrier, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller). Examples of heaters and coolers include fluid circulation conduits, heaters/coolers positioned adjacent elements of the apparatus or embedded into the apparatus, thermoelectric devices, and the like.

In some embodiments the controller is configured to maintain the gradient of polymerization zone described herein (see, e.g., FIG. 1) throughout the fabrication of some or all of the final product. The specific configuration (e.g., times, rate or speed of advancing, radiation intensity, temperature, etc.) will depend upon factors such as the nature of the specific polymerizable liquid and the product being created. Configuration to maintain the gradient of polymerization zone may be carried out empirically, by entering a set of process parameters or instructions previously determined, or determined through a series of test runs or "trial and error"; the configuration may be provided through predetermined instructions; the configuration may be achieved by suitable monitoring and feedback (as discussed above), combinations thereof, or in any other suitable manner.

Figure 3:
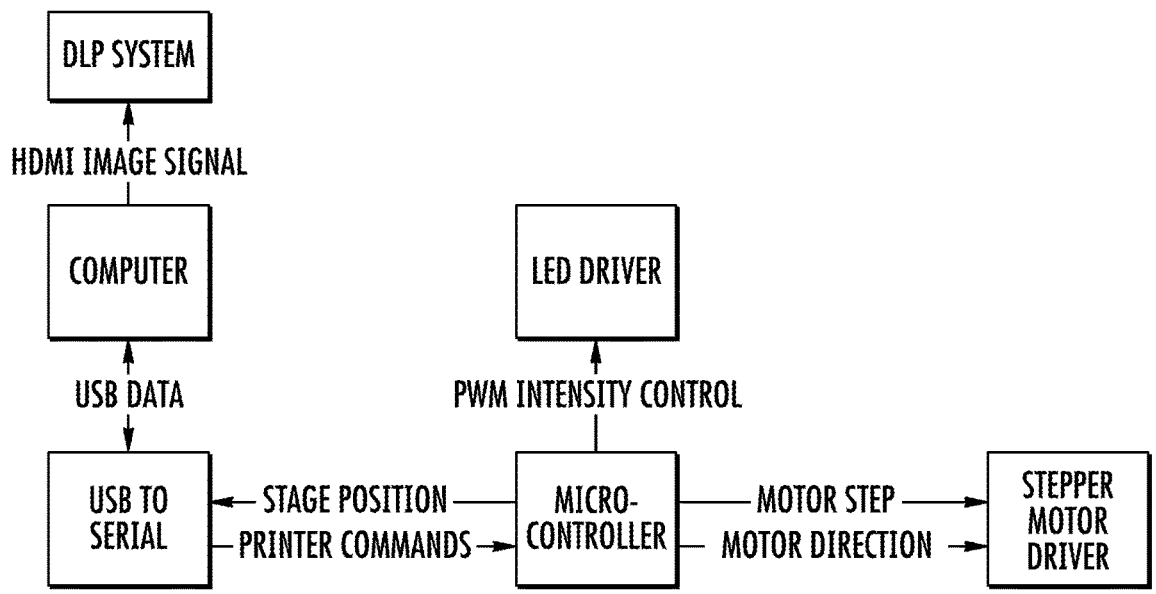
FIG. 3 is a first flow chart illustrating control systems and methods for carrying out the present invention.
Figure 4:
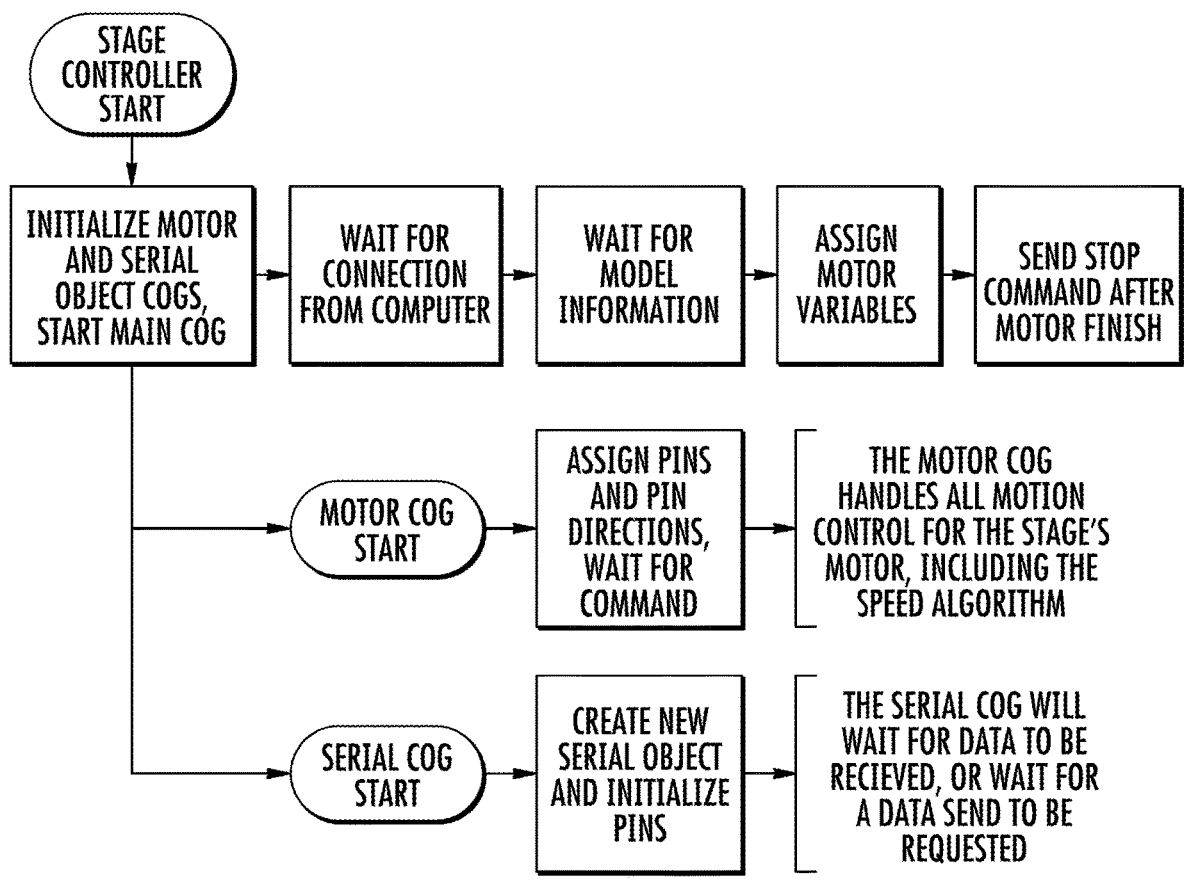
FIG. 4 is a second flow chart illustrating control systems and methods for carrying out the present invention.
Figure 5:
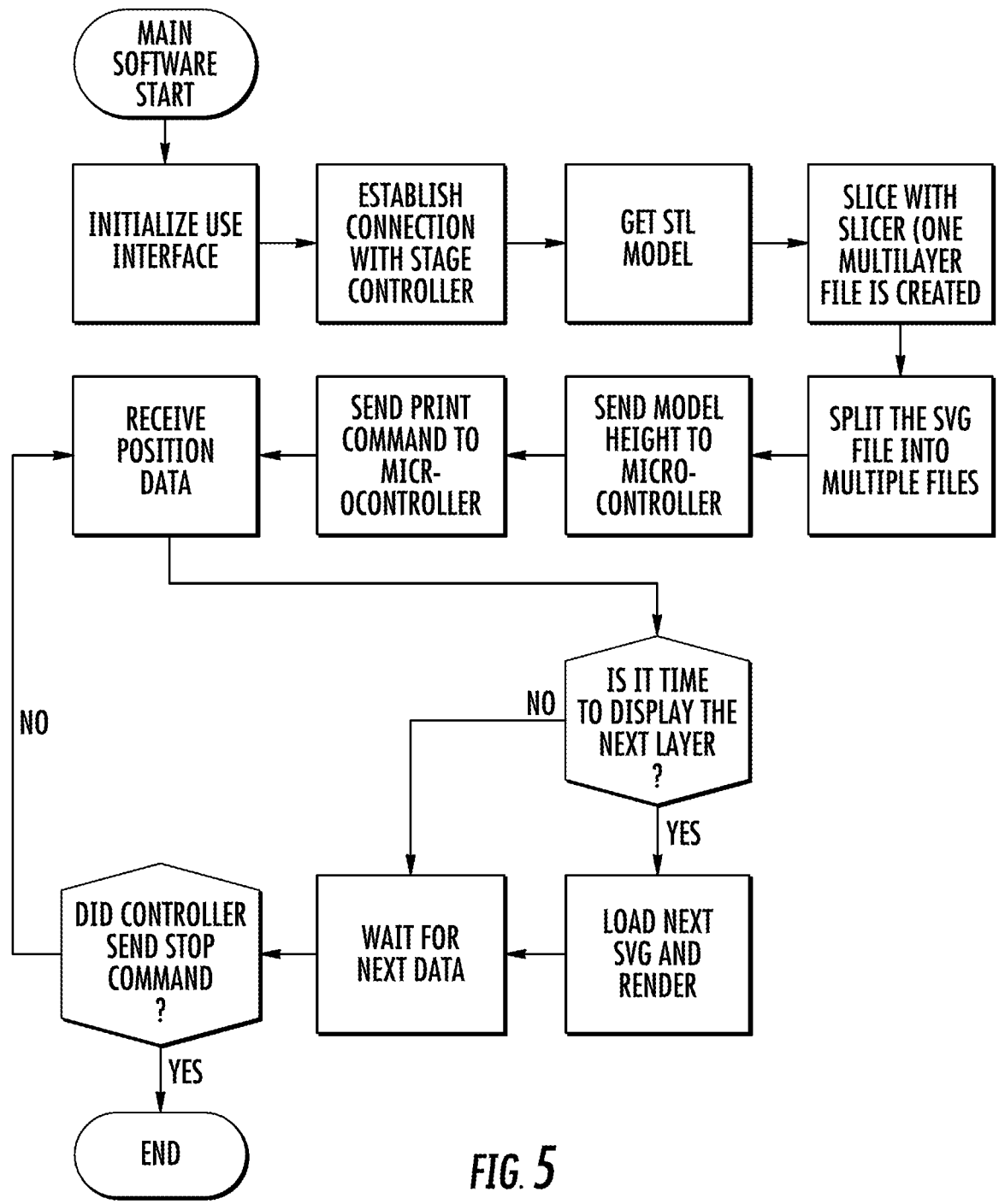
FIG. 5 is a third flow chart illustrating control systems and methods for carrying out the present invention.

In some embodiments, a method and apparatus as described above may be controlled by a software program running in a general purpose computer with suitable interface hardware between that computer and the apparatus described above. Numerous alternatives are commercially available. Non-limiting examples of one combination of components is shown in FIGS. 3 to 5, where "Microcontroller" is Parallax Propeller, the Stepper Motor Driver is Sparkfun EasyDriver, the LED Driver is a Luxeon Single LED Driver, the USB to Serial is a Parallax USB to Serial converter, and the DLP System is a Texas Instruments LightCrafter system.

4. General Methods.

As noted above, the present invention provides a method of forming a three-dimensional object, comprising the steps of: (a) providing a carrier and a build plate, said build plate comprising a semipermeable member, said semipermeable member comprising a build surface and a feed surface separate from said build surface, with said build surface and said carrier defining a build region therebetween, and with said feed surface in fluid contact with a polymerization inhibitor; then (concurrently and/or sequentially) (b) filing said build region with a polymerizable liquid, said polymerizable liquid contacting said build segment, (c) irradiating said build region through said build plate to produce a solid polymerized region in said build region, with a liquid film release layer comprised of said polymerizable liquid formed between said solid polymerized region and said build surface, the polymerization of which liquid film is inhibited by said polymerization inhibitor; and (d) advancing said carrier with said polymerized region adhered thereto away from said build surface on said stationary build plate to create a subsequent build region between said polymerized region and said top zone. In general the method includes (e) continuing and/or repeating steps (b) through (d) to produce a subsequent polymerized region adhered to a previous polymerized region until the continued or repeated deposition of polymerized regions adhered to one another forms said three-dimensional object.

Since no mechanical release of a release layer is required, or no mechanical movement of a build surface to replenish oxygen is required, the method can be carried out in a continuous fashion, though it will be appreciated that the individual steps noted above may be carried out sequentially, concurrently, or a combination thereof. Indeed, the rate of steps can be varied over time depending upon factors such as the density and/or complexity of the region under fabrication.

Also, since mechanical release from a window or from a release layer generally requires that the carrier be advanced a greater distance from the build plate than desired for the next irradiation step, which enables the window to be recoated, and then return of the carrier back closer to the build plate (e.g., a "two steps forward one step back" operation), the present invention in some embodiments permits elimination of this "back-up" step and allows the carrier to be advanced unidirectionally, or in a single direction, without intervening movement of the window for re-coating, or "snapping" of a pre-formed elastic release-layer. However, in other embodiments of the invention, reciprocation is utilized not for the purpose of obtaining release, but for the purpose of more rapidly filling or pumping polymerizable liquid into the build region.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.)

In other embodiments of the invention, the advancing step is carried out continuously, at a uniform or variable rate.

In some embodiments, the rate of advance (whether carried out sequentially or continuously) is from about 0.11, or 10 microns per second, up to about to 100, 1,000, or 10,000 microns per second, again depending again depending on factors such as temperature, pressure, structure of the article being produced, intensity of radiation, etc As described further below, in some embodiments the filling step is carried out by forcing said polymerizable liquid into said build region under pressure. In such a case, the advancing step or steps may be carried out at a rate or cumulative or average rate of at least 0.1, 1, 10, 50, 100, 500 or 1000 microns per second, or more. In general, the pressure may be whatever is sufficient to increase the rate of said advancing step(s) at least 2, 4, 6, 8 or 10 times as compared to the maximum rate of repetition of said advancing steps in the absence of said pressure. Where the pressure is provided by enclosing an apparatus such as described above in a pressure vessel and carrying the process out in a pressurized atmosphere (e.g., of air, air enriched with oxygen, a blend of gasses, pure oxygen, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel. In such an embodiment, both the feed surface and the polymerizable liquid can be in fluid contact with the same compressed gas (e.g., one comprising from 20 to 95 percent by volume of oxygen, the oxygen serving as the polymerization inhibitor.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

As noted above, the irradiating step is in some embodiments carried out with patterned irradiation. The patterned irradiation may be a fixed pattern or may be a variable pattern created by a pattern generator (e.g., a DLP) as discussed above, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or said gradient of polymerization zone and said dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting said gradient of polymerization zone/active surface, for a time sufficient to form a cleavage line in said three-dimensional object (e.g., at a predetermined desired location for intentional cleavage, or at a location in said object where prevention of cleavage or reduction of cleavage is non-critical), and then reinstating said gradient of polymerization zone (e.g. by pausing, and resuming, the advancing step, increasing, then decreasing, the intensity of irradiation, and combinations thereof In some embodiments the build surface is flat; in other the build surface is irregular such as convexly or concavely curved, or has walls or trenches formed therein. In either case the build surface may be smooth or textured.

Curved and/or irregular build plates or build surfaces can be used in fiber or rod formation, to provide different materials to a single object being fabricated (that is, different polymerizable liquids to the same build surface through channels or trenches formed in the build surface, each associated with a separate liquid supply, etc.

Carrier Feed Channels for Polymerizable liquid. While polymerizable liquid may be provided directly to the build plate from a liquid conduit and reservoir system, in some embodiments the carrier include one or more feed channels therein. The carrier feed channels are in fluid communication with the polymerizable liquid supply, for example a reservoir and associated pump. Different carrier feed channels may be in fluid communication with the same supply and operate simultaneously with one another, or different carrier feed channels may be separately controllable from one another (for example, through the provision of a pump and/or valve for each). Separately controllable feed channels may be in fluid communication with a reservoir containing the same polymerizable liquid, or may be in fluid communication with a reservoir containing different polymerizable liquids. Through the use of valve assemblies, different polymerizable liquids may in some embodiments be alternately fed through the same feed channel, if desired.

5. Reciprocating Feed of Polymerizable Liquid.

In an embodiment of the present invention, the carrier is vertically reciprocated (or oscillated) with respect to the build surface (that is, the two are vertically reciprocated with respect to one another) to enhance or speed the refilling of the build region with the polymerizable liquid. Such reciprocations or oscillations (these two terms being used interchangeably herein) may be of any suitable configuration, including uniform and non-uniform, and/or periodic or non-periodic, with respect to one another, so long as they are configured to enhance feed of the polymerizable liquid to the build surface.

In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the speed of the upstroke gradually accelerates (that is, there is provided a gradual start and/or gradual acceleration of the upstroke, over a period of at least 20, 30, 40, or 50 percent of the total time of the upstroke, until the conclusion of the upstroke, or the change of direction which represents the beginning of the downstroke. Stated differently, the upstroke begins, or starts, gently or gradually.

In some embodiments, the speed of the downstroke gradually decelerates (that is, there is provided a gradual termination and/or gradual deceleration of the downstroke, over a period of at least 20, 30, 40, or 50 percent of the total time of the downstroke. Stated differently, the downstroke concludes, or ends, gently or gradually.

While in some embodiments there is an abrupt end, or abrupt deceleration, of the upstroke, and an abrupt beginning or acceleration of the downstroke (e.g., a rapid change in vector or direction of travel from upstroke to downstroke), it will be appreciated that gradual transitions may be introduced here as well (e.g., through introduction of a "plateau" or pause in travel between the upstroke and downstroke). It will also be appreciated that, while each reciprocating step may be consist of a single upstroke and downstroke, the reciprocation step may comprise a plurality of 2, 3, 4 or 5 or more linked set of reciprocations, which may e the same or different in frequent and/or amplitude In some embodiments, the vertically reciprocating step is carried out over a total time of from 0.01 or 0.1 seconds up to 1 or 10 seconds (e.g., per cycle of an upstroke and a downstroke).

In some embodiments, the upstroke distance of travel is from 0.02 or 0.2 millimeters (or 20 or 200 microns) to 1 or 10 millimeters (or 1000 to 10,000 microns). The distance of travel of the downstroke may be the same as, or less than, the distance of travel of the upstroke, where a lesser distance of travel for the downstroke serves to achieve the advancing of the carrier away from the build surface as the three-dimensional object is gradually formed. Where a reciprocation step comprises multiple linked reciprocations, the sum distance of travel of all upstrokes in that set is preferably greater than the sum distance of travel of all downstrokes in that set, to achieve the advancing of the carrier away from the build surface as the three-dimensional object is gradually formed.

Preferably the vertically reciprocating step, and particularly the upstroke thereof, does not cause the formation of gas bubbles or a gas pocket in the build region, but instead the build region remains filled with the polymerizable liquid throughout the reciprocation steps, and the gradient of polymerization zone or region remains in contact with the "dead zone" and with the growing object being fabricated throughout the reciprocation steps. As will be appreciated, a purpose of the reciprocation is to speed or enhance the refilling of the build region, particularly where larger build regions are to be refilled with polymerizable liquid, as compared to the speed at which the build region could be refilled without the reciprocation step.

In some embodiments, the advancing step is carried out intermittently at a rate of 1, 2, 5 or 10 individual advances per minute up to 300, 600, or 1000 individual advances per minute, each followed by a pause during which an irradiating step is carried out. It will be appreciated that one or more reciprocation steps (e.g., upstroke plus downstroke) may be carried out within each advancing step. Stated differently, the reciprocating steps may be nested within the advancing steps.

In some embodiments, the individual advances are carried out over an average distance of travel for each advance of from 10 or 50 microns to 100 or 200 microns (optionally including the total distance of travel for each vertically reciprocating step, e.g., the sum of the upstroke distance minus the downstroke distance).

Apparatus for carrying out the invention in which the reciprocation steps described herein are implemented substantially as described above, with the drive associated with the carrier, and/or with an additional drive operatively associated with the transparent member, and with the controller operatively associated with either or both thereof and configured to reciprocate the carrier and transparent member with respect to one another as described above.

In the alternative, vertical reciprocation may be carried out by configuring the build surface (and corresponding build plate) so that it may have a limited range of movement up and down in the vertical or "Z" dimension, while the carrier advances (e.g., continuously or step-wise) away from the build plate in the vertical or "Z" dimension. In some embodiments, such limited range of movement may be passively imparted, such as with upward motion achieved by partial adhesion of the build plate to the growing object through a viscous polymerizable liquid, followed by downward motion achieved by the weight, resiliency, etc. of the build plate (optionally including springs, buffers, shock absorbers or the like, configured to influence either upward or downward motion of the build plate and build surface). In another embodiment, such motion of the build surface may be actively achieved, by operatively associating a separate drive system with the build plate, which drive system is also operatively associated with the controller, to separately achieve vertical reciprocation. In still another embodiment, vertical reciprocation may be carried out by configuring the build plate, and/or the build surface, so that it flexes upward and downward, with the upward motion thereof being achieved by partial adhesion of the build surface to the growing object through a viscous polymerizable liquid, followed by downward motion achieved by the inherent stiffness of the build surface biasing it or causing it to return to a prior position.

It will be appreciated that illumination or irradiation steps, when intermittent, may be carried out in a manner synchronized with vertical reciprocation, or not synchronized with vertical reciprocation, depending on factors such as whether the reciprocation is achieved actively or passively.

It will also be appreciated that vertical reciprocation may be carried out between the carrier and all regions of the build surface simultaneously (e.g., where the build surface is rigid), or may be carried out between the carrier and different regions of the build surface at different times (e.g., where the build surface is of a flexible material, such as a tensioned polymer film).

6. Increased Speed of Fabrication by Increasing Light Intensity.

In general, it has been observed that speed of fabrication can increase with increased light intensity. In some embodiments, the light is concentrated or "focused" at the build region to increase the speed of fabrication. This may be accomplished using an optical device such as an objective lens.

The speed of fabrication may be generally proportional to the light intensity. For example, the build speed in millimeters per hour may be calculated by multiplying the light intensity in milliWatts per square centimeter and a multiplier. The multiplier may depend on a variety of factors, including those discussed below. A range of multipliers, from low to high, may be employed. On the low end of the range, the multiplier may be about 10, 15, 20 or 30. On the high end of the multiplier range, the multiplier may be about 150, 300, 400 or more.

The relationships described above are, in general, contemplated for light intensities of from 1, 5 or 10 milliWatts per square centimeter, up to 20 or 50 milliWatts per square centimeter.

Certain optical characteristics of the light may be selected to facilitate increased speed of fabrication. By way of example, a band pass filter may be used with a mercury bulb light source to provide 365±10 nm light measured at Full Width Half Maximum (FWHM). By way of further example, a band pass filter may be used with an LED light source to provide 375±15 nm light measured at FWHM.

As noted above, polymerizable liquids used in such processes are, in general, free radical polymerizable liquids with oxygen as the inhibitor, or acid-catalyzed or cationically polymerizable liquids with a base as the inhibitor. Some specific polymerizable liquids will of course cure more rapidly or efficiently than others and hence be more amenable to higher speeds, though this may be offset at least in part by further increasing light intensity.

At higher light intensities and speeds, the "dead zone" may become thinner as inhibitor is consumed. If the dead zone is lost then the process will be disrupted. In such case, the supply of inhibitor may be enhanced by any suitable means, including providing an enriched and/or pressurized atmosphere of inhibitor, a more porous semipermeable member, a stronger or more powerful inhibitor (particularly where a base is employed), etc.

In general, lower viscosity polymerizable liquids are more amenable to higher speeds, particularly for fabrication of articles with a large and/or dense cross section (although this can be offset at least in part by increasing light intensity). Polymerizable liquids with viscosities in the range of 50 or 100 centipoise, up to 600, 800 or 1000 centipoise or more (as measured at room temperature and atmospheric pressure with a suitable device such as a HYDRAMOTION REACTAVISC™ Viscometer (available from Hydramotion Ltd, 1 York Road Business Park, Malton, York YO17 6YA England). In some embodiments, where necessary, the viscosity of the polymerizable liquid can advantageously be reduced by heating the polymerizable liquid, as described above.

In some embodiments, such as fabrication of articles with a large and/or dense cross-section, speed of fabrication can be enhanced by introducing reciprocation to "pump" the polymerizable liquid, as described above, and/or the use of feeding the polymerizable liquid through the carrier, as also described above, and/or heating and/or pressurizing the polymerizable liquid, as also described above.

7. Tiling.

It may be desirable to use more than one light engine to preserve resolution and light intensity for larger build sizes. Each light engine may be configured to project an image (e.g., an array of pixels) into the build region such that a plurality of "tiled" images are projected into the build region. As used herein, the term "light engine" can mean an assembly including a light source, a DLP device such as a digital micromirror device and an optical device such as an objective lens. The "light engine" may also include electronics such as a controller that is operatively associated with one or more of the other components.

In some embodiments, a configuration with the overlapped images is employed with some form of "blending" or "smoothing" of the overlapped regions as generally discussed in, for example, U.S. Pat. Nos. 7,292,207, 8,102,332, 8,427,391, 8,446,431 and U.S. Patent Application Publication Nos. 2013/0269882, 2013/0278840 and 2013/0321475, the disclosures of which are incorporated herein in their entireties.

The tiled images can allow for larger build areas without sacrificing light intensity, and therefore can facilitate faster build speeds for larger objects. It will be understood that more than two light engine assemblies (and corresponding tiled images) may be employed. Various embodiments of the invention employ at least 4, 8, 16, 32, 64, 128 or more tiled images.

8. Fabrication in Multiple Zones.

As noted above, embodiments of the invention may carry out the formation of the three-dimensional object through multiple zones or segments of operation. Such a method generally comprises:

(a) providing a carrier and an optically transparent member having a build surface, the carrier and the build surface defining a build region therebetween, with the carrier positioned adjacent and spaced apart from the build surface at a start position; then (b) forming an adhesion segment of the three-dimensional object by:
  (i) filling the build region with a polymerizable liquid,
  (ii) irradiating the build region with light through the optically transparent member (e.g., by a single exposure), while
  (iii) maintaining the carrier stationary or advancing the carrier away from the build surface at a first cumulative rate of advance, to thereby form from the polymerizable liquid a solid polymer adhesion segment of the object adhered to the carrier; then (c) optionally but preferably forming a transition segment of the three dimensional object by
  (i) filling the build region with a polymerizable liquid,
  (ii) continuously or intermittently irradiating the build region with light through the optically transparent member, and
  (iii) continuously or intermittently advancing (e.g., sequentially or concurrently with the irradiating step) the carrier away from the build surface at a second cumulative rate of advance to thereby form from the polymerizable liquid a transition segment of the object between the adhesion segment and the build surface;
  wherein the second cumulative rate of advance is greater than the first cumulative rate of advance; and then (d) forming a body segment of the three dimensional object by:
(i) filling the build region with a polymerizable liquid,
(ii) continuously or intermittently irradiating the build region with light through the optically transparent, and
(iii) continuously or intermittently advancing (e.g., sequentially or concurrently with the irradiating step) the carrier away from the build surface at a third cumulative rate of advance, to thereby form from the polymerizable liquid a body segment of the object between the transition segment and the build surface;
wherein the third cumulative rate of advance is greater than the first and/or the second cumulative rate of advance.

Note that the start position can be any position among a range of positions (e.g., a range of up to 5 or 10 millimeters or more), and the irradiating step (b)(ii) is carried out at an intensity sufficient to adhere the solid polymer to the carrier when the carrier is at any position within that range of positions. This advantageously reduces the possibility of failure of adhesion of the three-dimensional object to the carrier due to variations in uniformity of the carrier and/or build surfaces, variations inherent in drive systems in positioning the carrier adjacent the build surface, etc.

9. Fabrication with Intermittent (or Strobe") Illumination.

As noted above, in some embodiments the invention may be carried out with the illumination in intermittent periods or burst. In one embodiment, such a method comprises:
providing a carrier and an optically transparent member having a build surface, the carrier and the build surface defining a build region therebetween;
filling the build region with a polymerizable liquid,
intermittently irradiating the build region with light through the optically transparent member to form a solid polymer from the polymerizable liquid,
continuously advancing the carrier away from the build surface to form the three-dimensional object from the solid polymer.

Another embodiment of such a mode of operation comprises:
providing a carrier and an optically transparent member having a build surface, the carrier and the build surface defining a build region therebetween;
filling the build region with a polymerizable liquid,
intermittently irradiating the build region with light through the optically transparent member to form a solid polymer from the polymerizable liquid,
continuously or intermittently advancing (e.g., sequentially or concurrently with the irradiating step) the carrier away from the build surface to form the three-dimensional object from the solid polymer.

In some embodiments, the intermittently irradiating comprises alternating periods of active and inactive illumination, where the average duration of the periods of active illumination is less than the average duration of the periods of inactive illumination (e.g., is not more than 50, 60, or 80 percent thereof).

In other embodiments, the intermittently irradiating comprises alternating periods of active and inactive illumination, where the average duration of the periods of active illumination is the same as or greater than the average duration of the periods of inactive illumination (e.g., is at least 100, 120, 160, or 180 percent thereof).

Examples of such modes of operation are given further below. These features may be combined with any of the other features and operating steps or parameters described herein.

10. Fabrication of Body Segment by Multiple Operating Modes.

Operating modes (that is, the pattern defining the manner of irradiating and advancing) may be changed in the course of fabricating a three dimensional object (i.e., the major portion, or "body portion", thereof), to best suit the particular geometry of each contiguous segment of that three-dimensional object, particularly as that geometry changes during the course of fabrication.

In general, base and transition zones may still be fabricated as described above, as the preferred foundation for the body of that object during fabrication thereof.

Horizontal portions of the three, dimensional object, abrupt changes in cross section, and converging or diverging elements of the three dimensional object, may be fabricated in a reciprocal or oscillatory operating mode, for example, to eliminate surface defects, such as pitting, and speed or enhance resin replenishment to the build region.

Vertical and thin-walled sections of the three dimensional object, and fragile elements or fine features thereof, can be fabricated in a continuous operating mode. In some embodiments, continuous mode is least concussive of the various operating modes, and hence is better suited to fabricating segments of three-dimensional objects with complex or delicate geometries (though this may be influenced by the choice of materials for the build surface—that is, rigid vs. flexible).

Feathering, or gradual transitioning of operating mode parameters, may be included in the course of changing operating modes (that is, between one operating mode and a subsequent operating mode). For example, in an intra-oscillatory build: oscillatory parameters are driven by enabling resin flow and allow time for the resin level in the build area to equilibrate—for thinner cross-sections, one can use a lower oscillation height, faster oscillation speeds, and/or smaller delay time to replenish resin, while the opposite is true for thicker cross-sections.

In feathering from an reciprocal (or oscillatory) to continuous operating mode: A pause following oscillatory mode, ramp in continuous speed from 10 mm/hr to standard continuous speed as analog to transition zone, effective dosage to initial slices drops from "over-exposed" (allowing proper adhesion) to the recommended dosage.

In feathering from continuous to oscillatory: initial oscillation displacement following transition accounts for area of last exposed continuous frame, e.g. high oscillation displacement for large cross-section and vice versa. Dosage for initial frames can be constant or ramped from high to low.

In an alternative to changing operating modes (or in combination with changing operating modes), the parameters of an operating mode can be changed during formation of the three-dimensional object. Examples of parameters that can be changed include, for example, frequency of irradiating, intensity of irradiating, duration of irradiating, duty cycle of irradiating, rate of advancing, lead time prior to irradiating, lag time following irradiating, step height, pump height, step or pump duration, or frequency of stepwise or reciprocal advancing. For example:
greater pump height may be preferred for fabricating a dense portion or segments of an object (such as a completely solid portion, or a dense foam or lattice portion);

greater pump speed may be preferred for a sparse (or less dense) segment or portion of an object, such as a hollow, mesh-filled, open foam or open lattice portion of an object; and decreased lead and lag times may be preferred when overall speed or rate of formation is increased.

Additional reasons for varying such parameters are indicated above and below.

It will be appreciated that the pattern of exposure may be changed in the course of fabrication, e.g., from slice to slice, to alter the geometry of external surfaces of the three-dimensional object, to alter the geometry of internal surfaces of the three dimensional object for structural purposes, to alter the geometry of internal surfaces of the object to change micro-structure or material properties of the object (e.g., in the formation of a regular or irregular mesh, lattice, or foam (including open and closed cell foams), to maintain or alter flow of the polymerizable liquid to the build region, etc. In addition, in the present invention, slice thickness may advantageously be varied, as discussed further below.

11. Varying Slice Thickness.

As noted above, the methods and processes described herein advantageously accommodate input in varying slice thickness, rather than a fixed slice thickness, during formation of a three-dimensional object, allowing the operation of the methods and apparatus to be simplified, and particularly for electronic or computer-generated instructions to the apparatus for carrying out the method to be simplified. For example, for an object that includes both finely detailed portions as well as less detailed portions, or relatively constant portions, slice thickness can be thinner for the detailed portions, and thicker for the relatively constant portions.

The number of times slice thickness is changed will depend upon factors such as the object material and properties, geometry, tensile or other material properties, tolerances, etc. There are no particular limits, and hence in some embodiments, slice thickness may be changed at least 2, 4, 8 or 10 times during formation of the object or object body body portion (and optionally up to 100 or 1000 times, or more). Note that every change may not be to a different slice thickness, but may in some instances be a reversion to a previous (but not the immediately previous) slice thickness.

For example, in some embodiments, changing may be between: at least one slice having a thickness of less than 2 or 4 microns; optionally at least one slice having a thickness between 40 and 80 microns; and at least one slice having a thickness of more than 200, 400 or 600 microns.

In some embodiments, changing may be between: at least one slice having a thickness of less than 2 or 4 microns; and at least one slice having a thickness of more than 40 or 80 microns.

In some embodiments, the changing may be between at least one slice having a thickness of less than 20 or 40 microns; optionally at least one slice having a thickness between 60 and 80 microns; and at least one slice having a thickness of more than 200, 400, or 600 microns.

In some embodiments, the changing may be between at least a first thin slice and a second thicker slice, wherein said second slice has a thickness at least 5, 10, 15 or 20 times greater than said first slice.

In some embodiments, the changing is between at least a first plurality (e.g., at least 2, 5, 10 or 20) of contiguous thin slices and a second thicker slice, wherein each of said thin slices is different from one another, and wherein said second thicker slice has a thickness at least 5, 10, 15 or 20 times greater than each of said plurality of thin slices.

Variation of slice thickness may be implemented in any operating mode, as discussed further below, and in combination with changing operating modes in the course of fabricating a particular three-dimensional object, as also discussed further below.

12. Fabrication Products.

Three-dimensional products produced by the methods and processes of the present invention may be final, finished or substantially finished products, or may be intermediate products subject to further manufacturing steps such as surface treatment, laser cutting, electric discharge machining, etc., is intended. Intermediate products include products for which further additive manufacturing, in the same or a different apparatus, may be carried out). For example, a fault or cleavage line may be introduced deliberately into an ongoing "build" by disrupting, and then reinstating, the gradient of polymerization zone, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

Thus in some embodiments the product can have a height of from 0.1 or 1 millimeters up to 10 or 100 millimeters, or more, and/or a maximum width of from 0.1 or 1 millimeters up to 10 or 100 millimeters, or more. In other embodiments, the product can have a height of from 10 or 100 nanometers up to 10 or 100 microns, or more, and/or a maximum width of from 10 or 100 nanometers up to 10 or 100 microns, or more. These are examples only: Maximum size and width depends on the architecture of the particular device and the resolution of the light source and can be adjusted depending upon the particular goal of the embodiment or article being fabricated.

In some embodiments, the ratio of height to width of the product is at least 2:1, 10:1, 50:1, or 100:1, or more, or a width to height ratio of 1:1, 10:1, 50:1, or 100:1, or more.

In some embodiments, the product has at least one, or a plurality of, pores or channels formed therein, as discussed further below.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerizable liquid); in some embodiments, the products are composites (that is, formed of two or more different polymerizable liquids). Particular properties will be determined by factors such as the choice of polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next pattern is exposed, is substantially reduced. Hence, in some embodiments the methods are particularly advantageous in reducing, or eliminating, the number of support structures for such overhangs that are fabricated concurrently with the article.

13. Additional Build Plate Materials

Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nafion® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Michigan (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

14. Additional Build Plate Materials

In some embodiments, enrichment of the atmosphere with a polymerization inhibitor, such as oxygen, may be used. For example, an oxygen enriched source may be used, for example, to maintain a high oxygen partial pressure despite a reduced total gas pressure under the build plate or to enable less permeable build windows while still permitting sufficient oxygen or other polymerization inhibitor to be present in the build region.

15. Buildplate Coatings

Omniphobic surfaces may be used on the build plate surface or build region. For example, patterned surfaces (either a random array of particles or micro patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

16. Build Plate Flexible Layers

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used, either alone (with a tensioning member or "drum head" configuration) or placed on top of another, strengthening substrate, such as class. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers. Glassine paper is substantially grease resistant, and may have limited adhesion to the polymerizable liquid described herein.

17. Build Plates having Lighting Panels

Figure 22:
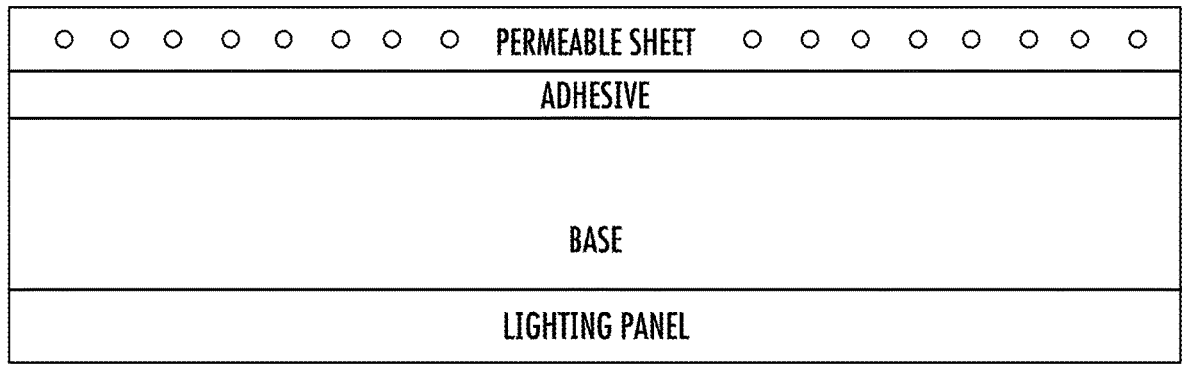
FIG. 22 is a side cross sectional view of a build plate with a permeable sheet having channels therein according to some embodiments.
Figure 23:
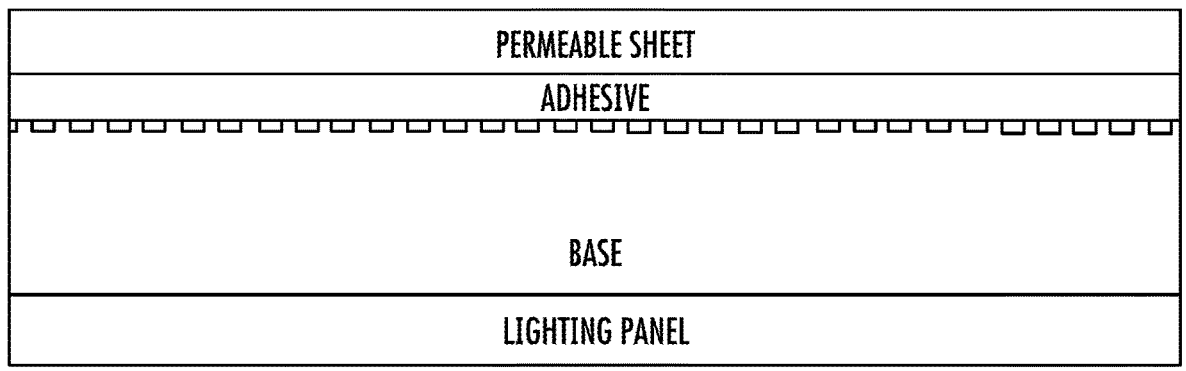
FIG. 23 is a side cross sectional view of a build plate with a patterned base layer and a lighting panel according to some embodiments.
Figure 24:
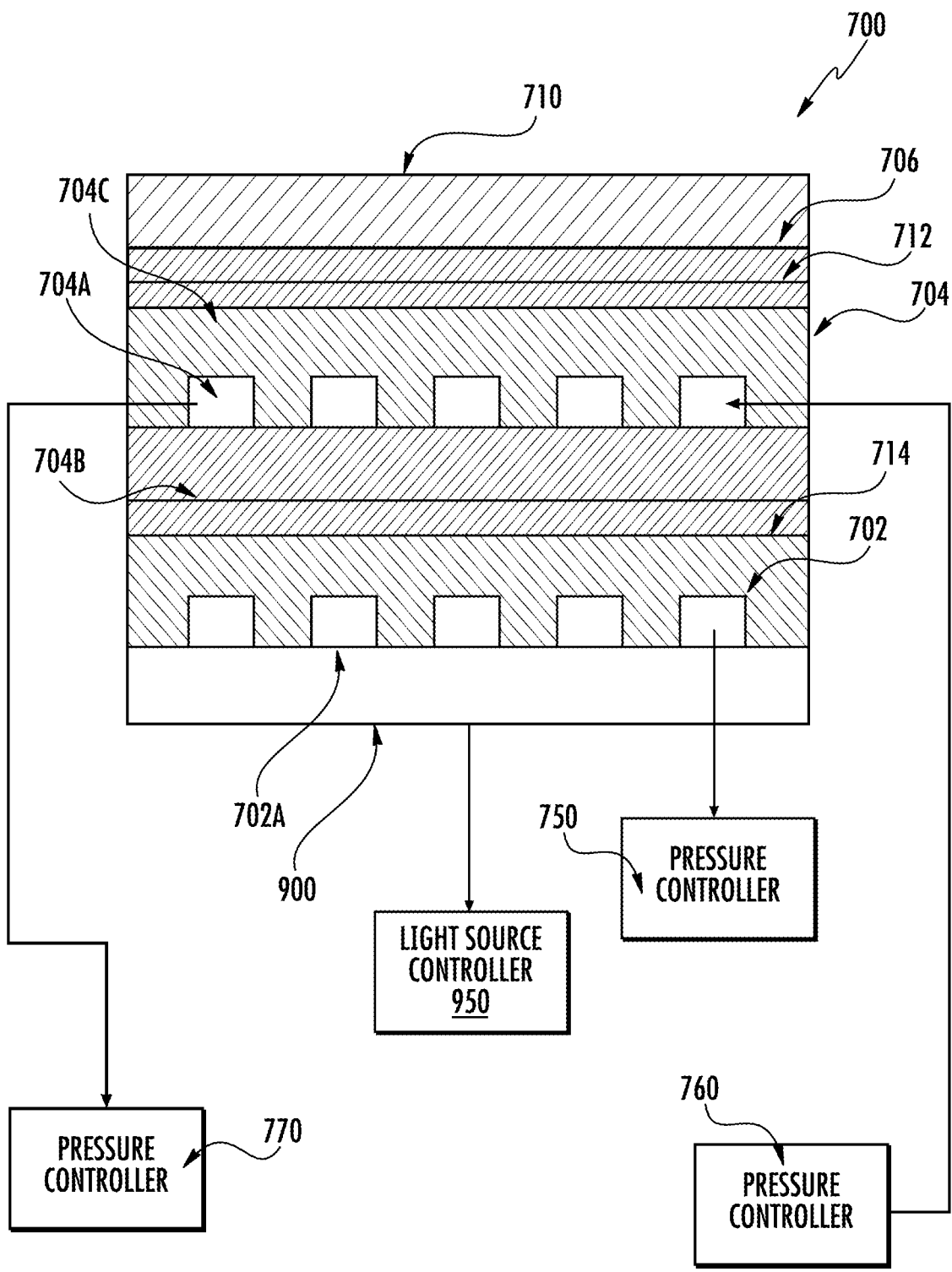
FIG. 24 is a side cross sectional view of a build plate with channel layers and a lighting panel according to some embodiments.
Figure 25:
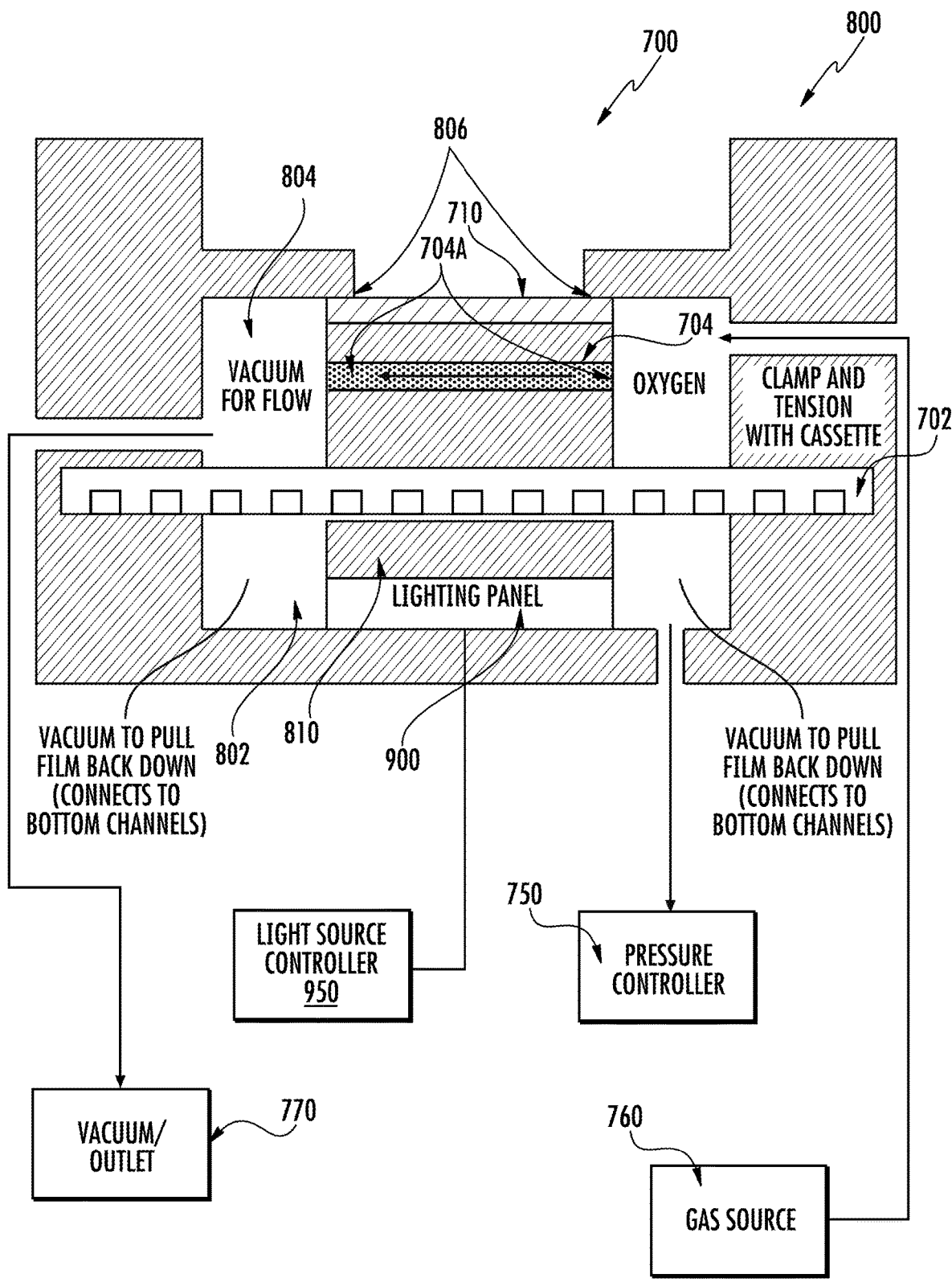
FIG. 25 is a side cross sectional view of a build plate with channel layers and a lighting panel according to some embodiments.

FIG. 2 illustrates a 3D printing device with a digital light processing (DLP) system as a light source, however, in some embodiments, lighting panel light sources may be used. In particular, a bottom layer of the build plate, such as the base layer in the build plates shown in FIG. 22-25, may be used as a display screen of a lighting panel to irradiate resin in the build region. For example, as illustrated in FIG. 22-23, the base layer of the build plate formed may be used to form a screen of a lighting panel. In some embodiments, the base layer may be omitted, and the lighting panel may provide similar functionality and support as the base layer. As illustrated in FIGS. 24-25, a lighting panel 900 may be positioned on the bottom portion of a base layer and be connected to a light source controller 950.

As illustrated in FIGS. 22-23, a build plate may include a lighting panel, a base layer, an adhesive layer and a permeable sheet. Channels may be formed in the permeable sheet (FIG. 22) or in the base layer (FIG. 23) to increase oxygen flow to the build surface. According to some embodiments, the build plate may be configured to allow a polymerization inhibitor to reach the build surface. In particular, the build plate includes a rigid, optically transparent, gas-impermeable planar base having upper and lower surfaces, and an optically transparent sheet having upper and lower surfaces such that the sheet lower surface is positioned on the base upper surface. The base upper surface and/or the sheet lower surface have a surface topology that increases gas flow to the gas permeable sheet. For example, the surface topology may include a surface roughness (a random "rough" surface or a pattern of features or channels) that maintains a sufficient gap between the base and the sheet such that a polymerization inhibitor may flow through the gap through the permeable sheet and to the build surface. In some embodiments, the surface topology may reduce or prevent surface wetting or sticking between the base and the sheet. In this configuration, a relatively thin, flexible permeable sheet may be used. The rigid base may serve to stabilize the flexible sheet and/or reduce or prevent warping or bowing, particularly in the lower direction, during three-dimensional object fabrication. The surface topology may be configured to sufficiently maintain an optical pathway of radiation passing through the window (e.g., by limiting any optical blocking or scattering) so as to minimize any effects on the resolution of the three-dimensional object fabrication. The sheet may be held against the plate by one or more clamps along the periphery or a "drum head" configuration. The surface a rougher surface would typically result in greater scattering angles than a smoother surface. In some embodiments, the optical scattering angle at all points along the longitudinal area of the sheet (e.g., due to the uneven surface topology of the channels or other features) is less than 20%, 10%, 5.0% or 1.0%.

The rigid base and flexible sheet can be made of any suitable material that is optically transparent at the relevant wavelengths (or otherwise transparent to the radiation source, whether or not it is visually transparent as perceived by the human eye—i.e., an optically transparent window may in some embodiments be visually opaque). In some embodiments, the rigid base is impermeable with respect to the polymerization inhibitor.

In some embodiments, the flexible sheet may be formed from a thin film or sheet of material which is flexible when separated from the apparatus of the invention, but which is clamped and tensioned when installed in the apparatus (e.g., with a tensioning ring) so that it is rendered rigid in the apparatus. Polymer films are preferably fluoropolymer films, such as an amorphous thermoplastic fluoropolymer, in a thickness of 0.01 or 0.05 millimeters to 0.1 or 1 millimeters, or more. In some embodiments, Biogeneral Teflon AF 2400 polymer film, which is 0.0035 inches (0.09 millimeters) thick, and Random Technologies Teflon AF 2400 polymer film, which is 0.004 inches (0.1 millimeters) thick may be used. Tension on the film is preferably adjusted with a tension ring to about 10 to 100 pounds, depending on operating conditions such as fabrication speed.

Particular materials include TEFLON AF® fluoropolymers, commercially available from DuPont. Additional materials include perfluoropolyether polymers such as described in U.S. Pat. Nos. 8,268,446; 8,263,129; 8,158,728; and 7,435,495. For example, the sheet may include an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. Many other materials are also possible to use, as long as the flux of the polymerization inhibitor is adequate to attenuate the photopolymerization to create the dead zone. Other materials could include semicrystalline fluoropolymers, such as thin films (10-50 microns thick) of fluorinated ethylene propylene (FEP), paraformaldehyde (PFA), polyvinylidene fluoride (PVDF) or other materials known in the art. The permeability of these materials (FEP, PFA, PVDF) to the polymerization inhibitor oxygen may be lower than TEFLON AF, but with the attenuation of oxygen concentration, oxygen pressure, temperature, and light characteristics (wavelength, intensity), adequate creation of the dead zone may be achieved.

The adhesive layers described herein may be a gas-permeable adhesive, such as a poly(dimethylsiloxane) (PDMS) film (e.g., as a silicone transfer film adhesive that can be applied using a polyester release liner, such as ARseal™8026 (Adhesives Research, Glen Rock, PA (USA)). The adhesive layer is preferably an adhesive that is both gas-permeable and has good adhesive qualities with respect to the material of the base (e.g., glass, silicone, quartz, sapphire, polymer materials) and the material of the sheet (e.g., polymers described below). In this configuration, air flow may be permitted through the uneven surface topology (channels) of the base, and through the gas permeable adhesive and sheet.

As shown in FIGS. 22-23, lighting panels may be incorporated into the base layer or the base layer may be a display screen of the lighting panels.

As illustrated in FIG. 24, a build plate 700 for a three-dimensional printer is shown. The build plate 700 includes an optically transparent first channel layer 702, an optically transparent, gas permeable second channel layer on the first channel layer 704, and a flexible, optically transparent, gas-permeable sheet 706 having an upper and lower surface. The sheet upper surface forms a build surface 710 for forming a three-dimensional object. Adhesive layers 712 and 714 are between the channel layers 702 and 704, and between the channel layer 704 and the sheet 706, respectively. The channel layer 702 includes channels 702A that are fluidly connected to a pressure controller 720, and the channel layer 704 includes channels 704A that are fluidly connected to a gas source 760 on one side and a vacuum or outlet 770 on the other side. As illustrated, the channel layer 704 includes a planar portion 704B with a bottom surface that is adhered to the channel layer 702 by the adhesive layer 714 and a top surface. The channel layer 704 also includes a channel-defining portion 704C on the top surface of the planar portion 704B.

The sheet 706 may be formed of any suitable semipermeable or permeable material (that is, permeable to the polymerization inhibitor) including amorphous fluoropolymers as described herein. For example, the polymer film or polymer film layer may, for example, be a fluoropolymer film, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. The channel layer 704 may include a gas permeable or semipermeable material, such as a permeable polymer (e.g., poly(dimethylsiloxane) (PDMS). The thickness of the sheet 706 may be less than about 150 µm. The planar portion 704B and the channel-defining portion 704C may be adhered together by chemical bonding including oxidative treatments, including oxygen plasma treatments, UV ozone treatments and/or wet chemical treatments. The adhesive layer 714 may be gas-permeable adhesives, such as a poly(dimethylsiloxane) (PDMS) film. In this configuration, the gas source 760 may increase the flow through the channels 704A to the vacuum/outlet 770. The increased gas flow in the channels 704A may increase the flow of gas through the channel layer 704, the adhesive 712 and the sheet 706, which are gas permeable and may increase the gas polymerization inhibitor present on the build surface 710. For example, the gas source 760 may be an oxygen gas source or other gas for inhibiting polymerization at the build surface 710. Although the channels 702A and 704A are illustrated as being parallel to one another, it should be understood that the channels 702A and 704A may be generally orthogonal to one another to improve optical qualities of the build plate 700.

The build plate 700 may be sufficiently thin and/or flexible such that the build plate 700 may curve or bend. In some embodiments, the build plate 700 has a thickness of between 10, 20, 30, 50, 100, 200, 300, 400, 500, 600, 700, 800, 900 microns and 1, 2, 3, 4, 5, 6, 7, 8, 9 or 10 millimeters. In some embodiments, the build plate 700 has a Young's modulus of about 70-80 GPa and/or a Vickers Hardness of about 500-750 kgf/mm$^2$.

In some embodiments, the pressure controller 750 may increase or decrease the pressure in the channels 702A of the channel layer 702 such that the build plate 700 may be flexed upward (increased pressure) or downward (decreased pressure). The pressure controller 750 may be connected to the channels 702A by a chamber that includes the channels 702A as discussed with respect to FIG. 25 below. In some embodiments, the channels 702A may be fluidly connected to one another, for example, by a connecting channel or channels, such that a fluid connection between the pressure controller 750 and any one of the channels 702A may be sufficient to control the pressure in all of the channels 702A. Accordingly, the pressure in the channels 702A may be controlled by the pressure controller 750. As discussed above, the build plate 700 may be flexible. During the build, as the carrier/object moves away from the build surface 710, the build plate 700 flexes in an upward direction such as in the shape of a dome. As the build plate 700 continues to flex upward, the pressure controller 750 may reduce the pressure in the channels 702A to exert a downward force on the build plate 700 until the build plate 700 generally returns to and is pulled back to a generally planar position. When the build plate 700 returns to a planar position, the movement of the build plate 700 may aid in pulling additional polymerizable liquid (e.g., resin) into the build region under the object/carrier. Accordingly, the oscillation of the build plate 700 may be sufficient to enhance or speed a refilling of the build region with polymerizable liquid. In addition, the pressure controller 750 may increase the speed of oscillation and/or the force with which the build plate 700 moves from a dome-shaped or flexed position to the planar position, which may increase the flow of polymerizable liquid into the build region on the build surface 710.

In some embodiments, the pressure controller 750 may be capable of increasing and decreasing the pressure in the channels 702A above and below atmospheric pressure; however, the pressure controller 750 may also be provided by a vacuum pump that reduces pressure in the channels 702A, which exerts a reduced pressure on the bottom of the build plate 700 to increase the speed of oscillations and/or the force with which the build plate 700 returns from a position that is flexed upward to the planar position.

As illustrated in FIG. 25, the build plate 700 may be held in position to provide a build surface 710 for a three-dimensional printer by a housing 800. As illustrated, the channel layer 702 is wider than the other layers of the build plate 700 such that the channel layer 702 is held under tension by a clamp in the housing 800. When the build plate 700 is in the housing 800, the housing 800 forms a lower chamber 802 that is fluidly connected to the pressure controller 750 and an upper chamber 804 that is fluidly connected to the gas source 760 and vacuum/outlet 770. The upper and lower chambers 802 and 804 are separated by the channel layer 702. A sealing member 806, such as caulk or other sealing materials, may be provided on the edges of the upper surface of the build plate 700 at the intersection with the housing 800 to reduce or prevent polymerizable fluid (e.g., resin) from entering the chamber 804. A base 810 may be included in the lower chamber 802 to provide additional planar support to the build plate 700. The base 810 may be formed of sapphire, glass, polymer and/or quartz and positioned on a bottom surface of the channel layer 702.

In this configuration, the flow of a polymerization inhibitor gas from the gas source 760 to the vacuum/outlet 770 through the channels 704 may be increased and/or the pressure of the gas increased such that additional polymerization inhibitor reaches the build surface 710. In addition, flexing of the build plate 700 during the build may be controlled by the pressure controller 750 such that oscillations may be controlled or increased in frequency to increase the flow of polymerizable fluid to the build surface 710. These features may increase a build speed of a three-dimensional object due to an increased presence of a polymerization inhibitor gas at the build surface and an increase in oscillations to draw more polymerizable fluid to the build surface 710.

The lighting panel 900 may be a lighting panel with individually addressable radiation transmitting elements or pixels, and the lighting panel may be controlled by a lighting panel controller to form a desired lighting pattern on the build surface. In some embodiments, the lighting panel is an LCD panel or OLED panel. Plasma or CRT screens may also be used. The lighting panel may be a monochromatic panel, such as a monochromatic or grayscale LCD in which the sub-pixel color filters (R, G, and B) of a traditional color LCD are removed to increase the light intensity and increase build speed. The light source of the lighting panel may include an LED array or other suitable light source and may produce light in the ultraviolet range, such as about 300-450 nm or about 400 nm. Although conventional LCD screens typically use white light LEDs, in some embodiments the LED backlight source may be UV LED's. Diffusers and color filters may also be used to permit higher transmission of UV light in such a lighting panel.

Accordingly, the light panel light source may be integrated into the build plate of the 3D printing device. In some embodiments, lighting panel may irradiate the build surface as light is directly or nearly directly projected to the build surface substantially without magnification (e.g., with about a one-to-one magnification ratio), which may provide increased resolution and intensity of illumination as compared to projection systems.

In some embodiments, additional light guides may be added to the build plate to increase resolution on the build surface. Light guides or collimating structures, such as a micro-lens array or honeycomb structure, may be used, in particular, in embodiments in which an elastomeric layer or other layers are used to provide additional compliance of the build plate at the build surface or thicker build plates (e.g., greater than about 1-10 millimeters), which may introduce light distortion. Light guides may be formed in the build plate layer(s), such as in the elastomeric layer. For example, light guides in the build plate may correspond to individual pixels in the lighting panel to further guide light to the build surface. Stated otherwise, individual light guides may be formed in the build plate to align with pixels in the lighting panel.

The lighting panels described herein may be used with any suitable configuration of build plate. In some embodiments, the lighting panels may be integrated with the build plate such that the build plate bottom surface forms at least a portion of the lighting panel display screen or the lighting panel screen is affixed to the bottom surface of the build plate. Oxygen or other polymerization inhibitor(s) may be provided to the build surface by flow channels in the build plate as shown in FIGS. 22-25 or by other flow structures or materials, such as mesh layers or permeable layers. In some embodiments, a reduced pressure area may be formed below the build plate. The reduced pressure area may be greater on one side of the build plate and/or may oscillate in order to potentially cause movement of the top surface(s) of the build plate to increase resin flow to the build area and/or to increase air/oxygen/polymerization inhibitor flow to the build surface.

In some embodiments, heating/cooling elements may be used to further control the build process. As an example, conductive materials such as conductive nanoparticles may be used in one or more layers (the permeable sheet, the adhesive, the permeable channel layer, the elastomer layer and/or the base) to provide active heating of the build plate.

Heating of the build plate may in turn heat the resin and reduce the viscosity of the resin. A voltage may be applied to the conductive, transparent material to drive a current, and the conductive material may function as a resistive heater. See X. Gong, W. Wen, *Polydimethylsiloxane-based Conducting Composites and their Applications in Microfluidic Chip Fabrication*, Biomicrofluidics, 3, 012007 (2009) and U.S. Pat. No. 8,243,358, the disclosure of which is hereby incorporated by reference in its entirety.

Although some embodiments are described with respect to the build plates in FIGS. 22-25, lighting panels may be incorporated into any suitable build plate (e.g., the build plate base may serve as a screen of the lighting panel), or the lighting panels may be provided as a separate unit underneath the build plate. Additional examples of build plates may be found in U.S. Patent Publication Nos. 2016/0200052 and 2016/0193786 and International Publication Nos. WO2016/025579; WO2016/123506; and WO2016/123499, the disclosures of which are hereby incorporated by reference in their entireties.

The polymerization inhibitor gas may be supplied to the polymerizable liquid through the optically transparent member in various configurations as described herein.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure.

In some embodiments, the polymerizable fluid has a gradient of gas concentration, which determines an amount of irradiation or "dose" to cure the polymerizable liquid. For example, the polymerizable fluid can have a lower region on the optically transparent member, and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure. The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change, and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable fluid and the build plate is desirable, oxygen in the regions of the polymerization fluid that are further away from the interface may lead to a larger dosage of irradiation to cure the polymerizable fluid, which results in a longer exposure time and slower print speeds. Reducing the overall oxygen level may lead to faster cure times, by may lead to difficulty maintaining sufficient oxygen at the interface for the CLIP process to be effective. Moreover, since the light intensity decays as it passes through the polymerization fluid, the percent monomer to polymer conversions may not be constant throughout the exposed region. Controlling a level of oxygen concentration may reduce exposure times and increase print speeds by effectively maintaining a level of oxygen at the build plate and polymerization fluid interface. The oxygen concentration profile may also be controlled to provide more consistent percent monomer to polymer conversions in view of variations of light intensity.

While the present invention has been described in connection with polymerizable liquids, those skilled in the art will appreciate that the methods and apparatus described herein may be used with any suitable solidifiable liquid, including organic and inorganic materials. In some embodiments, "dual cure" polymerizable liquids (or "resins"), and methods that may be used in carrying out the present invention include, but are not limited to, those set forth in J. Rolland et al., Method of Producing Polyurethane Three-Dimensional Objects from Materials having Multiple Mechanisms of Hardening, PCT Publication No. WO 2015/200179 (published 30 Dec. 2015); J. Rolland et al., Methods of Producing Three-Dimensional Objects from Materials Having Multiple Mechanisms of Hardening, PCT Publication No. WO 2015/200173 (published 30 Dec. 2015); J. Rolland et al., Three-Dimensional Objects Produced from Materials Having Multiple Mechanisms of Hardening, PCT Publication No. WO/2015/200189 (published 30 Dec. 2015); J. Rolland et al., Polyurethane Resins Having Multiple Mechanisms of Hardening for Use in Producing Three-Dimensional Objects published 30 Dec. 2015); and J. Rolland et al., Method of Producing Three-Dimensional Objects from Materials having Multiple Mechanisms of Hardening, U.S. patent application Ser. No. 14/977,822 (filed 22 Dec. 2015); J. Rolland et al., Method of Producing Polyurethane Three-Dimensional Objects from Materials having Multiple Mechanisms of Hardening, U.S. patent application Ser. No. 14/977,876 (filed 22 Dec. 2015), J. Rolland et al., Three-Dimensional Objects Produced from Materials having Multiple Mechanisms of Hardening, U.S. patent application Ser. No. 14/977,938 (filed 22 Dec. 2015), and J. Rolland et al., Polyurethane Resins having Multiple Mechanisms of Hardening for Use in Producing Three-Dimensional Objects, U.S. patent application Ser. No. 14/977,974 (filed 22 Dec. 2015); the disclosures of all of which are incorporated by reference herein in their entirety.

While the present invention is preferably carried out by continuous liquid interphase polymerization, as described in detail above, in some embodiments alternate methods and apparatus for bottom-up three-dimension fabrication may be used, including layer-by-layer fabrication. Examples of such methods and apparatus include, but are not limited to, those described U.S. Pat. No. 7,438,846 to John and U.S. Pat. No. 8,110,135 to El-Siblani, and in U.S. Patent Application Publication Nos. 2013/0292862 to Joyce and 2013/0295212 to Chen et al. The disclosures of these patents and applications are incorporated by reference herein in their entirety.

The present invention is explained in greater detail in the following non-limiting Examples.

Example 1

Continuous Fabrication with Intermittent Irradiation and Advancing

Figure 6:
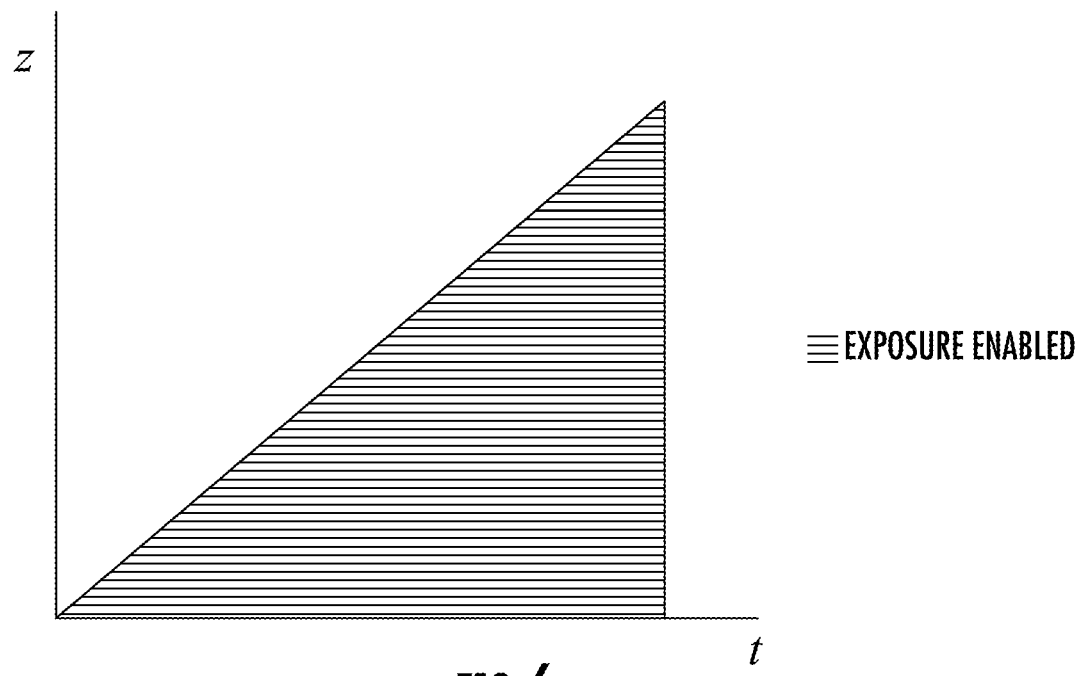
FIG. 6 is a graphic illustration of a process of the invention indicating the position of the carrier in relation to the build surface or plate, where both advancing of the carrier and irradiation of the build region is carried out continuously. Advancing of the carrier is illustrated on the vertical axis, and time is illustrated on the horizontal axis.

A process of the present invention is illustrated in FIG. 6, where the vertical axis illustrates the movement of the carrier away from the build surface. In this embodiment, the vertical movement or advancing step (which can be achieved by driving either the carrier or the build surface, preferably the carrier), is continuous and unidirectional, and the irradiating step is carried out continuously. Polymerization of the article being fabricated occurs from a gradient of polymerization or active surface, and hence creation of "layer by layer" fault lines within the article is minimized.

Figure 7:
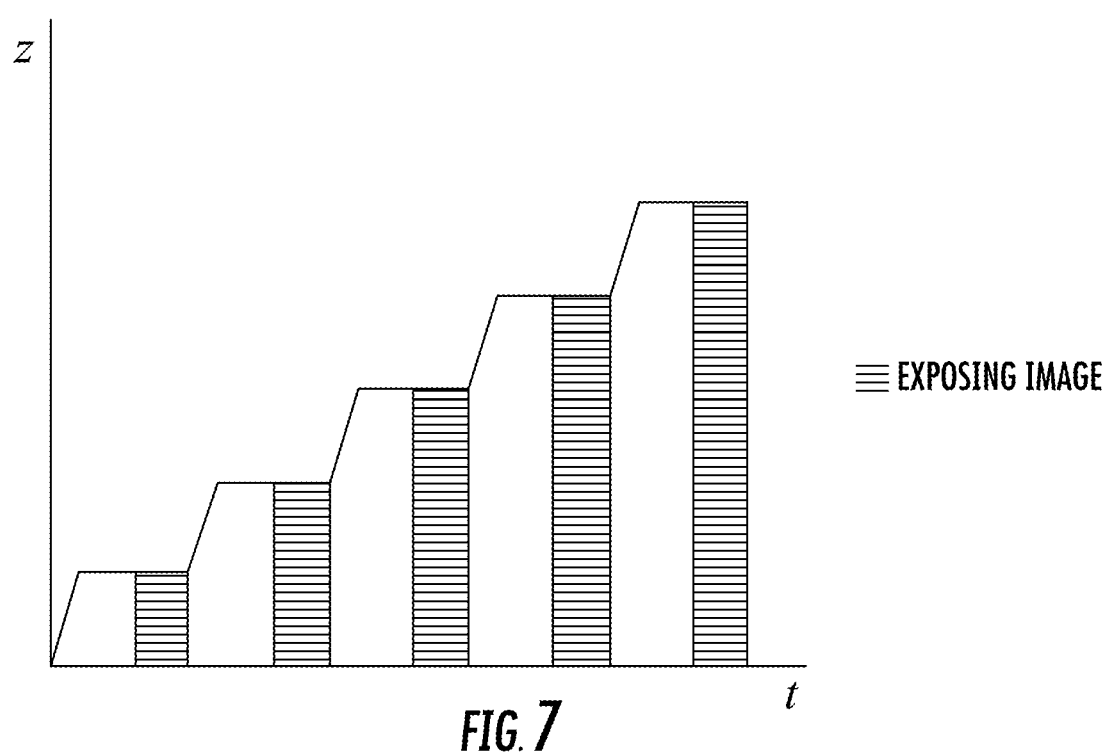
FIG. 7 is a graphic illustration of another process of the invention indicating the position of the carrier in relation to the build surface or plate, where both advancing of the carrier and irradiation of the build region is carried out stepwise, yet the dead zone and gradient of polymerization are maintained. Advancing of the carrier is again illustrated on the vertical axis, and time is illustrated on the horizontal axis.

An alternate embodiment of the present invention is illustrated in FIG. 7. In this embodiment, the advancing step is carried out in a step-by-step manner, with pauses introduced between active advancing of the carrier and build surface away from one another. In addition, the irradiating step is carried out intermittently, in this case during the pauses in the advancing step. We find that, as long as the inhibitor of polymerization is supplied to the dead zone in an amount sufficient to maintain the dead zone and the adjacent gradient of polymerization or active surface during the pauses in irradiation and/or advancing, the gradient of polymerization is maintained, and the formation of layers within the article of manufacture is minimized or avoided. Stated differently, the polymerization is continuous, even though the irradiating and advancing steps are not. Sufficient inhibitor can be supplied by any of a variety of techniques, including but not limited to: utilizing a transparent member that is sufficiently permeable to the inhibitor, enriching the inhibitor (e.g., feeding the inhibitor from an inhibitor-enriched and/or pressurized atmosphere), etc. In general, the more rapid the fabrication of the three-dimensional object (that is, the more rapid the cumulative rate of advancing), the more inhibitor will be required to maintain the dead zone and the adjacent gradient of polymerization.

Example 2

Figure 8:
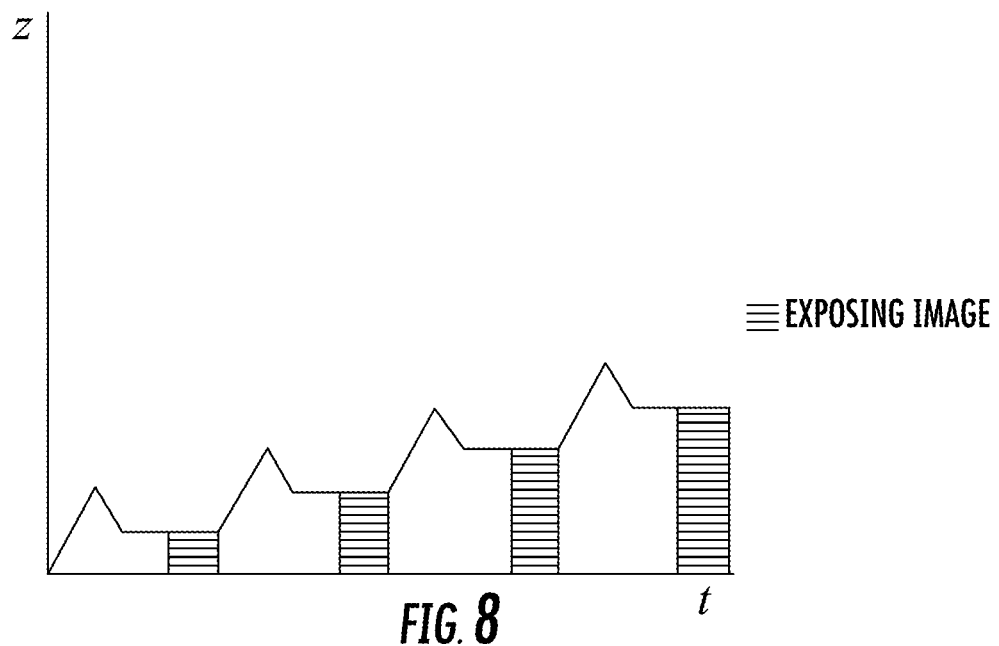
FIG. 8 is a graphic illustration of still another process of the invention indicating the position of the carrier in relation to the build surface or plate, where both advancing of the carrier and irradiation of the build region is carried out stepwise, the dead zone and gradient of polymerization are maintained, and a reciprocating step is introduced between irradiation steps to enhance the flow of polymerizable liquid into the build region. Advancing of the carrier is again illustrated on the vertical axis, and time is illustrated on the horizontal axis.

Continuous Fabrication with Reciprocation During Advancing to Enhance Filling of Build Region with Polymerizable Liquid A still further embodiment of the present invention is illustrated in FIG. 8. As in Example 10 above, this embodiment, the advancing step is carried out in a step-by-step manner, with pauses introduced between active advancing of the carrier and build surface away from one another. Also as in Example 1 above, the irradiating step is carried out intermittently, again during the pauses in the advancing step. In this example, however, the ability to maintain the dead zone and gradient of polymerization during the pauses in advancing and irradiating is taken advantage of by introducing a vertical reciprocation during the pauses in irradiation.

We find that vertical reciprocation (driving the carrier and build surface away from and then back towards one another), particularly during pauses in irradiation, serves to enhance the filling of the build region with the polymerizable liquid, apparently by pulling polymerizable liquid into the build region. This is advantageous when larger areas are irradiated or larger parts are fabricated, and filling the central portion of the build region may be rate-limiting to an otherwise rapid fabrication.

Reciprocation in the vertical or Z axis can be carried out at any suitable speed in both directions (and the speed need not be the same in both directions), although it is preferred that the speed when reciprocating away is insufficient to cause the formation of gas bubbles in the build region.

While a single cycle of reciprocation is shown during each pause in irradiation in FIG. 8, it will be appreciated that multiple cycles (which may be the same as or different from one another) may be introduced during each pause.

As in Example 1 above, as long as the inhibitor of polymerization is supplied to the dead zone in an amount sufficient to maintain the dead zone and the adjacent gradient of polymerization during the reciprocation, the gradient of polymerization is maintained, the formation of layers within the article of manufacture is minimized or avoided, and the polymerization/fabrication remains continuous, even though the irradiating and advancing steps are not.

Example 3

Figure 9:
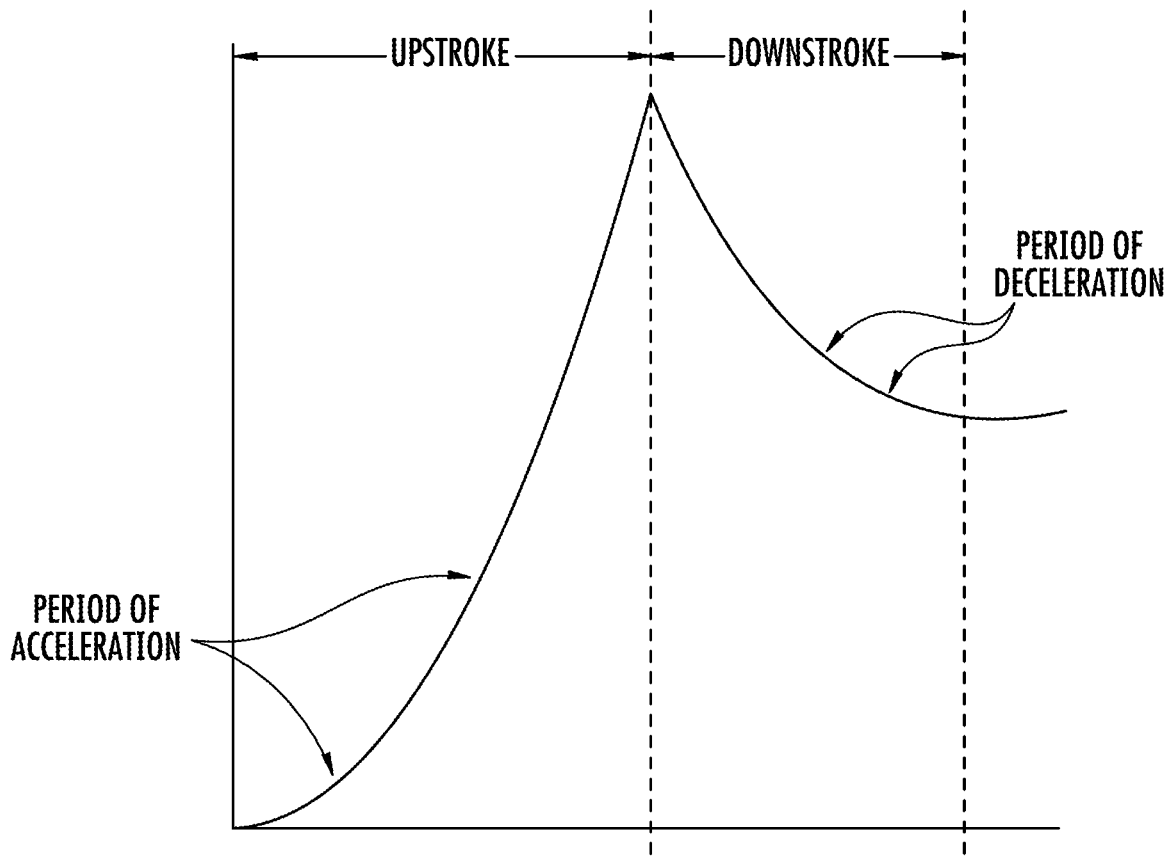
FIG. 9 is a detailed illustration of a reciprocation step of FIG. 8, showing a period of acceleration occurring during the upstroke (i.e., a gradual start of the upstroke) and a period of deceleration occurring during the downstroke (i.e., a gradual end to the downstroke).

Acceleration During Reciprocation Upstroke and Deceleration During Reciprocation Downstroke to Enhance Part Quality We observe that there is a limiting speed of upstroke, and corresponding downstroke, which if exceeded causes a deterioration of quality of the part or object being fabricated (possibly due to degradation of soft regions within the gradient of polymerization caused by lateral shear forces a resin flow). To reduce these shear forces and/or enhance the quality of the part being fabricated, we introduce variable rates within the upstroke and downstroke, with gradual acceleration occurring during the upstroke and gradual deceleration occurring during the downstroke, as schematically illustrated in FIG. 9.

Example 4

Fabrication in Multiple Zones

Figure 10:
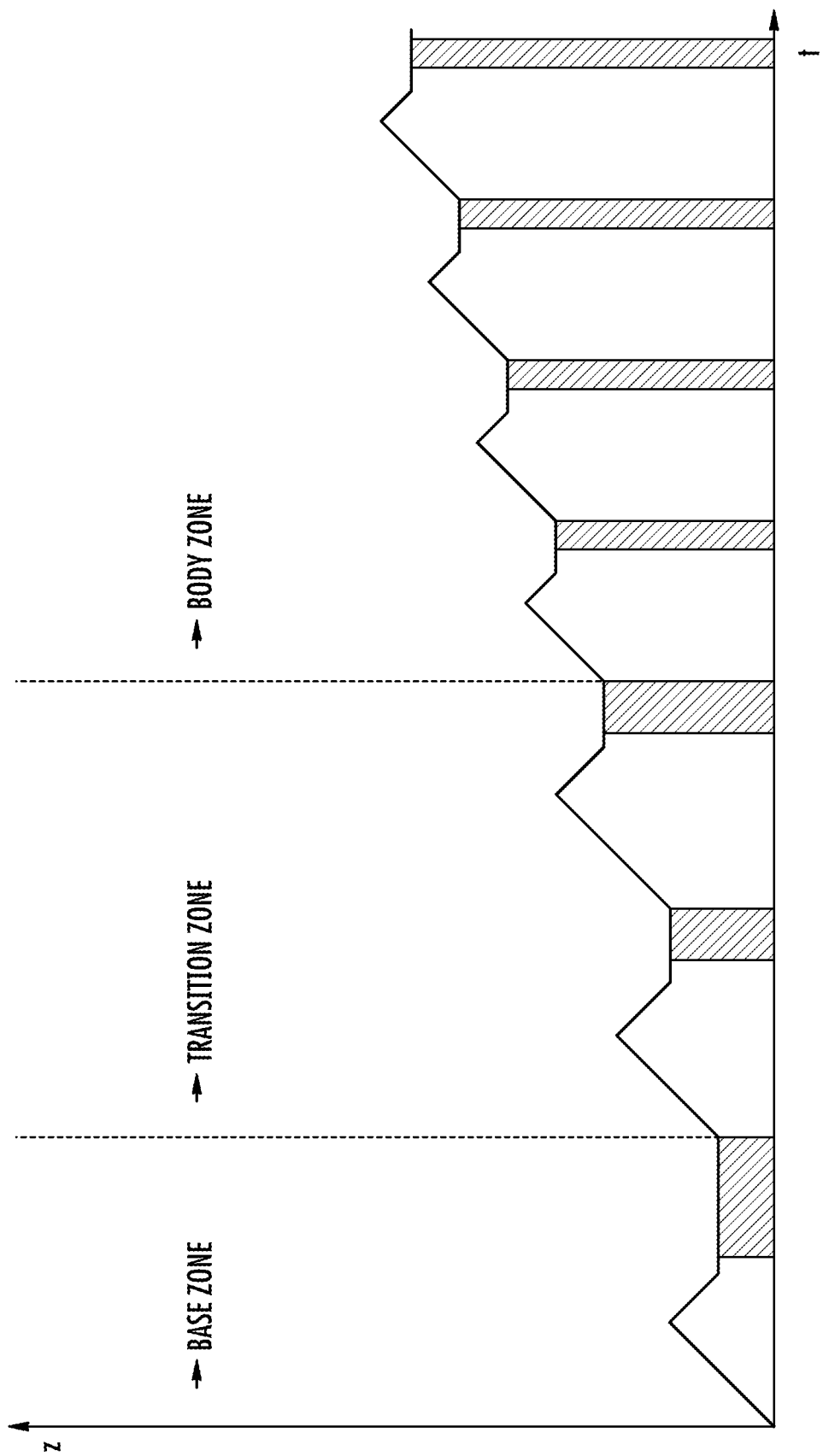
FIG. 10 schematically illustrates the movement of the carrier (z) over time (t) in the course of fabricating a three-dimensional object by processes of the present invention through a first base (or "adhesion") zone, a second transition zone, and a third body zone.

FIG. 10 schematically illustrates the movement of the carrier (z) over time (t) in the course of fabricating a three-dimensional object by methods as described above, through a first base (or "adhesion") zone, an optional second transition zone, and a third body zone. The overall process of forming the three-dimensional object is thus divided into three (or two) immediately sequential segments or zones. The zones are preferably carried out in a continuous sequence without pause substantial delay (e.g., greater than 5 or 10 seconds) between the three zones, preferably so that the gradient of polymerization is not disrupted between the zones.

The first base (or "adhesion") zone includes an initial light or irradiation exposure at a higher dose (longer duration and/or greater intensity) than used in the subsequent transition and/or body zones. This is to obviate the problem of the carrier not being perfectly aligned with the build surface, and/or the problem of variation in the positioning of the carrier from the build surface, at the start of the process, by insuring that the resin is securely polymerized to the carrier. Note an optional reciprocation step (for initial distributing or pumping of the polymerizable liquid in or into the build region) is shown before the carrier is positioned in its initial, start, position. Note that a release layer (not shown) such as a soluble release layer may still be included between the carrier and the initial polymerized material, if desired. In general, a small or minor portion of the three-dimensional object is produced during this base zone (e.g., less than 1, 2 or 5 percent by volume). Similarly, the duration of this base zone is, in general, a small or minor portion of the sum of the durations of the base zone, the optional transition zone, and the body zone (e.g., less than 1, 2 or 5 percent).

Immediately following the first base zone of the process, there is optionally (but preferably) a transition zone. In this embodiment, the duration and/or intensity of the illumination is less, and the displacement of the oscillatory step less, compared to that employed in the base zone as described above. The transition zone may (in the illustrated embodiment) proceed through from 2 or 5, up to 50 or more oscillatory steps and their corresponding illuminations. In general, an intermediate portion (greater than that formed during the base zone, but less than that formed of during the body zone), of the three dimensional object is produced during the transition zone (e.g., from 1, 2 or 5 percent to 10, 20 or 40 percent by volume). Similarly, the duration of this transition zone is, in general, greater than that of the base zone, but less than that of the body zone (e.g., a duration of from 1, 2 or 5 percent to 10, 20 or 40 percent that of the sum of the durations of the base zone, the transition zone, and the body zone (e.g., less than 1, 2 or 5 percent).

Immediately following the transition zone of the process (or, if no transition zone is included, immediately following the base zone of the process), there is a body zone, during which the remainder of the three-dimensional object is formed. In the illustrated embodiment, the body zone is carried out with illumination at a lower dose than the base zone (and, if present, preferably at a lower dose than that in the transition zone), and the reciprocation steps are (optionally but in some embodiments preferably) carried out at a smaller displacement than that in the base zone (and, if present, optionally but preferably at a lower displacement than in the transition zone). In general, a major portion, typically greater than 60, 80, or 90 percent by volume, of the three-dimensional object is produced during the transition zone. Similarly, the duration of this body zone is, in general, greater than that of the base zone and/or transition zone (e.g., a duration of at least 60, 80, or 90 percent that of the sum of the durations of the base zone, the transition zone, and the body zone).

Note that, in this example, the multiple zones are illustrated in connection with an oscillating mode of fabrication, but the multiple zone fabrication technique described herein may also be implemented with other modes of fabrication as illustrated further in the examples below (with the transition zone illustrated as included, but again being optional).

Example 5

Fabrication with Intermittent (or "Strobe") Illumination

The purpose of a "strobe" mode of operation is to reduce the amount of time that the light or radiation source is on or active (e.g., to not more than 80, 70, 60, 50, 40, or 30 percent of the total time required to complete the fabrication of the three-dimensional object), and increase the intensity thereof (as compared to the intensity required when advancing is carried out at the same cumulative rate of speed without such reduced time of active illumination or radiation), so that the overall dosage of light or radiation otherwise remains substantially the same. This allows more time for resin to flow into the build region without trying to cure it at the same time. The strobe mode technique can be applied to any of the existing general modes of operation described herein above, including continuous, stepped, and oscillatory modes, as discussed further below.

Figure 11A:
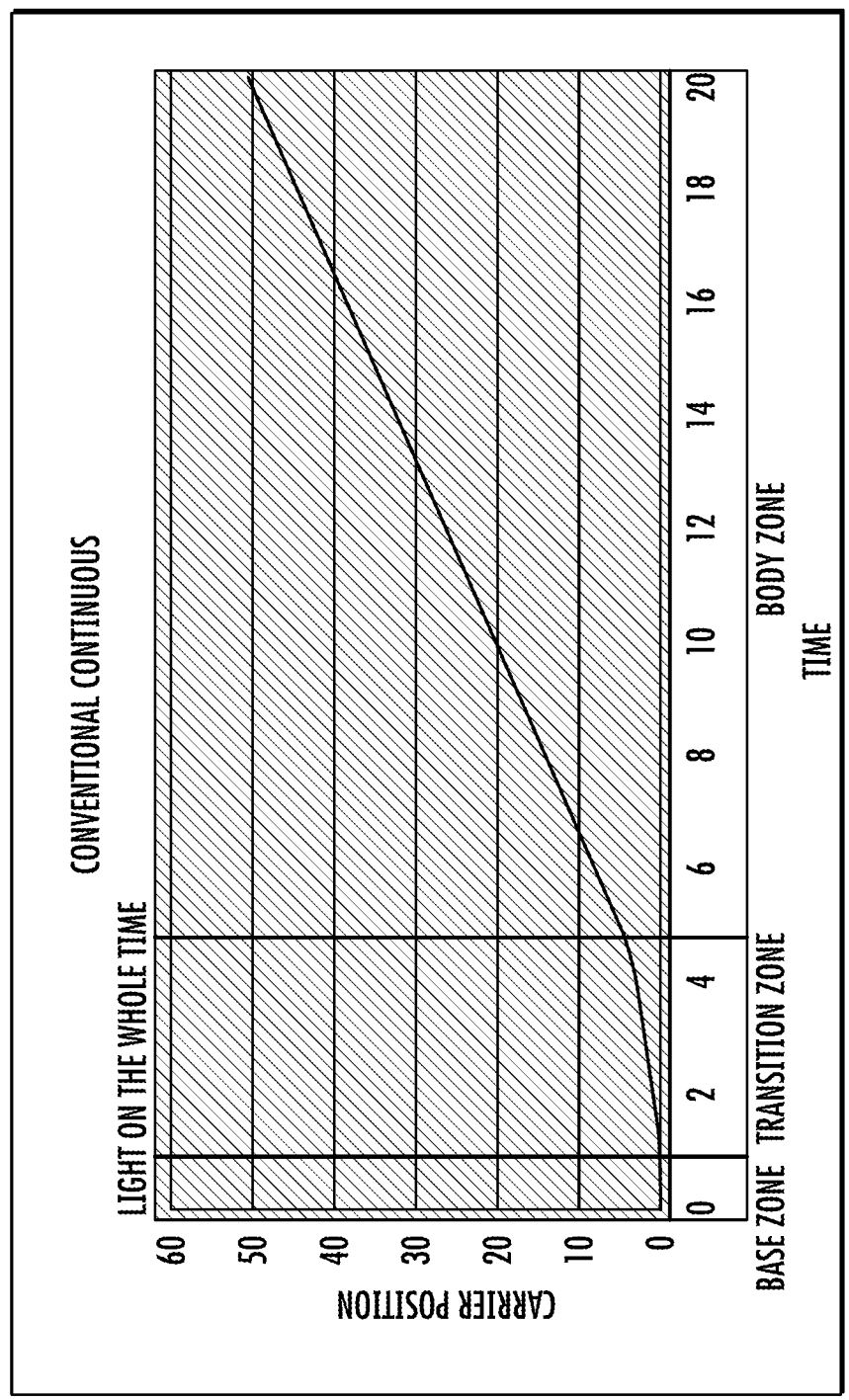
FIG. 11A schematically illustrates the movement of the carrier (z) over time (t) in the course of fabricating a three-dimensional object by continuous advancing and continuous exposure.

FIG. 11A schematically illustrates one embodiment of continuous mode. In the conventional continuous mode, an image is projected and the carrier starts to move upwards. The image is changed at intervals to represent the cross section of the three-dimensional object being produced corresponding to the height of the build platform. The speed of the motion of the build platform can vary for a number of reasons. As illustrated, often there is a base zone where the primary goal is to adhere the object to the build platform, a body zone which has a speed which is suitable for the whole object being produced, and a transition zone which is a gradual transition from the speed and/or dosages of the base zone to the speeds and/or dosages of the body zone. Note that cure is still carried out so that a gradient of polymerization, which prevents the formation of layer-by-layer fault lines, in the polymerizable liquid in the build region, is preferably retained, and with the carrier (or growing object) remaining in liquid contact with the polymerizable liquid, as discussed above.

Figure 11B:
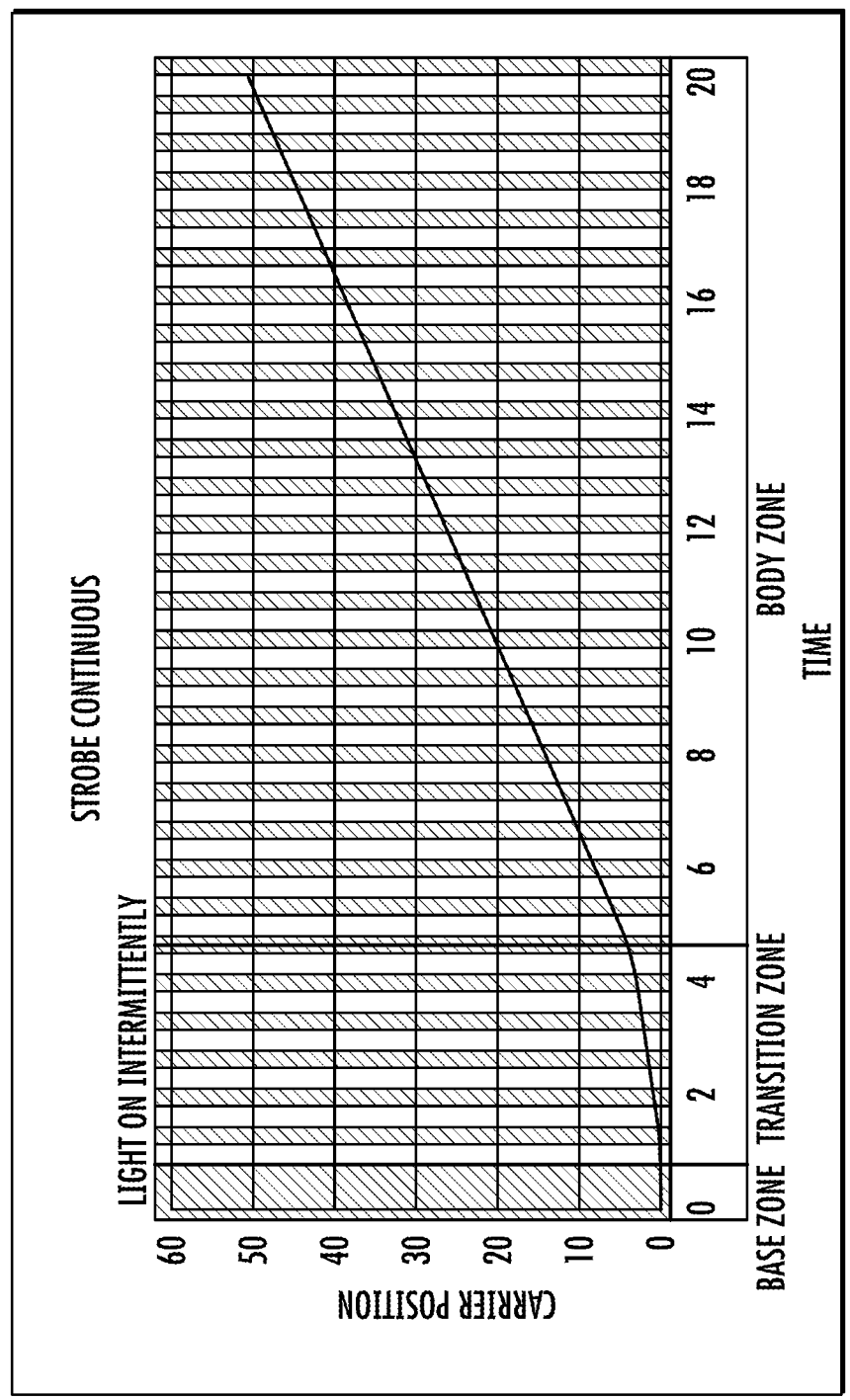
FIG. 11B illustrates the fabrication of a three-dimensional object in a manner similar to FIG. 11A, except that illumination is now in an intermittent (or "strobe") pattern.

FIG. 11B schematically illustrates one embodiment of strobe continuous mode. In strobe continuous the light intensity is increased but the image is projected in short flashes or intermittent segments. The increased intensity allows the resin to cure more quickly so that the amount of flow during cure is minimal. The time between flashes lets resin flow without being cured at the same time. This can reduce problems caused by trying to cure moving resin, such as pitting.

In addition, the reduced duty cycle on the light source which is achieved in strobe mode can allow for use of increased intermittent power. For example: If the intensity for the conventional continuous mode was 5 mW/cm$^2$ the intensity could be doubled to 10 mW/cm$^2$ and the time that the image is projected could be reduced to half of the time, or the intensity could be increased 5-fold to 25 mW/cm$^2$ and the time could be reduced to $\frac{1}{5}^{th}$ of the previous light on time.

Figure 12A:
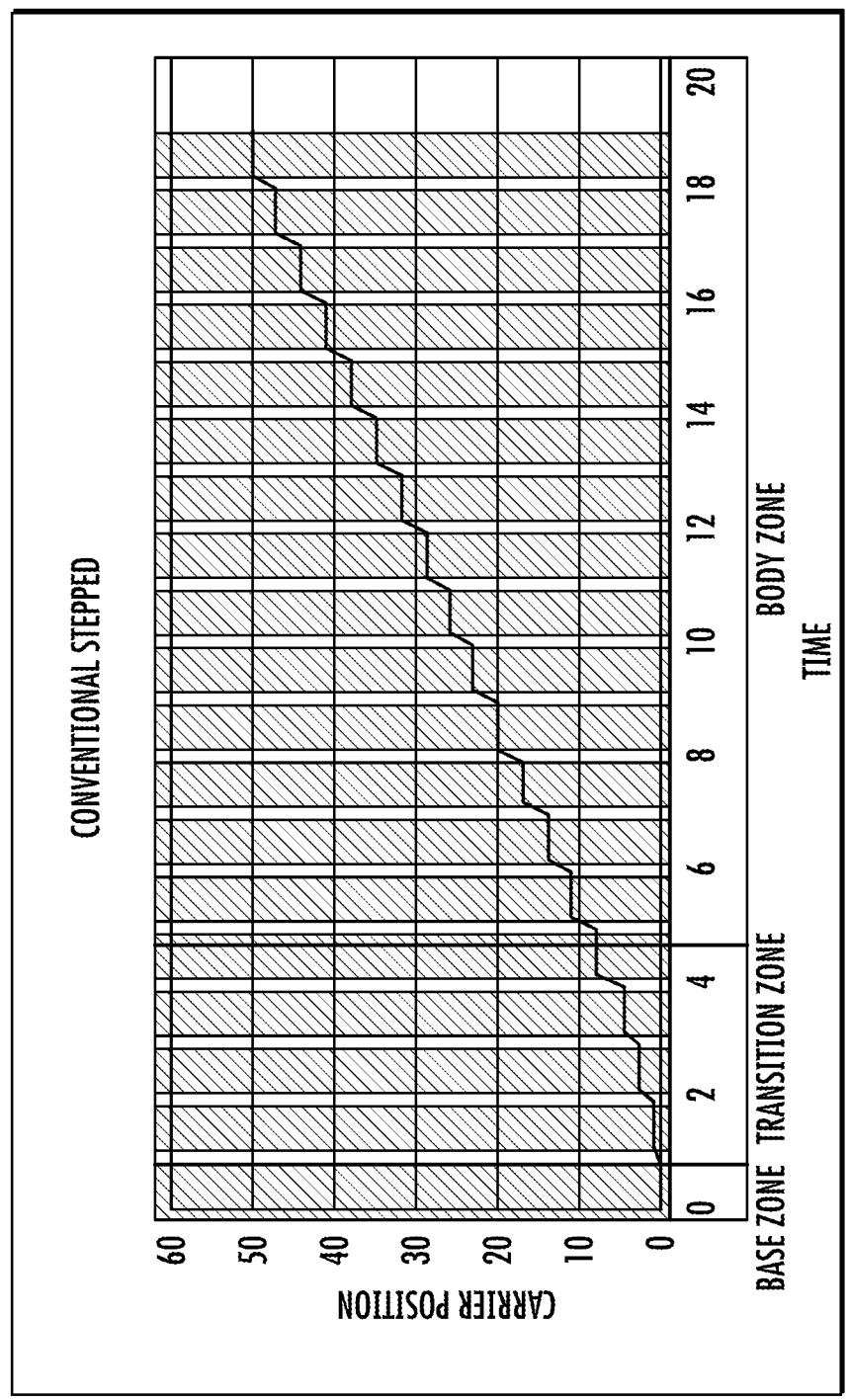
FIG. 12A schematically illustrates the movement of the carrier (z) over time (t) in the course of fabricating a three-dimensional object by intermittent (or "stepped") advancing and intermittent exposure.

FIG. 12A schematically illustrates one embodiment of stepped mode: In the conventional stepped mode an image is projected while the build platform is stationary (or moving slowly as compared to more rapid movement in between illumination). When one height increment is sufficiently exposed the image is turned off and the build platform is moved upwards by some increment. This motion can be at one speed or the speed can vary such as by accelerating from a slow speed when the thickness of uncured resin is thin to faster as the thickness of the uncured resin is thicker. Once the build platform is in the new position the image of the next cross section is projected to sufficiently expose the next height increment.

Figure 12B:
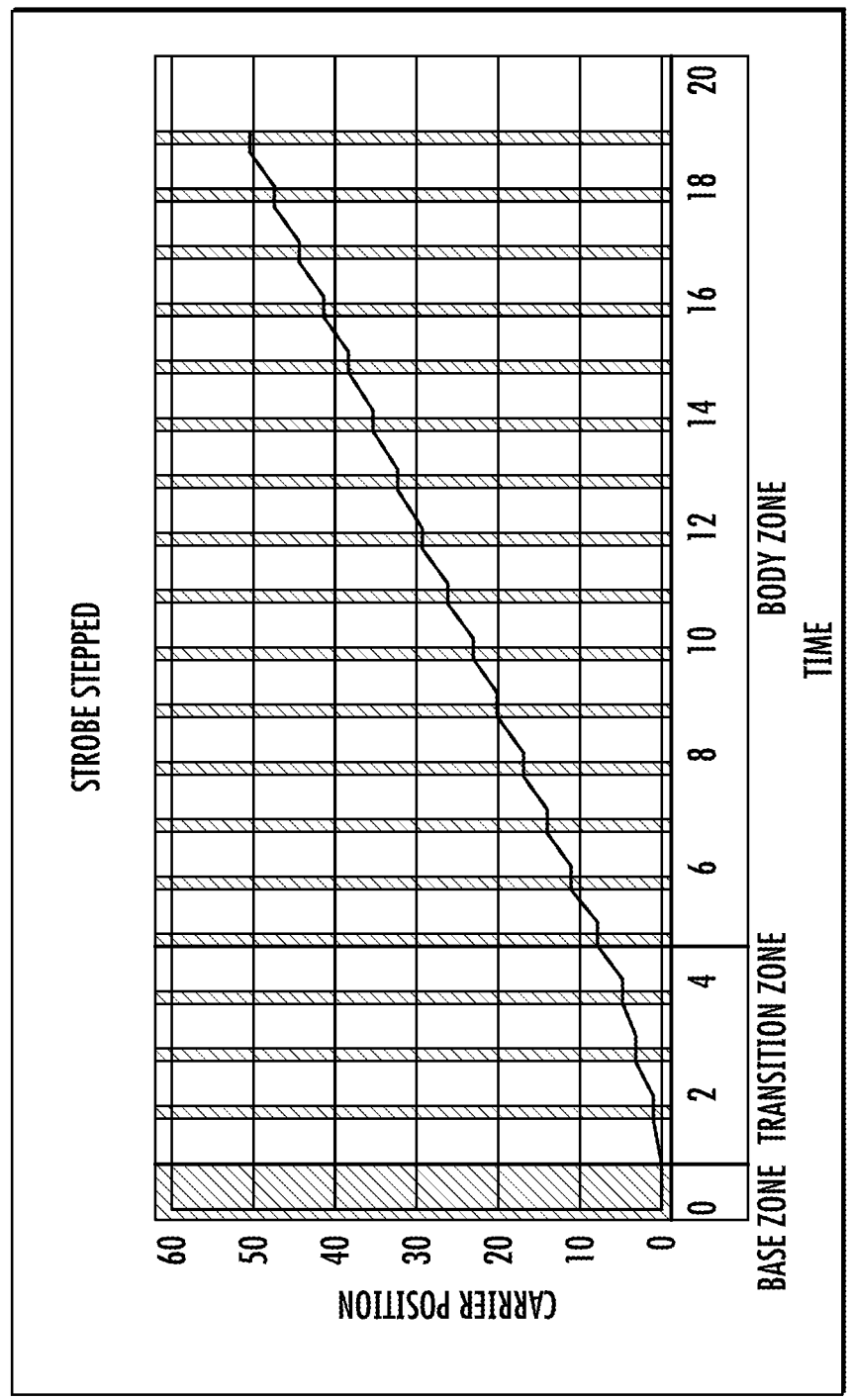
FIG. 12B illustrates the fabrication of a three-dimensional object in a manner similar to FIG. 12A, except that illumination is now in a shortened intermittent (or "strobe") pattern.

FIG. 12B schematically illustrates one embodiment of strobe stepped mode: In the strobe stepped mode the light intensity is increased and the amount of time that the image is projected is reduced. This allows more time for resin flow so the overall speed of the print can be reduced or the speed of movement can be reduced. For example: If the intensity for the conventional stepped mode was 5 mW/cm² and the build platform moves in increments of 100 um in 1 second and the image is projected for 1 second the intensity could be doubled to 10 mW/cm², the time that the image is projected could be reduced to 0.5 seconds, and the speed of movement could be reduced to 50 um/second, or the time that the stage is moving could be reduced to 0.5 seconds. The increased intensity could be as much as 5 fold or more allowing the time allotted for image projection to be reduced to $1/5^{th}$ or less.

Figure 13A:
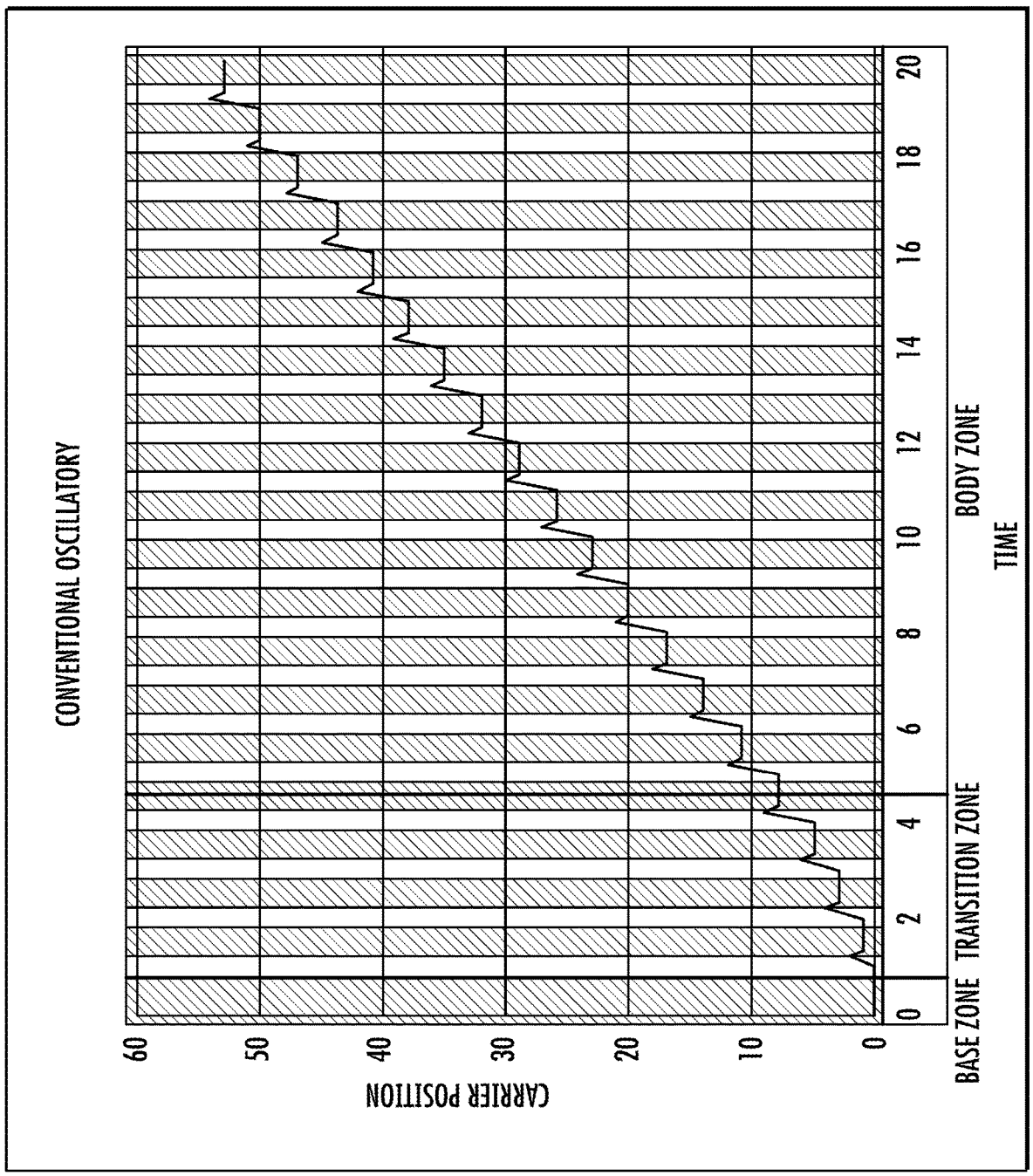
FIG. 13A schematically illustrates the movement of the carrier (z) over time (t) in the course of fabricating a three-dimensional object by oscillatory advancing and intermittent exposure.

FIG. 13A schematically illustrates one embodiment of oscillatory mode: In the oscillatory mode an image is again projected while the build platform is stationary (or moving slowly as compared to more rapid movement in-between illuminations). When one height increment is cured the image is turned off and the build platform is moved upwards to pull additional resin into the build zone and then moved back down to the next height increment above the last cured height. This motion can be at one speed or the speed can vary such as by accelerating from a slow speed when the thickness of uncured resin is thin to faster as the thickness of the uncured resin is thicker. Once the build platform is in the new position the image of the next cross section is projected to cure the next height increment.

Figure 13B:
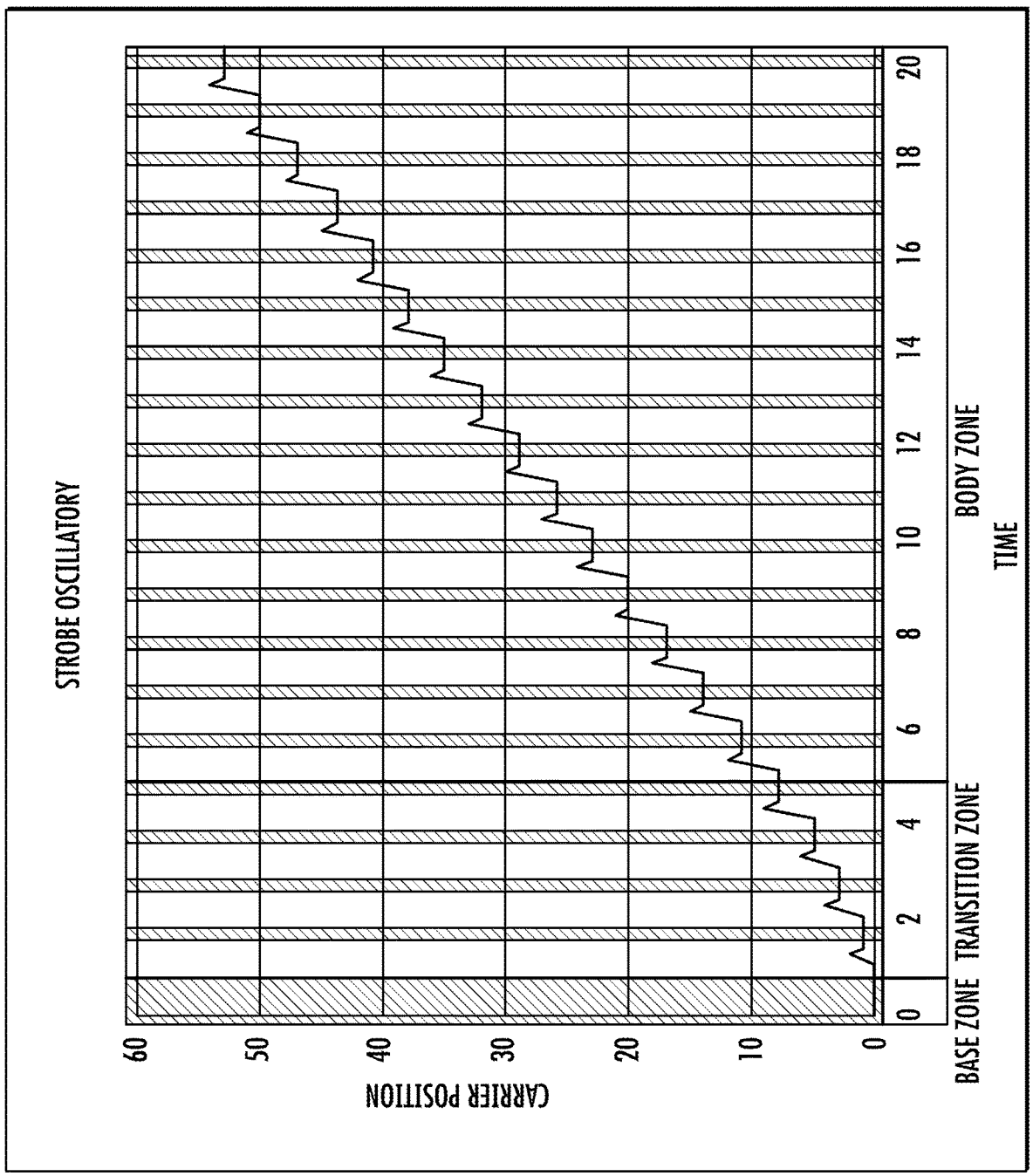
FIG. 13B illustrates the fabrication of a three-dimensional object in a manner similar to FIG. 13A, except that illumination is now in a shortened intermittent (or "strobe") pattern.

FIG. 13B illustrates one embodiment of strobe oscillatory mode. In the strobe oscillatory mode the light intensity is increased and the amount of time that the image is projected is reduced. This allows more time for resin flow so the overall speed of the print can be reduced or the speed of movement can be reduced. For example: If the intensity for the conventional oscillatory mode was 5 mW/cm² and the build platform moves up by 1 mm and back down to an increment of 100 um above the previous height in 1 second and the image is projected for 1 second the intensity could be doubled to 10 mW/cm², the time that the image is projected could be reduced to 0.5 seconds, and the speed of movement could be reduced to by half or the time that the stage is moving could be reduced to 0.5 seconds. The increased intensity could be as much as 5 fold or more allowing the time allotted for image projection to be reduced to $1/5^{th}$ or less. Segment "A" of FIG. 13 is discussed further below.

FIG. 14A illustrates a segment of a fabrication method operated in another embodiment of strobe oscillatory mode. In this embodiment, the duration of the segment during which the carrier is static is shortened to close that of the duration of the strobe illumination, so that the duration of the oscillatory segment may—if desired—be lengthened without changing the cumulative rate of advance and the speed of fabrication.

FIG. 14B illustrates a segment of another embodiment of strobe oscillatory mode, similar to that of FIG. 14A, except that the carrier is now advancing during the illumination segment (relatively slowly, as compared to the upstroke of the oscillatory segment).

Example 6

Varying of Process Parameters During Fabrication

In the methods of the Examples above, the operating conditions during the body zone are shown as constant throughout that zone. However, various parameters can be altered or modified in the course of the body zone or segment, as discussed further below.

A primary reason for altering a parameter during production would be variations in the cross section geometry of the three-dimensional object; that is, smaller (easier to fill), and larger (harder to fill) segments or portions of the same three-dimensional object. For easier to fill segments (e.g., 1-5 mm diameter equivalents), the speed of upwards movement could be quick (up to 50-1000 m/hr) and/or the pump height could be minimal (e.g., as little at 100 to 300 um). For larger cross sectional segments (e.g., 5-500 mm diameter equivalents) the speed of upward movement can be slower (e.g., 1-50 mm/hr) and/or the pump height can be larger (e.g., 500 to 5000 um). Particular parameters will, of course, vary depending on factors such as illumination intensity, the particular polymerizable liquid (including constituents thereof such as dye and filler concentrations), the particular build surface employed, etc.

In some embodiments, the overall light dosage (determined by time and intensity) may be reduced as the "bulk" of the cross section being illuminated increases. Said another way, small points of light may need higher per unit dosage than larger areas of light. Without wishing to be bound to any specific theory, this may relate to the chemical kinematics of the polymerizable liquid. This effect could cause us to increase the overall light dosage for smaller cross sectional diameter equivalents.

In some embodiments, vary the thickness of each height increment between steps or pumps can be varied. This could be to increase speed with decreased resolution requirements (that is, fabricating a portion that requires less precision or permits more variability, versus a portion of the object that requires greater precision or requires more precise or narrow tolerances). For example, one could change from 100 um increments to 200 um or 400 um increments and group all the curing for the increased thickness into one time period. This time period may be shorter, the same or longer than the combined time for the equivalent smaller increments.

In some embodiments, the light dosage (time and/or intensity) delivered could be varied in particular cross sections (vertical regions of the object) or even in different areas within the same cross section or vertical region. This could be to vary the stiffness or density of particular geometries. This can, for example, be achieved by changing the dosage at different height increments, or changing the gray-scale percentage of different zones of each height increment illumination.

Examples of body portion fabrication through multiple zones are given in FIGS. 15A-19.

Figure 15A:
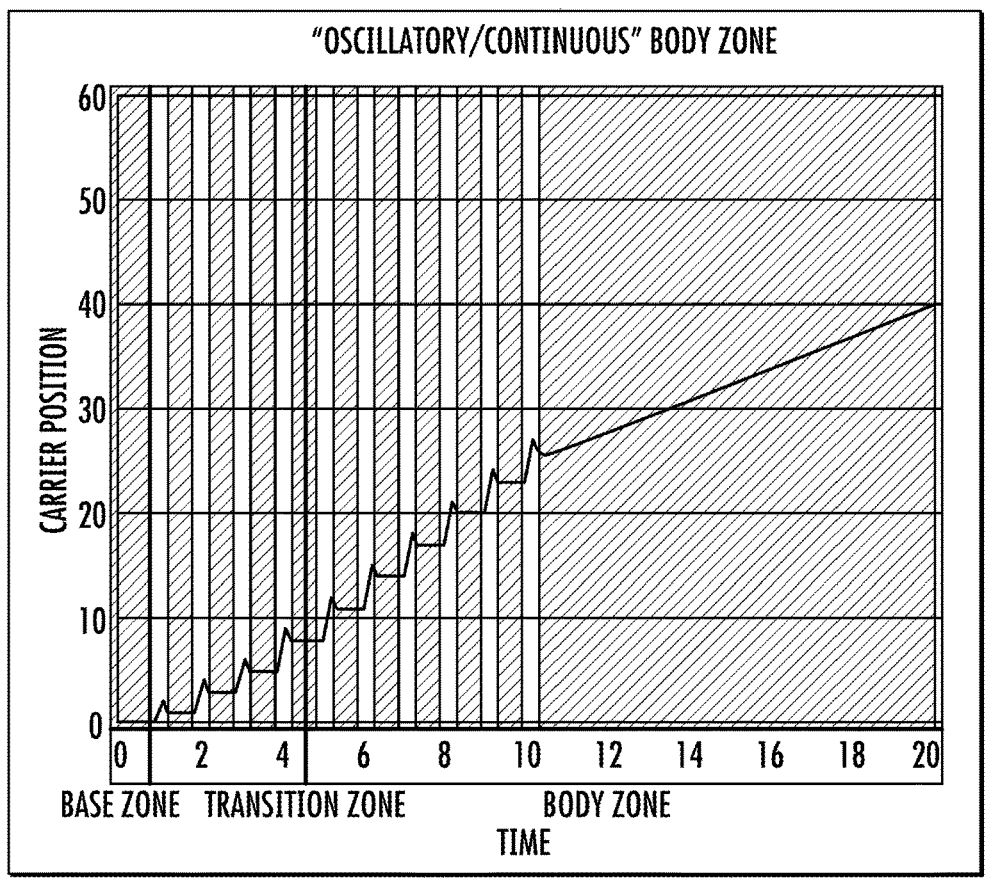
FIG. 15A is a schematic illustration of the fabrication of a three-dimensional object similar to FIG. 13A, except that the body segment is fabricated in two contiguous segments, with the first segment carried out in an oscillatory operating mode, and the second segment carried out in a continuous operating mode.
Figure 16A:
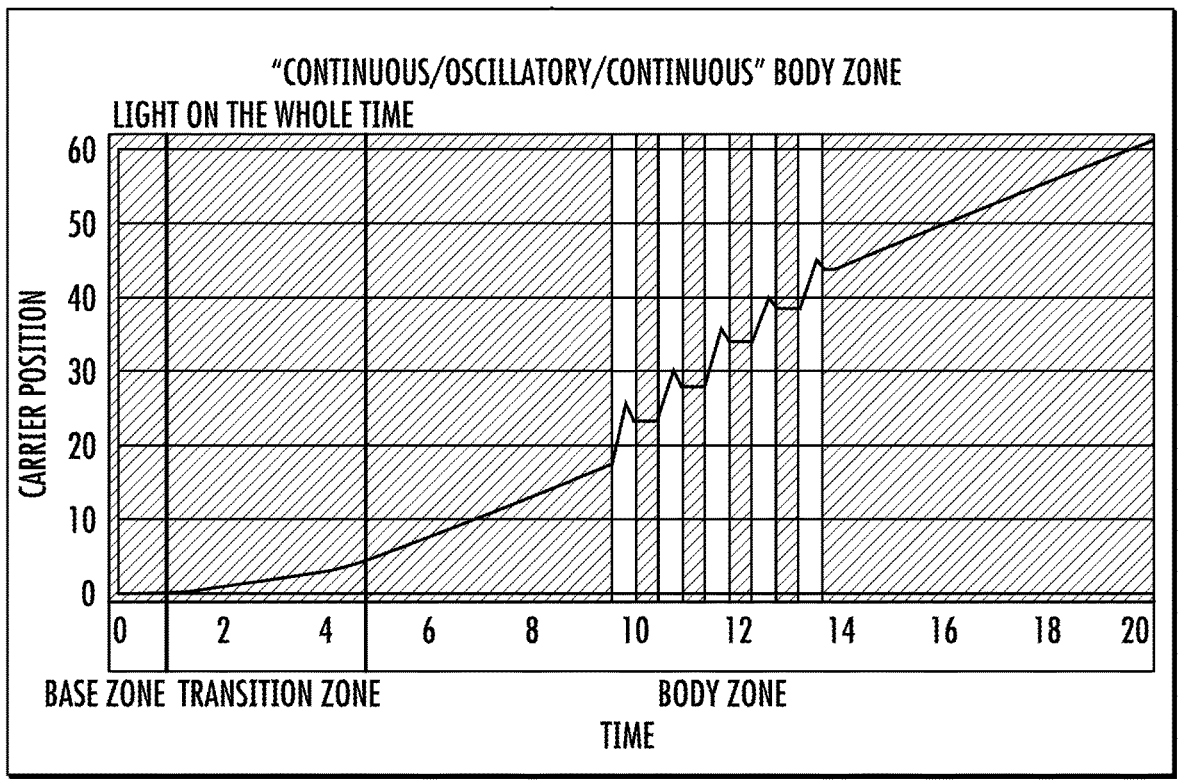
FIG. 16A is a schematic illustration of the fabrication of a three-dimensional object similar to FIG. 11A, except that the body segment is fabricated in three contiguous segments, with the first and third segments carried out in a continuous operating mode, and the second segment carried out in oscillatory operating mode.
Figure 17A:
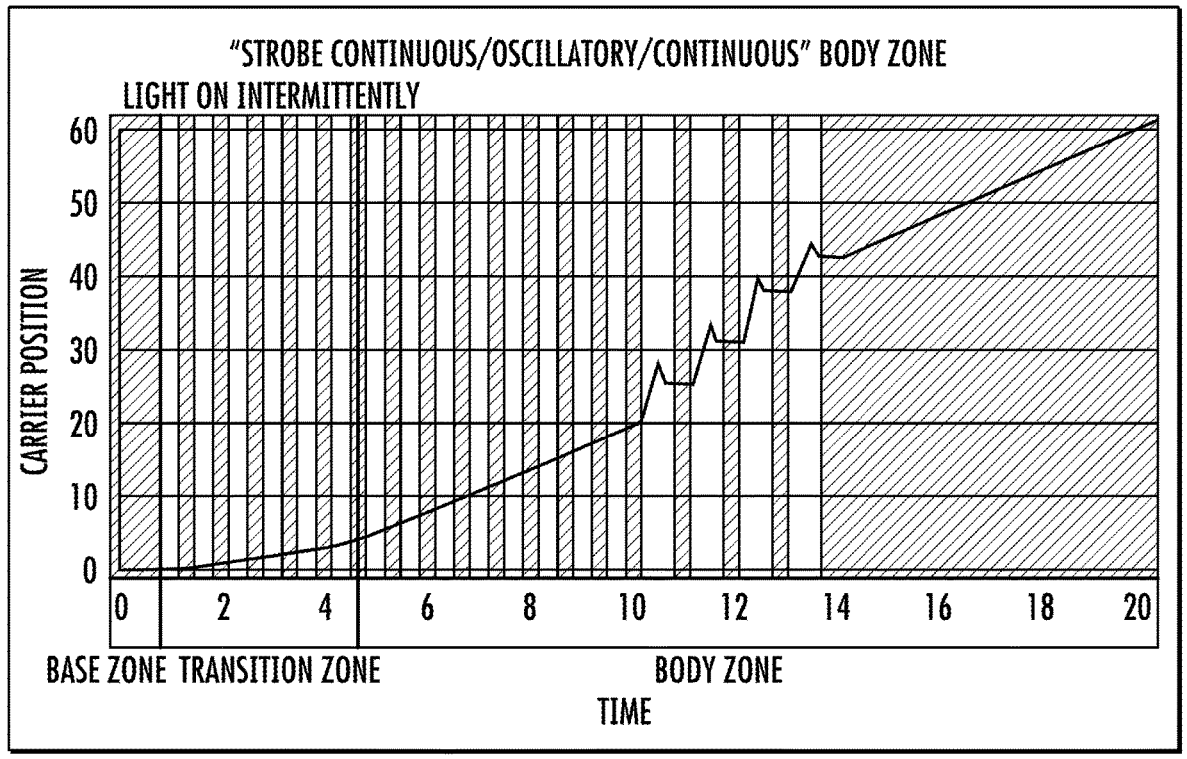
FIG. 17A is a schematic illustration of the fabrication of a three-dimensional object similar to FIG. 16A, except that the base zone, transition zone, and first segment of the body zone are carried out in a strobe continuous operating mode, the second segment of the body zone is fabricated in an oscillatory operating mode, and the third segment of the body zone is fabricated in a continuous operating mode.

FIG. 15A is a schematic illustration of the fabrication of a three-dimensional object similar to FIG. 13A, except that the body segment is fabricated in two contiguous segments, with the first segment carried out in an oscillatory operating mode, and the second segment carried out in a continuous operating mode. FIG. 16A is a schematic illustration of the fabrication of a three-dimensional object similar to FIG. 11A, except that the body segment is fabricated in three contiguous segments, with the first and third segments carried out in a continuous operating mode, and the second segment carried out in oscillatory operating mode. FIG. 17A is a schematic illustration of the fabrication of a three-dimensional object similar to FIG. 16A, except that the base zone, transition zone, and first segment of the body zone are carried out in a strobe continuous operating mode, the second segment of the body zone is fabricated in an oscillatory operating mode, and the third segment of the body zone is fabricated in a continuous operating mode.

Figure 15B:
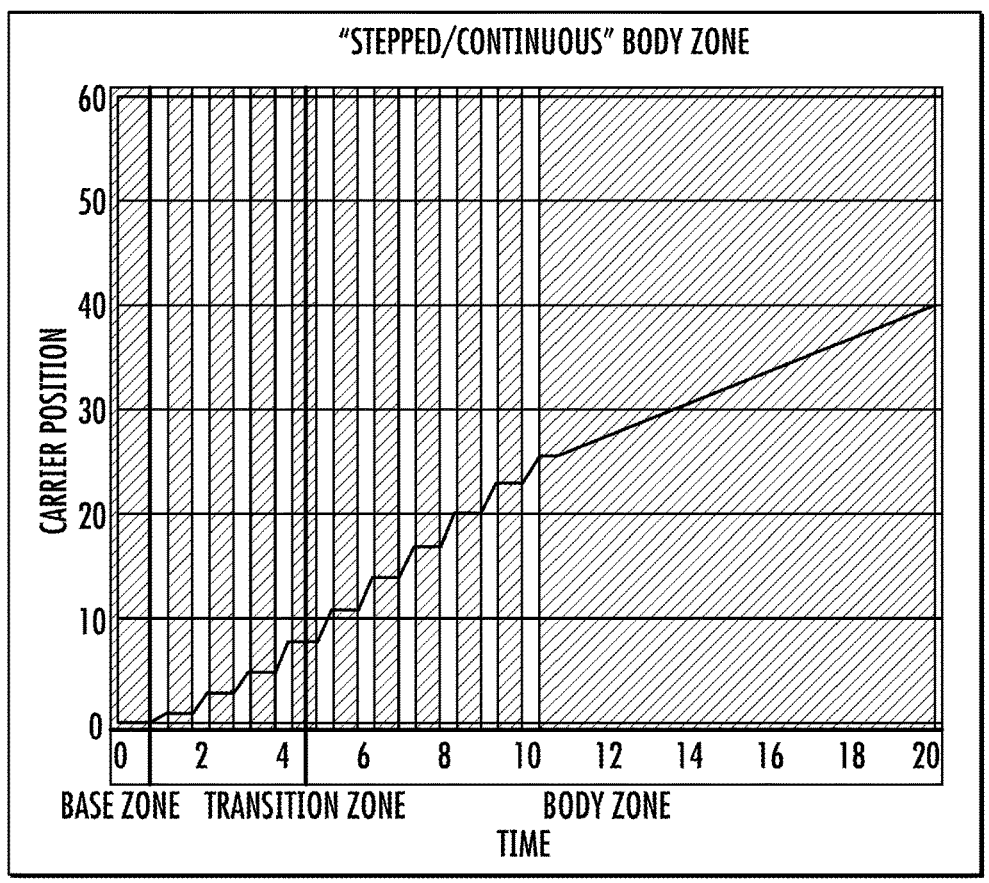
FIG. 15B is a schematic illustration of the fabrication of a three-dimensional object similar to FIG. 15A, except that oscillatory operating modes are replaced with stepped operating modes.
Figure 16B:
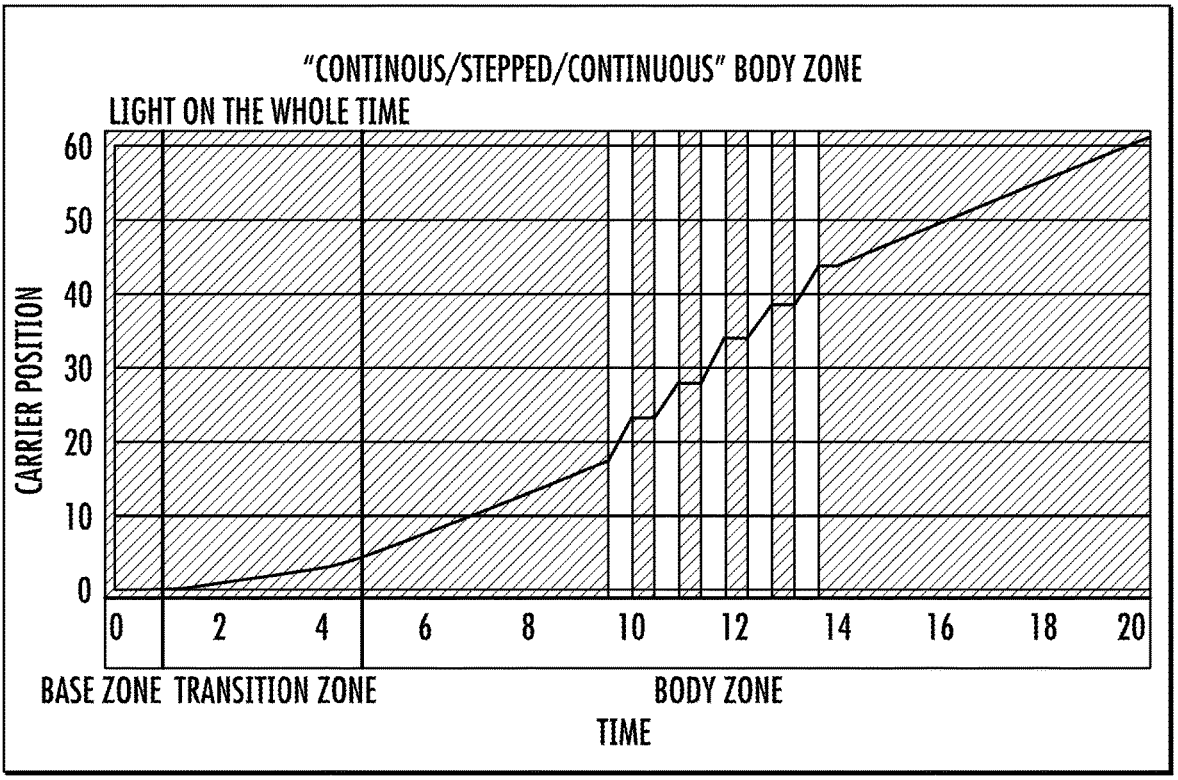
FIG. 16B is a schematic illustration of the fabrication of a three-dimensional object similar to FIG. 16A, except that the oscillatory operating mode is replaced with a stepped operating mode.
Figure 17B:
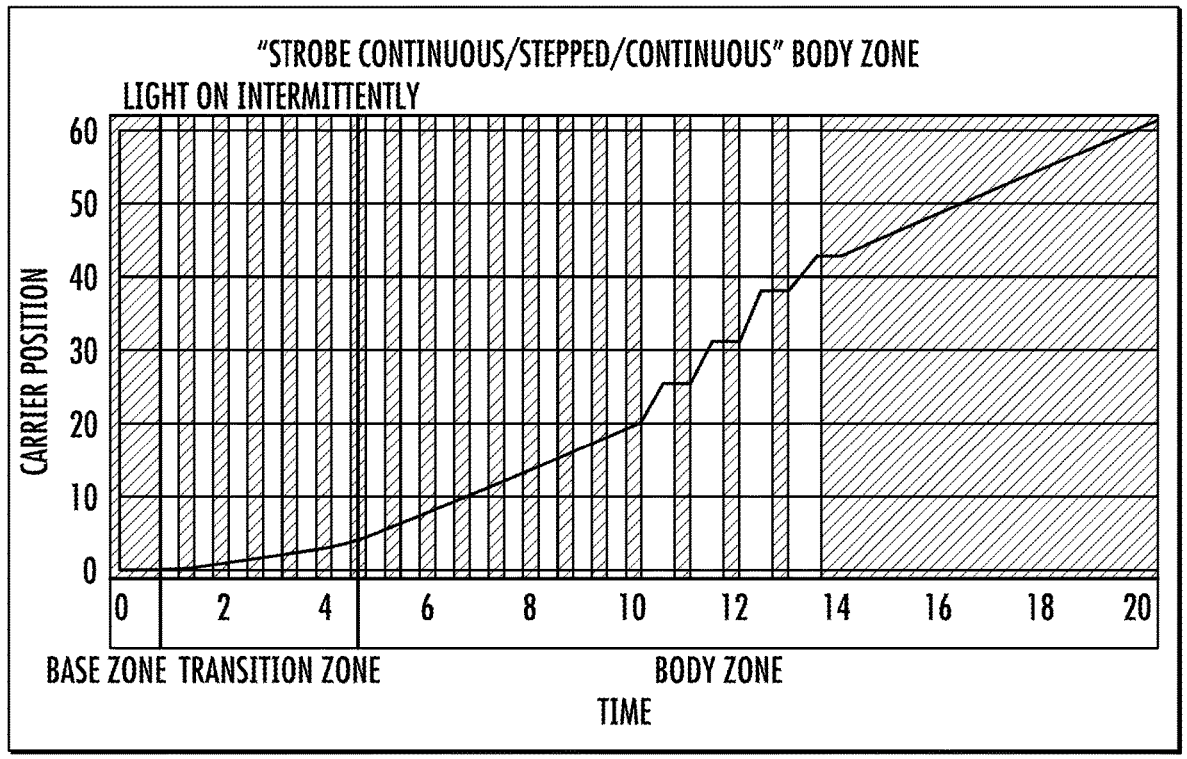
FIG. 17B is similar to FIG. 17A, except that the second segment of the body zone is fabricated in a stepped operating mode.

FIGS. 15B, 16B, and 17B are similar to the foregoing, except that stepped or step-wise mode is used in place of oscillatory, or "reciprocal" mode. In general, reciprocal or oscillatory mode is preferred over stepped mode, with reciprocation being achieved entirely through motion of the carrier, or the combined motion of the carrier and a flexible, or movable, build surface.

Figure 18A:
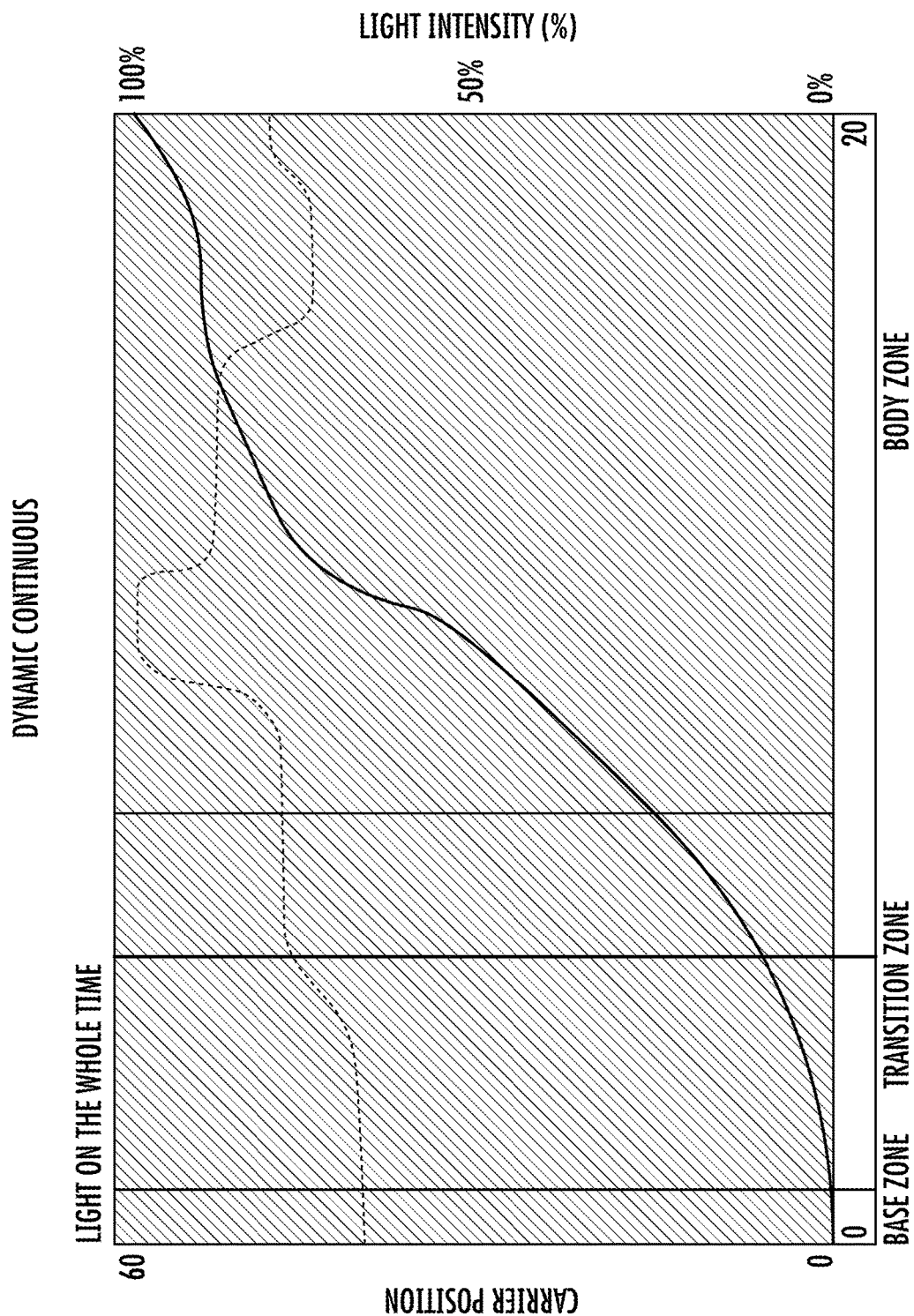
FIG. 18A is a schematic illustration of the fabrication of a three-dimensional object similar to FIG. 11A, except that light intensity is varied in the course of fabricating the base and transition zones, and both light intensity and rate of advancing are varied in the course of fabricating the body zone.
Figure 18B:
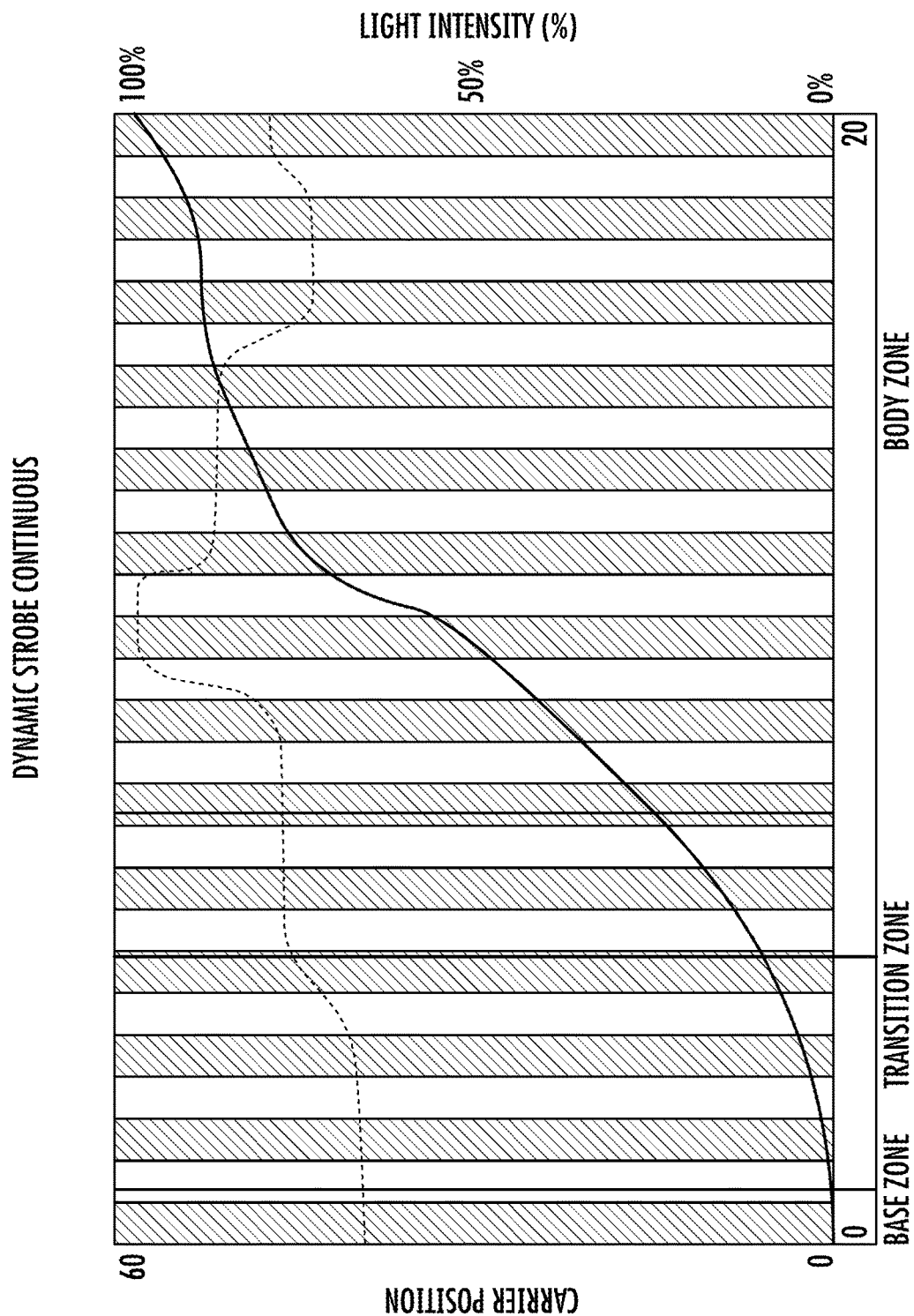
FIG. 18B is a schematic illustration of the fabrication of a three-dimensional object similar to FIG. 17A, except that light is interrupted in an intermittent fashion (dashed line representing light intensity during interrupted segments is for comparison to FIG. 17A only).

FIG. 18A is a schematic illustration of the fabrication of a three-dimensional object similar to FIG. 11A, except that light intensity is varied in the course of fabricating the base and transition zones, and both light intensity and rate of advancing are varied in the course of fabricating the body zone. FIG. 18B is a schematic illustration of the fabrication of a three-dimensional object similar to FIG. 17A, except that light is interrupted in an intermittent fashion (dashed line representing light intensity during interrupted segments is for comparison to FIG. 17A only).

Figure 19:
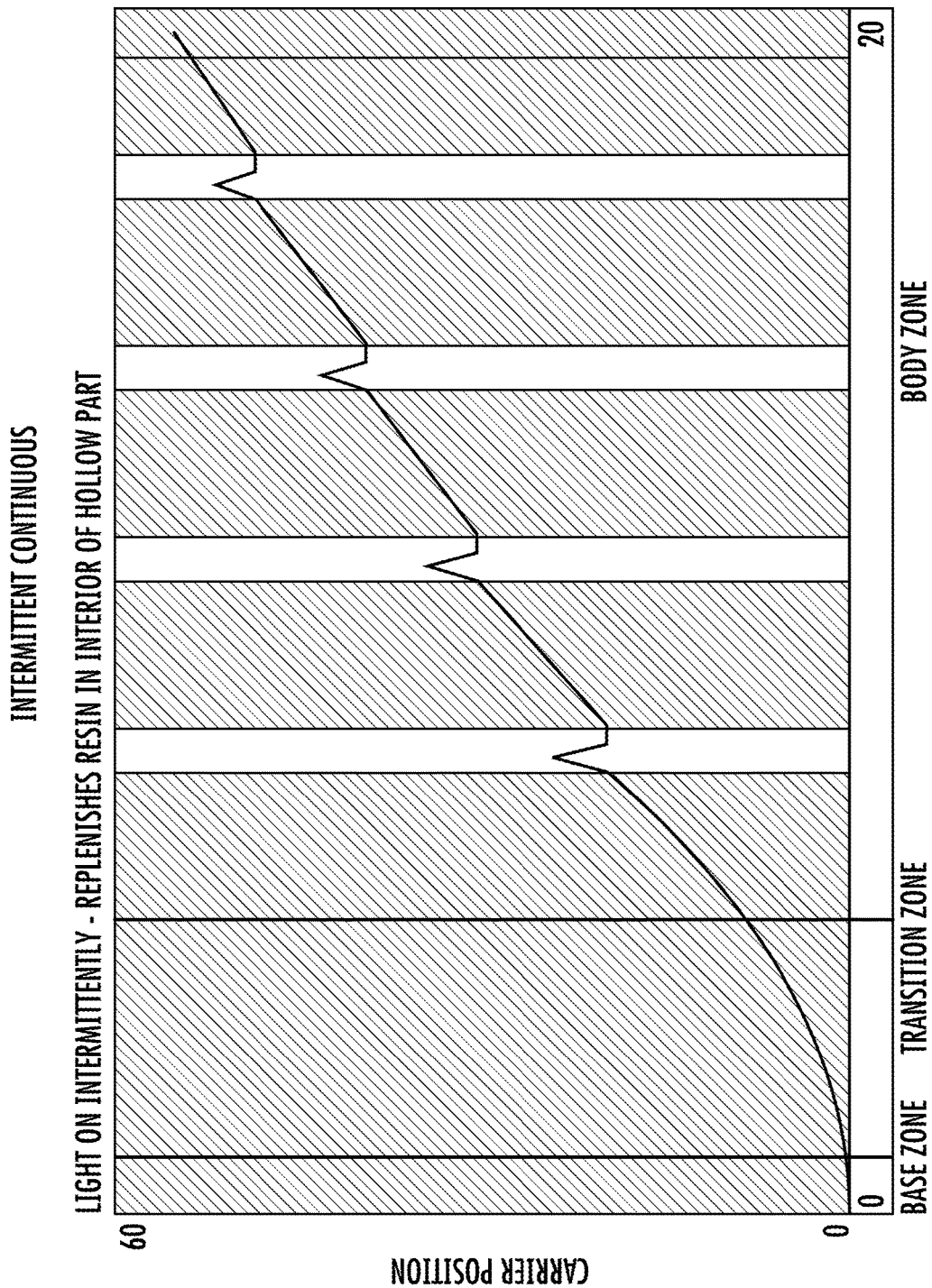
FIG. 19 is a schematic illustration of the fabrication of a three-dimensional object similar to FIG. 11A, except that the mode of operation during fabrication of the body segment is changed multiple times for continuous, to reciprocal, and back.

FIG. 19 is a schematic illustration of the fabrication of a three-dimensional object similar to FIG. 11A, except that the mode of operation during fabrication of the body segment is changed multiple times for continuous, to reciprocal, and back. This may be employed not only to accommodate changes in geometry of the three-dimensional object during fabrication, but a relatively constant geometry where the part is hollow, to facilitate replenishment of polymerizable liquid in the build region.

Figure 20:
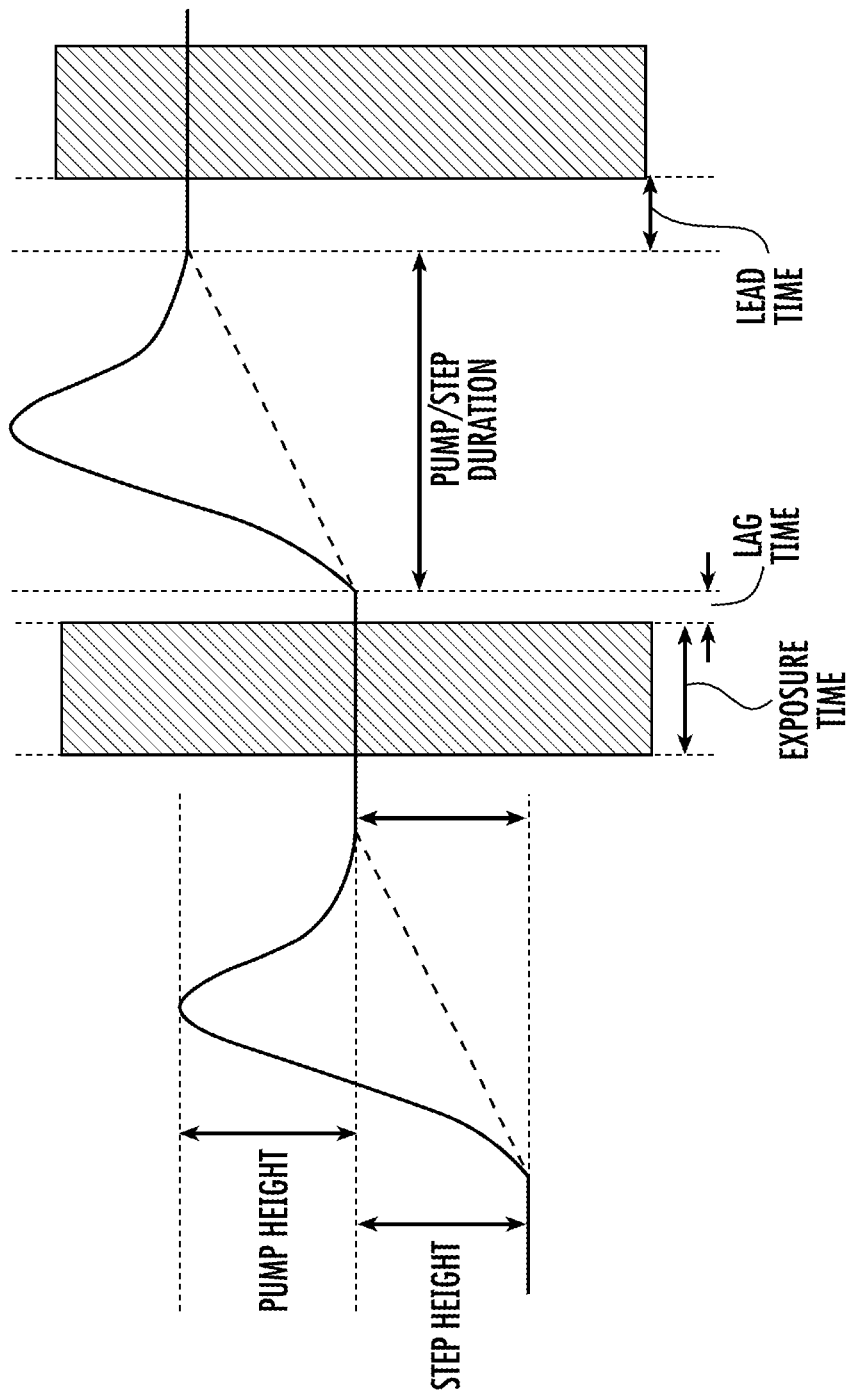
FIG. 20 schematically illustrates parameters that may be varied within a reciprocal or step-wise operating mode.

FIG. 20 schematically illustrates parameters that may be varied within a reciprocal (also referred to as "oscillatory") operating mode (solid line throughout) or a step operating mode (solid line horizontal lines and dashed lines). Note the parameters that may be varied in these two modes are similar, except for the absence of a pump height parameter in step mode.

Example 7

Varying of Slice Thickness During Fabrication

In the methods of the present invention, slice thickness may be held constant or varied in any of the operating modes. Examples are given in FIGS. 21A to 21F, where horizontal dashed lines represent the transition from each contiguous slice (corresponding to different exposure or illumination frames or patterns) during the formation of the three-dimensional object.

Figure 21A:
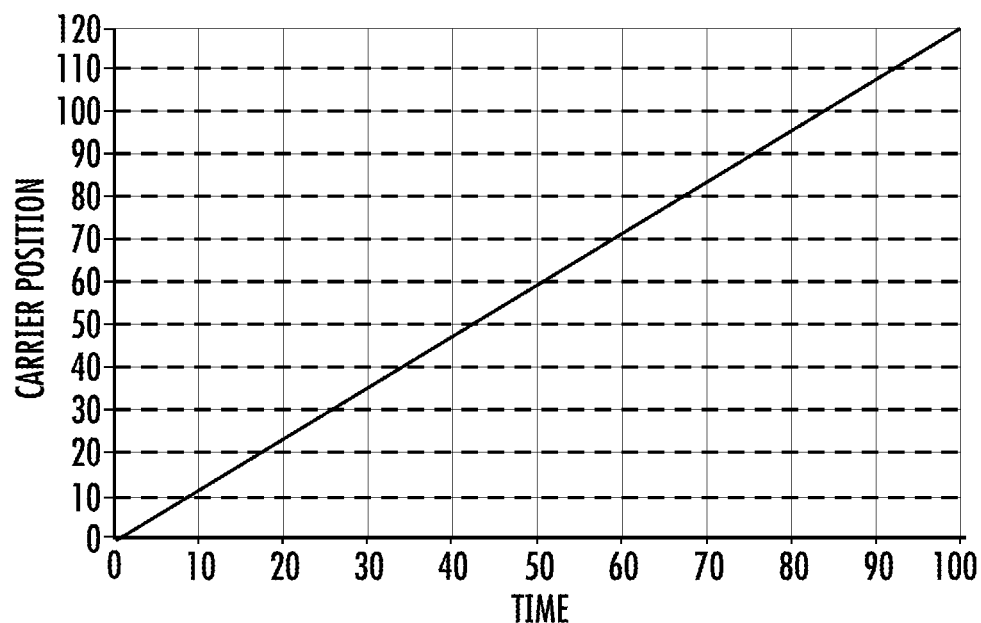
FIG. 21A schematically illustrates a method of the invention carried out in a continuous operating mode, with constant slice thickness and constant carrier speed.
Figure 21B:
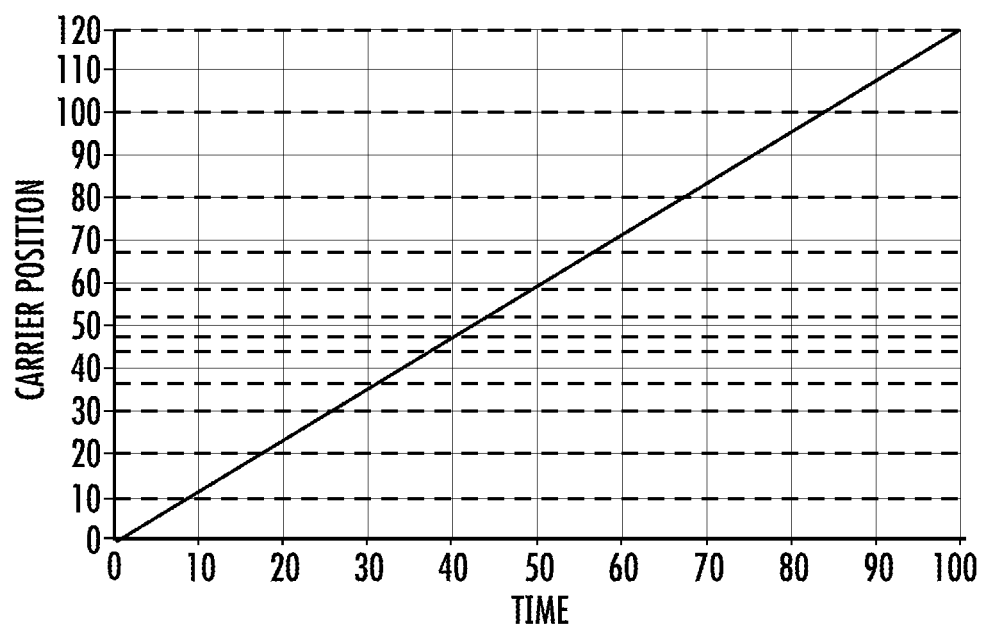
FIG. 21B schematically illustrates a method of the invention carried out in a continuous operating mode, with variable slice thickness with constant carrier speed.

FIG. 21A schematically illustrates a method of the invention carried out in a continuous operating mode, with constant slice thickness and constant carrier speed, while FIG. 21B schematically illustrates a method of the invention carried out in a continuous operating mode, with variable slice thickness with constant carrier speed. In both cases, illumination or exposure is continuous, with slices changing over time. Slice thickness could likewise be varied in an intermittent exposure mode of operation (including strobe mode).

Figure 21C:
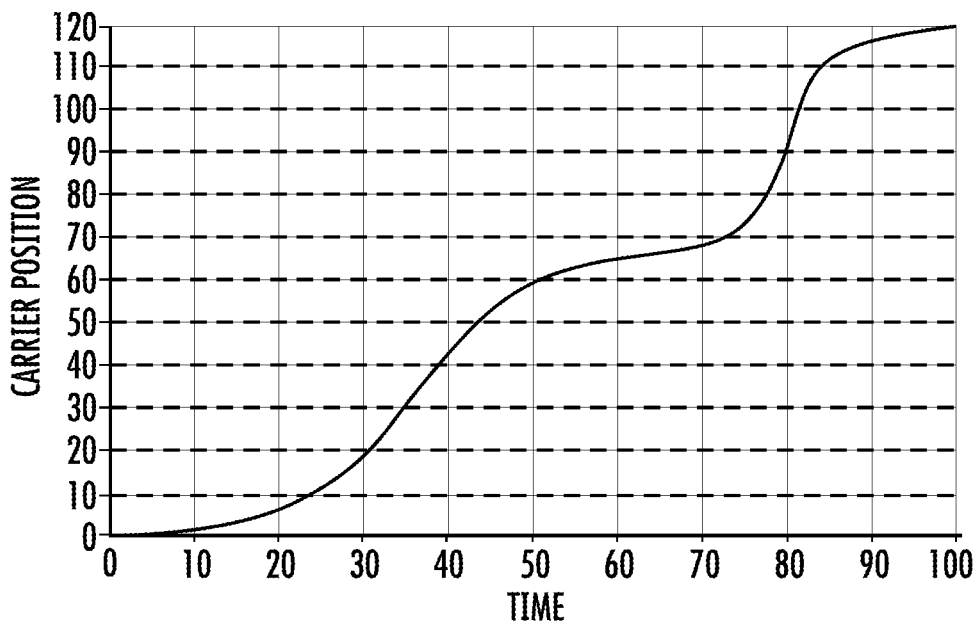
FIG. 21C schematically illustrates a method of the invention carried out in a continuous operating mode, with constant slice thickness and variable carrier speed.
Figure 21D:
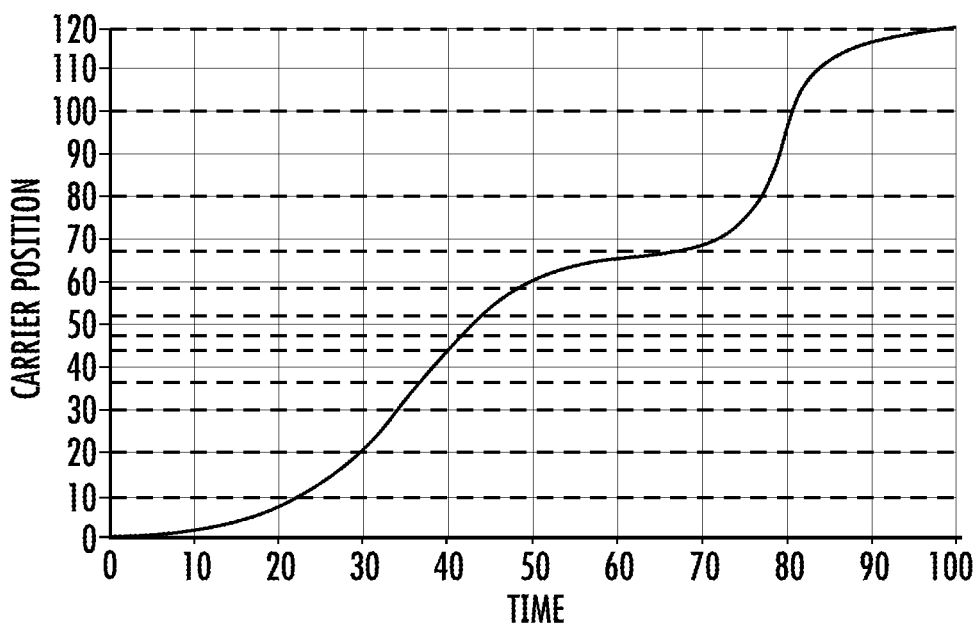
FIG. 21D schematically illustrates a method of the invention carried out in continuous operating mode, mode with variable slice thickness and variable carrier speed.

FIG. 21C schematically illustrates a method of the invention carried out in a continuous operating mode, with constant slice thickness and variable carrier speed, while FIG. 21D schematically illustrates a method of the invention carried out in continuous operating mode, mode with variable slice thickness and variable carrier speed. Again in both cases, illumination or exposure is continuous with the slices changing over time, but slice thickness could likewise be varied in an intermittent exposure mode of operation.

Figure 21E:
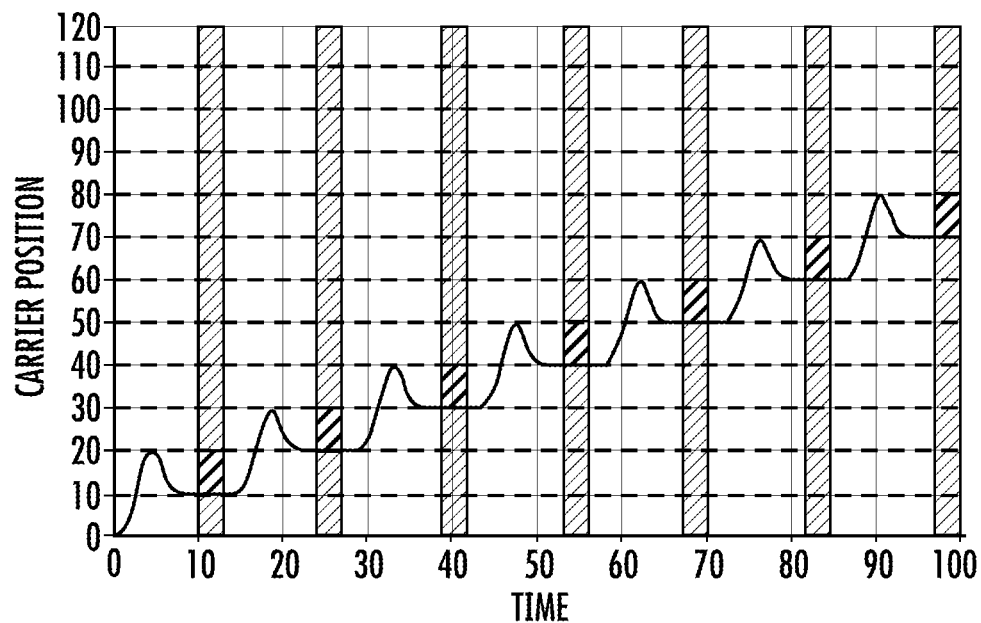
FIG. 21E schematically illustrates a method of the invention carried out in reciprocal operating mode, with constant slice thickness.
Figure 21F:
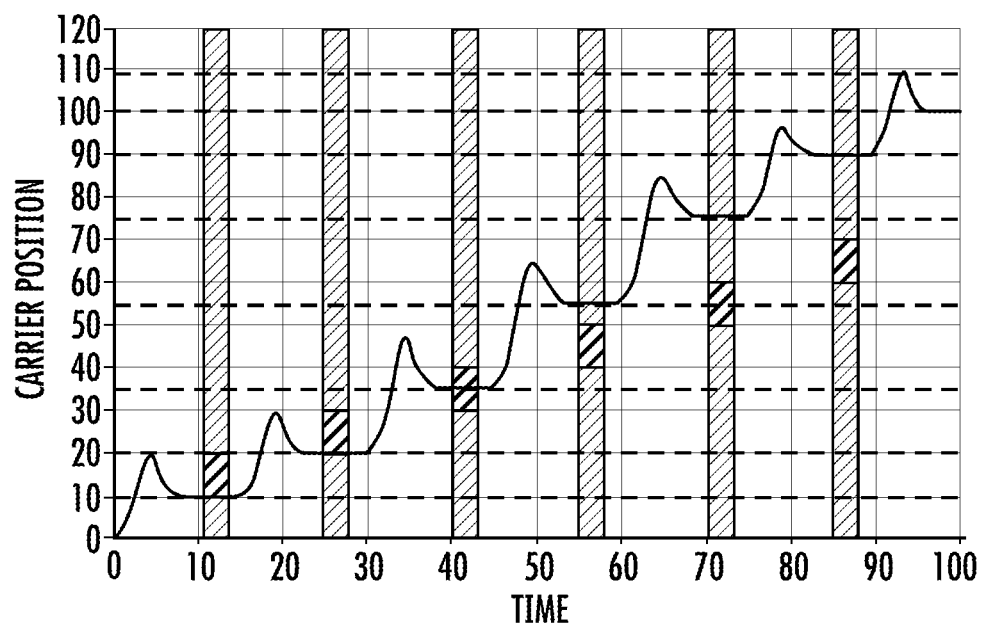
FIG. 21F schematically illustrates a method of the invention carried out in reciprocal operating mode, with variable slice thickness.

FIG. 21E schematically illustrates a method of the invention carried out in reciprocal operating mode, with constant slice thickness, while FIG. 21F schematically illustrates a method of the invention carried out in reciprocal operating mode, with variable slice thickness. Bold diagonal hash patterns during the exposure periods are to emphasize slice thickness, and variability thereof in FIG. 21F. In both cases, a step-wise mode of operation could be used in place of a reciprocal mode of operation (see, for example, FIG. 20).

The foregoing is illustrative of the present invention, and is not to be construed as limiting thereof. The invention is defined by the following claims, with equivalents of the claims to be included therein.

The foregoing is illustrative of the present invention, and is not to be construed as limiting thereof. The invention is defined by the following claims, with equivalents of the claims to be included therein.

That which is claimed is:

1. A method of forming a three-dimensional object, comprising:
providing a carrier and an optically transparent member having a build surface, said carrier and said build surface defining a build region therebetween;
filling said build region with a polymerizable liquid,
continuously or intermittently irradiating said build region with light through said optically transparent member to form a solid polymer from said polymerizable liquid,
continuously or intermittently advancing said carrier away from said build surface to form said three-dimensional object from said solid polymer,
wherein said optically transparent member comprises a build plate comprising:
a lighting panel having individually addressable pixels configured to selectively emit light and/or transmit light from illumination below the pixels to a top surface of the lighting panel;
a planar screen or base having an upper surface and a lower surface that is affixed to the top surface of the lighting panel, wherein the base is rigid, optically transparent, gas-impermeable, and planar;
a flexible, optically transparent, gas-permeable sheet having upper and lower surfaces, the upper surface comprising a build surface for forming a three-dimensional object, the sheet lower surface positioned opposite the base, wherein the build plate is configured to permit gas flow to the build surface,
wherein said planar screen or base comprises a top portion and a bottom portion, wherein the top portion comprises a patterned rigid polymer and the bottom portion comprises a second material different than the first material, and the top portion is adhered to the bottom portion.

2. The method of claim 1, wherein said filling, irradiating, and/or advancing steps are carried out while also concurrently:
(i) continuously maintaining a dead zone of polymerizable liquid in contact with said build surface, and
(ii) continuously maintaining a gradient of polymerization zone between said dead zone and said solid polymer and in contact with each thereof, said gradient of polymerization zone comprising said polymerizable liquid in partially cured form.

3. The method of claim 2, wherein said optically transparent member comprises a semipermeable member, and said continuously maintaining a dead zone is carried out by feeding an inhibitor of polymerization through said optically transparent member in an amount sufficient to maintain said dead zone and said gradient of polymerization.

4. The method of claim 3, wherein said gradient of polymerization zone is maintained for a time of at least 5 seconds.

5. The method of claim 1, wherein the carrier with said solid polymer adhered thereto is unidirectionally advanced away from said build surface on said build plate, and said build plate is stationary.

6. The method of claim 1, said filling step further comprising vertically reciprocating said carrier with respect to said build surface, to enhance or speed the refilling of said build region with said polymerizable liquid.

7. The method of claim 6, wherein said vertically reciprocating step comprises an upstroke and a downstroke, with the distance of said upstroke greater than the distance of said downstroke, to thereby concurrently carry out said advancing step in part or in whole.

8. The method of claim 6, wherein said vertically reciprocating step comprises an upstroke, and wherein the speed of said upstroke accelerates over a period of time during said upstroke.

9. The method of claim 6, wherein said vertically reciprocating step comprises a downstroke, and wherein the speed of said downstroke decelerates over a period of time during said downstroke.

10. The method of claim 1, wherein said vertically reciprocating step is carried out over a total time of from 0.01 seconds up to 10 seconds, and/or over an upstroke distance of travel of from 0.02 millimeters to 10 millimeters.

11. The method of claim 1, wherein said advancing is carried out intermittently at a rate of one individual advance per minute up to 1000 individual advances per minute, each followed by a pause during which an irradiating step is carried out.

12. The method of claim 11, wherein each of said individual advances is carried out over an average distance of travel for each advance of from 10 microns to 200 microns.

13. The method of claim 1, wherein said build surface is fixed and stationary in the lateral dimensions.

14. The method of claim 1, wherein said build surface is fixed and stationary in the vertical dimension.

15. The method of claim 1, wherein said build plate further comprises an adhesive layer between the gas-permeable sheet and the base, and a channel layer defining channels therein.

* * * * *